(12) United States Patent
Hofmann et al.

(10) Patent No.: US 10,296,823 B2
(45) Date of Patent: May 21, 2019

(54) METHODS, SYSTEMS AND COMPUTER PROGRAM PRODUCTS FOR USING A DISTRIBUTED ASSOCIATIVE MEMORY BASE TO DETERMINE DATA CORRELATIONS AND CONVERGENCE THEREIN

(71) Applicant: Intel Corporation, Santa Clara, CA (US)

(72) Inventors: Paul Hofmann, Los Gatos, CA (US); Manuel Aparicio, IV, Chapel Hill, NC (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 14/541,229

(22) Filed: Nov. 14, 2014

(65) Prior Publication Data

US 2015/0142807 A1 May 21, 2015

Related U.S. Application Data

(60) Provisional application No. 61/904,835, filed on Nov. 15, 2013.

(51) Int. Cl.
*G06N 3/02* (2006.01)
*G06N 3/04* (2006.01)
*G06F 17/30* (2006.01)

(52) U.S. Cl.
CPC .......... *G06N 3/02* (2013.01); *G06F 17/30424* (2013.01); *G06N 3/0445* (2013.01); *Y04S 10/54* (2013.01)

(58) Field of Classification Search
CPC ................................. G06N 3/02; G06F 17/30
See application file for complete search history.

(56) References Cited

U.S. PATENT DOCUMENTS

| 5,974,409 A | 10/1999 | Sanu |
| 6,052,679 A * | 4/2000 | Aparicio, IV ......... G06N 3/063 706/15 |

(Continued)

FOREIGN PATENT DOCUMENTS

WO    2001/35337    5/2001

OTHER PUBLICATIONS

Torkkola, Kari. "Feature extraction by non-parametric mutual information maximization." Journal of machine learning research Mar. 3, 2003: 1415-1438.*

(Continued)

*Primary Examiner* — Eric Nilsson
(74) *Attorney, Agent, or Firm* — Barnes & Thornburg LLP

(57) ABSTRACT

Associative memory systems, methods and computer program products are provided. An associative memory system includes a distributed associative memory base including a network of networks of associative memory networks. A respective associative memory network includes associations among a respective observer memories and a plurality of observed memories that are observed by the respective observer memory. Ones of the associative memory networks are physically and/or logically independent from other ones of the associative memory networks. A processing system is configured to observe associations into and imagine associations from, the distributed associative memory base using multiple streaming queues that correspond to respective ones of multiple rows in the associative memory networks. The processing system is further configured to determine a cognitive distance between a term and a class of terms, the cognitive distance being returned responsive to a query of the distributed associative memory base.

23 Claims, 29 Drawing Sheets

(56) References Cited

U.S. PATENT DOCUMENTS

| | | | |
|---|---|---|---|
| 6,983,345 | B2 | 1/2006 | Lapir et al. |
| 8,065,293 | B2 | 11/2011 | Mukerjee |
| 8,280,831 | B1 | 10/2012 | Rubin |
| 8,352,488 | B2 | 1/2013 | Fleming |
| 8,732,101 | B1 | 5/2014 | Wilson |
| 2004/0054666 | A1* | 3/2004 | Lapir .......... G06F 17/30637 |
| 2007/0033346 | A1 | 2/2007 | Lemen et al. |
| 2008/0306944 | A1 | 12/2008 | Aparicio |
| 2010/0306227 | A1* | 12/2010 | Fleming .......... G06F 17/30286 707/763 |
| 2011/0314032 | A1 | 12/2011 | Bennett |
| 2012/0306227 | A1 | 12/2012 | Fleming et al. |
| 2015/0120706 | A1 | 4/2015 | Hoffman |

OTHER PUBLICATIONS

Notification of Transmittal of the International Search report and the Written Opinion of the International Searching Authority, or the Declaration, for corresponding Application No. PCT/US2014/065608; dated May 11, 2015, 10 pages.

Barigye, Stephen J., et al., "Relations Frequency Hypermatrices in Mutual, Conditional and Joint Entropy-Based Information Indices," *Journal of Computational Chemistry*, Wiley Online Library, www.c.chem.org, 2012.

First Office Action dated Nov. 27, 2017 for Chinese Patent Application No. 201480057011.1 with translation, 59 pages.

Office action in European patent application No. 14806778.8, dated Oct. 16, 2018 (8 pages).

Office action in European patent application No. 14796950.5, dated Oct. 10, 2018 (10 pages).

First Office Action for Chinese Patent Application No. 201480059435.1 dated Jan. 26, 2018, dated Jan. 26, 2018, with translation (36 pages).

Second Office Action for Chinese Patent Application No. 201480059435.1 dated Jul. 11, 2018 (15 pages).

International search report for PCT/US2014/062140, dated Apr. 30, 2015 (3 pages).

Written opinion for PCT/US2014/062140, dated Apr. 30, 2015 (6 pages).

Barigye, Stephen J. et al., "Relations Frequency Hypermatrices in Mutual, Conditional, and Entropy-Based Information Indices," Journal of Computational Chemistry, Wiley Online Library, www.c.chem.org, 2012.

Second Office Action dated Jun. 6, 2018 for Chinese Patent Application No. 201480057011.1, 16 pages.

Decision of rejection in Chinese patent application No. 201480057011.1, dated Dec. 28, 2018, including machine translations (21 pages).

* cited by examiner

METHODS, SYSTEMS AND COMPUTER PROGRAM PRODUCTS FOR USING A DISTRIBUTED ASSOCIATIVE MEMORY BASE TO DETERMINE DATA CORRELATIONS AND CONVERGENCE THEREIN

RELATED APPLICATIONS

The present application claims the benefit of U.S. Provisional Patent Application No. 61/904,835, filed Nov. 15, 2013, the disclosure of which is hereby incorporated herein by reference in its entirety.

FIELD OF THE INVENTION

This invention relates to knowledge management systems, methods and computer program products, and more particularly to associative memory systems, methods and computer program products.

BACKGROUND

Associative memories, also referred to as content addressable memories, are widely used in the field of pattern matching and identification, expert systems and artificial intelligence. A widely used associative memory is the Hopfield artificial neural network. Hopfield artificial neural networks are described, for example, in U.S. Pat. No. 4,660,166 to Hopfield entitled "Electronic Network for Collective Decision Based on Large Number of Connections Between Signals".

Although associative memories may avoid problems in prior back-propagation networks, associative memories may present problems of scaling and spurious memories. Recent improvements in associative memories have attempted to solve these and other problems. For example, U.S. Pat. No. 6,052,679 to coinventor Aparicio, I V et al., entitled "Artificial Neural Networks Including Boolean-Complete Compartments" provides a plurality of artificial neurons and a plurality of Boolean-complete compartments, a respective one of which couples a respective pair of artificial neurons. By providing Boolean-complete compartments, spurious complement memories can be avoided.

Unfortunately, there is a fundamental scaling problem that can limit the use of associative memories to solve real world problems. In particular, many associative memories scale geometrically as a function of the number of inputs. This geometric scaling may be unreasonable to support applications at the scale of complexity that warrants such technology. Scaling in associative memories is addressed in U.S. Pat. No. 6,581,049 to coinventor Aparicio, I V et al., entitled "Artificial Neurons Including Power Series of Weights and Counts That Represent Prior and Next Associations", and assigned to the assignee of the present invention, the disclosure of which is hereby incorporated herein by reference in its entirety as if set forth fully herein. As described in U.S. Pat. No. 6,581,049, an artificial neuron includes a plurality of inputs and a plurality of dendrites, a respective one of which is associated with a respective one of the plurality of inputs. Each dendrite comprises a power series of weights, and each weight in a power series includes an associated count for the associated power. By representing the weights as a power series, the geometric scaling as a function of input in conventional artificial neurons can be reduced to a linear scaling as a function of input. Large numbers of inputs may be handled using real world systems, to thereby solve real world applications.

SUMMARY

Some embodiments of the present invention are directed to associative memory systems that include a distributed associative memory base. The distributed associative memory base may include at least one network of networks of associative memory networks. A respective associative memory network includes associations among a respective observer memories and multiple observed memories that are observed by the respective observer memory. Ones of the associative memory networks are physically and/or logically independent from other ones of the associative memory networks. Embodiments include a processing system that is configured to observe associations into, and imagine associations from, the distributed associative memory base using multiple streaming queues that correspond to respective ones of multiple rows in the associative memory networks.

Some embodiments provide that ones of the streaming queues correspond to one of a plurality of physical locations in the associative memory networks. In some embodiments, the processing system further includes a query map that is configured to translate a semantic-space based query that is received from a user into a physical-space based query that is expressed as multiple row-based identifiers corresponding to multiple physical memory locations in the associative memory networks and that is included in at least one of the streaming queues.

Some embodiments include an ontology that is configured to be accessed by the query map to estimate taxonomic meanings corresponding to the semantic-space based query to provide query terms that correspond to a physical representation of the associative memory networks. In some embodiments, the query map includes at least one of multiple mapping policies that correspond to different ones of multiple query terms in the semantic-space based query and/or the physical-space based query. The mapping policies may define policies including rank and/or recency. The query map may modify the physical-space based query corresponding to the rank and/or recency policies.

In some embodiments, the query map is further configured to identify one or more variants of the query terms in the semantic-space based query and/or the physical-space based query and to expand the physical-space based query to include the one or more variants. Some embodiments provide that the one or more variants include synonyms, aliases and/or acronyms corresponding to ones of the query terms.

Some embodiments provide that the processing system includes multiple count server nodes that are configured to receive requests from the streaming queues and to provide count data that corresponds to associations in the distributed associative memory base responsive to the received requests. The processing system may include atom tables that are configured to provide a matrix row identification responsive to receiving a physical-space based query in a corresponding one of the streaming queues received by one of the count server nodes. The atom tables may bee further configured to provide reverse look-up data to associate returned results from the associative memory networks with the physical-space based query.

Some embodiments include a results controller that is configured to receive count data corresponding to the associations in the distributed associative memory base and to resynthesize the count data with semantic-space based namespace to provide results to a user. In some embodiments, the results controller is further configured to accumulate raw count data corresponding to ones of the streaming queues, to collapse related ones of multiple physical-space based query terms and corresponding raw count data using an ontology that was accessed by a query map, to rank order count data of collapsed physical-space based query terms, and to convert physical-space based results into semantic-space based results.

Some embodiments of the present invention include methods of querying a distributed associative memory base. Methods may include translating a semantic-space based query that is received from a user into a physical-space based query that is expressed as multiple row-based identifiers corresponding to multiple physical memory locations in at least one of multiple associative memory networks in the distributed associative memory base. Multiple query queues that correspond to the plurality of row-based identifiers may be generated. The query queues are streamed to multiple count server nodes that correspond to the associative memory networks. Count information is determined responsive to the query queues from the count server nodes. The count information from the plurality of count server nodes is translated into semantic-space based result information that is responsive to the semantic-space based query.

In some embodiments, translating a semantic-space based query includes, for each query term in the semantic-space based query, expanding the query term to include variants of the query term and the query term and determining if a taxonomic map that includes taxonomic terms that correspond to the query term exists. If the taxonomic map exists, the query term is expanded to include taxonomic terms and the query term.

Some embodiments provide that generating the query queues that correspond to the row-based identifiers includes, for each of the row-based identifiers, binding a queue resource to define a row queue. The queue resource includes one of multiple queue resources available to be bound to a row-based identifier.

In some embodiments, streaming the query queues to count server nodes includes mapping one or more of the query queues to a respective one of multiple node readers. Each of the node readers may correspond to a respective one of the count servers. Some embodiments provide that ones of the node readers are configured to perform batch requests that correspond to multiple ones of the query queues to respective ones of the count servers. Some embodiments provide that streaming the query queues to the count server nodes includes mapping the query queues to multiple node readers in a many-to-many interface between the query queues and the node readers.

In some embodiments, determining count information responsive to the query queues from the count server nodes includes determining, for ones of multiple query terms, a matrix identifier value that corresponds to matrix address data. Some embodiments provide that determining the matrix identifier value that corresponds to matrix address data includes determining atom table identification data to determine which of multiple atom table nodes includes the matrix identifier value, determining respective identification data corresponding to respective ones of the query terms, and converting the respective identification data into the matrix identifier.

In some embodiments, the atom table identification data is determined using a look-up operation. Some embodiments provide that the atom table identification data is determined using a computational method. Some embodiments include looking up a root page address of a root page of an encoded matrix that corresponds to the matrix identifier. The root page may include a matrix type value that identifies an encoding type of the encoded matrix.

In some embodiments, translating the count information includes accumulating raw count data from the query queues, collapsing previously expanded variants and taxonomic terms and respective counts of each query term in the physical-space based query and rank ordering collapsed query terms to provide relevance information of the query terms relative to one another corresponding to relative values of count data. The physical-space based query terms may be translated into semantic-space based query terms.

Some embodiments of the present invention include computer program products comprising a computer usable storage medium having computer-readable program code embodied in the medium. The computer-readable program code is configured to perform operations corresponding to methods described herein.

Some embodiments of the present invention include methods of using a distributed associative memory base. Such methods may include generating streaming query queues that correspond to a physical-space based query that is expressed as multiple row-based identifiers of multiple respective physical memory locations in at least one of multiple distributed associative memory networks. Ones of the streaming query queues may be mapped to multiple node readers that are operable to receive count information from multiple count server nodes that correspond to the distributed associative memory networks. The received count information is mapped back to corresponding ones of the streaming query queues.

Some embodiments of the present invention include associative memory methods that include providing a distributed memory base. The distributed memory base includes a network of associative memory networks, a respective associative memory network including associations among a respective observer entity and multiple observed entities that are observed by the respective observer entity, ones of the associative memory networks are physically and/or logically independent from other ones of the associative memory networks. Associations from the associative memory base are imagined using multiple streaming queues that correspond to ones of multiple rows of ones of the associative memory networks.

Some embodiments provide that imagining associations from the associative memory base includes translating a semantic-space based query that is received from a user into a physical-space based query that is expressed as multiple row-based identifiers corresponding to multiple physical memory locations in at least one of associative memory networks in the associative memory base and generating the streaming queues that correspond to the row-based identifiers.

In some embodiments, imagining associations from the associative memory base includes determining count information responsive to the streaming queues from multiple count server nodes that correspond to respective ones of associative memory networks in the associative memory base. Some embodiments provide that imagining associations from the associative memory base includes translating associative count information from the count server nodes into semantic-space based result information that is responsive to the semantic-space based query received from the user.

Some embodiments of the present invention include methods of encoding data in a large, sparse matrix that includes non-zero data locations that are identified by row identifier and column identifier values. According to such methods, spans of data locations in the matrix may be encoded using run length encoding to store runs of multiple data values that each have the same data value, as a data value and a count. Ones of non-zero data values are encoded using infinite integer encoding to compress variable length integer values that are adjacent at least one run of multiple data values that each having the same data value.

In some embodiments, encoding spans of data locations in the matrix using run length encoding includes reading fixed-length encoded matrix index words and for a given row identifier value, indexing continuous consecutive bits having zero value by providing encoded offset values in at least one fixed length encoded matrix index word.

Some embodiments provide that encoding ones of the non-zero values using infinite integer encoding includes reading variable word length non-zero data values from at least one fixed-length encoded matrix word and associating variable word length non-zero data values with corresponding column identifier values.

Some embodiments of the present invention include methods of encoding data in a large, sparse matrix that includes non-zero data locations that are identified by row identifier and column identifier values. Such methods may include reading fixed-length encoded matrix index words, for a given row in the sparse matrix, indexing continuous consecutive bits having zero value by providing encoded index offset values in at least one fixed-length encoded matrix index word and reading variable word length non-zero data values from at least one fixed-length encoded matrix index word. Methods may include reading variable word length non-zero data values from at least one fixed-length encoded matrix index word and associating variable word length non-zero data values with corresponding column identifiers.

Some embodiments of the present invention include methods of querying a distributed associative memory base. Such methods may include translating a semantic-space based query that includes at least one query search element and that is received from a user into a physical-space based query that is expressed as multiple row-based identifiers corresponding to multiple physical memory locations in at least one of multiple associative memory networks in the distributed associative memory base. Methods may include generating multiple query queues that correspond to the row-based identifiers, streaming the query queues to multiple count server nodes that correspond to the associative memory networks, and determining count information responsive to the query queues from the count server nodes. Methods may include computing information distances between a query search element and ones of associative memory query result elements to determine closeness values corresponding to the information distances and translating the count information from the plurality of count server nodes into semantic-space based result information that is responsive to the semantic-space based query.

In some embodiments, the query search element comprises a first query term that includes a category:value pair that identifies a first category and a first member of the first category and a second query term that includes a second category. Some embodiments provide that computing the information distances includes identifying multiple second members in the second category that have an association with the first member. Count values corresponding to a quantity of associations between ones of the second members and the first member may be identified. An independent first member count value corresponding to the first member of the first category may be identified and independent second member count values corresponding to ones of the second members may be identified. A total quantity of observations in the distributed associative memory base may be identified.

Some embodiments provide that identifying the independent first member count value, the independent second member count values and the total quantity of observations includes reading via one of the query queues a total quantity of observations row in the associative memory networks. In some embodiments, the second members in the second category that have an association with the first member are co-local within the distributed associative memory base. Some embodiments provide that the second members in the second category that have an association with the first member are globally sorted.

In some embodiments, the independent first member count value includes a single value used in computing the ones of the information distances. Some embodiments provide that the total quantity of observations includes a single value used in computing the ones of the information distances. In some embodiments, identifying count values corresponding to a quantity of associations between ones of the second members and the first member is performed via a first one of the query queues and that identifying independent second member count values corresponding to ones of the second members is performed via a second one of the query queues responsive to identifying ones of the quantity of associations between ones of the second members and the first member.

Some embodiments include sorting ones of the associative memory query results based on the information distances between the ones of the associative memory results and the query search term.

Some embodiments of the present invention are directed to a computer program product including a computer usable storage medium having computer-readable program code embodied in the medium. The computer-readable program code includes computer-readable program code that is configured to generate multiple query queues that correspond to multiple row-based identifiers corresponding to multiple physical memory locations in at least one of multiple associative memory networks in response to a semantic-space based query that includes at least one query search element. The computer-readable code may also determine count information responsive to the query queues and compute information distances between the at least one query search element and ones of associative memory query result elements to determine closeness values corresponding to the information distances.

Some embodiments include computer-readable code that is configured to sort ones of the associative memory query results based on the information distances between the ones of the associative memory results and the query search term.

In some embodiments, the query search element includes a first query term that includes a category:value pair that identifies a first category and a first member of the first category and a second query term that includes a second category.

In some embodiments, the computer-readable code that is configured to compute the information distances includes computer-readable code that is configured to identify multiple second members in the second category that have an association with the first member, identify count values corresponding to a quantity of associations between ones of the second members and the first member, identify an independent first member count value corresponding to the first member of the first category, identify independent second member count values corresponding to ones of the second members, and identify a total quantity of observations in the distributed associative memory base.

Some embodiments provide that the computer-readable code that is configured to identify the independent first member count value, the independent second member count values and the total quantity of observations includes computer-readable code that is configured to read via one of the query queues a total quantity of observations row in the associative memory networks.

Some embodiments provide that the second members in the second category that have an association with the first member are globally sorted.

In some embodiments, the independent first member count value includes a single value used in computing the ones of the information distances.

Some embodiments provide that the total quantity of observations includes a single value used in computing the ones of the information distances.

In some embodiments, the computer-readable code that is configured to identify count values corresponding to a quantity of associations between ones of the second members and the first member is performed via a first one of the plurality of query queues, and the computer-readable code that is configured to identify independent second member count values corresponding to ones of the second members is performed via a second one of the query queues responsive to identifying ones of the quantity of associations between ones of the plurality of second members and the first member.

Some embodiments of the present invention are directed to methods of using a distributed associative memory base. Such methods may include generating multiple streaming query queues that correspond to a physical-space based query that is expressed as multiple row-based identifiers of a respective multiple physical memory locations in at least one of multiple distributed associative memory networks, mapping ones of the streaming query queues to multiple node readers that are operable to receive count information from multiple count server nodes that correspond to the distributed associative memory networks, and mapping the received count information back to corresponding ones of the streaming query queues. Methods may include determining a correlation between a query search element and ones of the associative memory query result elements.

In some embodiments, determining the correlation includes computing information distances between the query search element and ones of the associative memory query result elements to determine closeness values corresponding to the information distances.

Some embodiments include determining a convergence value between the query search element and ones of the associative memory query result elements. Some embodiments provide that determining the convergence value includes computing information distances at different times to determine a rate of change of the information distances.

Some embodiments of the present invention are directed to an associative memory system that includes a distributed associative memory base including a network of networks of associative memory networks, a respective associative memory network including associations among a respective observer memories and multiple observed memories that are observed by the respective observer memory, ones of the associative memory networks are physically and/or logically independent from other ones of the associative memory networks. Such systems may include a processing system that is configured to observe associations into and imagine associations from, the distributed associative memory base using multiple streaming queues that correspond to respective ones of multiple rows in the associative memory networks. In some embodiments, the processing system is configured to determine a cognitive distance between two terms that are returned responsive to a query of the distributed associative memory base.

Some embodiments provide that the system includes a processor and a memory that includes instructions that, when executed, cause the processor to generate multiple query queues that correspond to multiple row-based identifiers corresponding to multiple physical memory locations in at least one of multiple associative memory networks in response to a semantic-space based query that includes at least one query search element, determine count information responsive to the query queues, and compute information distances between the at least one query search element and ones of associative memory query result elements to determine closeness values corresponding to the information distances.

Some embodiments are directed to methods of querying a distributed associative memory base. Methods may include translating a semantic-space based query that includes at least one query search element and that is received from a user into a physical-space based query that is expressed as a plurality of row-based identifiers corresponding to multiple physical memory locations in at least one of multiple associative memory networks in the distributed associative memory base. Multiple query queues that correspond to the plurality of row-based identifiers may be generated. The query queues may be streamed to multiple count server nodes that correspond to the associative memory networks. Count information may be determined responsive to the query queues from the count server nodes and information distances between a query search element and ones of multiple associative memory classes are computed to determine closeness values corresponding to the information distances. The count information from the count server nodes is translated into semantic-space based result information that is responsive to the semantic-space based query.

In some embodiments, computing the information distances includes generating multiple associative memory class matrices corresponding to respective ones of the associative memory classes. Some embodiments provide that ones of the associative memory class matrices each correspond to a class:value. In some embodiments, ones of the associative memory class matrices correspond to a single value class, wherein the single value class includes only a single one of the associative memory matrices. Some embodiments provide that ones of the associative memory class matrices correspond to a complimentary value class and that the complimentary value class includes a first one of the associative memory matrices corresponding to a first value of the complimentary value class and a second one of the associative memory matrices corresponding to a second value of the complimentary value class. Some embodiments provide that the second value is a compliment of the first value.

In some embodiments, ones of the associative memory class matrices include elements therein that are pairwise coincidences between attributes that are conditional to the class:value. Some embodiments provide that the query search element includes a case vector including a category and multiple values corresponding to the category and that values in the case vector are used to identify associations in corresponding ones of the associative memory class matrices. Some embodiments provide that the identified associations represent connections and counts in the ones of the associative memory classes corresponding to similar experience that is represented by the case vector. In some embodiments, computing the information distances includes computing a mutual information corresponding to the identified associations responsive to a new case vector.

In some embodiments, the query search element includes a case vector including a category and a plurality of values corresponding to the category, the values in the case vector are used to identify associations in corresponding ones of the associative memory class matrices that include associative memory counts, and computing the information distances further comprises calculating a frequency from the associative memory counts by dividing the corresponding count value by the quantity of observations corresponding to the class:value.

Some embodiments include comparing the information distances between the query search element and ones of the associative memory classes to estimate data corresponding to a classification on the query search element. Some embodiments provide that computing information distances includes computing the information distances for each of the ones of the associative memory classes to a case vector. Some embodiments provide that the case vector defines at least one row and at least one column of a relevant one of the associative memory classes. In some embodiments, the case vector includes attributes that each define a row within ones of matrices corresponding to the associative memory classes. Some embodiments include streaming each row from a row server to a classification aggregator. The streaming may include a column identifier and count for ones of the attributes in the case vector. Some embodiments include aggregating the column identifiers and counts for each of the associative memory classes to generate a distance of each class relative to the query search element.

In some embodiments, the query search element includes a case vector including a category and a plurality of values corresponding to the category and the associative memory classes include at least one class value. Some embodiments provide that computing the information distances further includes generating a frequency table that includes multiple frequencies corresponding to the associative pairs.

Some embodiments of the present invention are directed to methods of using a distributed associative memory base. Such methods may include generating multiple streaming query queues that correspond to a physical-space based query that is expressed as multiple row-based identifiers of respective multiple physical memory locations in at least one of multiple distributed associative memory networks. Methods may include mapping ones of the streaming query queues to multiple node readers that are operable to receive count information from multiple count server nodes that correspond to the distributed associative memory networks. Some embodiments include mapping the received count information back to corresponding ones of the streaming query queues and determining a classification value between a query search element and ones of multiple associative memory classes.

In some embodiments, determining the classification includes computing information distances between the query search element and ones of the associative memory classes.

Some embodiments of the present invention are directed to associative memory systems that include a distributed associative memory base including a network of networks of associative memory networks, a respective associative memory network including associations among a respective observer memories and multiple observed memories that are observed by the respective observer memory. Some embodiments provide that ones of the associative memory networks are physically and/or logically independent from other ones of the associative memory networks. The systems may include a processing system that is configured to observe associations into and imagine associations from, the distributed associative memory base using multiple streaming queues that correspond to respective ones of multiple rows in the associative memory networks. Some embodiments provide that the processing system is further configured to determine a cognitive distance between a term and a class of terms. The cognitive distance may be returned responsive to a query of the distributed associative memory base.

In some embodiments, the multiple observed memories include multiple associative class memories that each correspond to an associative memory that corresponds to a value of a corresponding class. Ones of the associative class memories are each associated with a corresponding class:value.

Some embodiments provide that the cognitive distance is determined using multiple associative memory class matrices that correspond to respective ones of multiple associative memory classes. In some embodiments, ones of the associative memory class matrices each correspond to a class:value. Some embodiments provide that ones of the associative memory class matrices correspond to a single value class and that the single value class includes only a single one of the associative memory matrices.

In some embodiments, ones of the associative memory class matrices correspond to a complimentary value class that includes a first one of the associative memory matrices corresponding to a first value of the complimentary value class and a second one of the associative memory matrices corresponding to a second value of the complimentary value class that is a compliment of the first value.

Some embodiments provide that ones of the associative memory class matrices include elements therein that are pairwise coincidences between attributes that are conditional to the class:value. Some embodiments provide that the term comprises a case vector including a category and a plurality of values corresponding to the category and that the values in the case vector are used to identify associations in corresponding ones of the associative memory class matrices. Some embodiments provide that identified associations represent connections and counts in the ones of the associative memory classes corresponding to similar experience that is represented by the case vector. In some embodiments, the cognitive distance is determined by computing a mutual information corresponding to the identified associations responsive to a new case vector.

In some embodiments, the term comprises a case vector including a category and a multiple values corresponding to the category. Some embodiments provide that values in the case vector are used to identify associations in corresponding ones of the associative memory class matrices that include associative memory counts. In some embodiments, the processing system is further configured to calculate a frequency from the associative memory counts by dividing the corresponding count value by the quantity of observations corresponding to the class:value. In some embodiments, the processing system is further configured to compare the information distances between the term and ones of the associative memory classes to estimate data corresponding to a classification on the term.

Some embodiments provide that the processing system is further configured to generate a frequency table that includes multiple frequencies corresponding to the associative pairs that are identified responsive to the query.

Some embodiments of the present invention include computer program products including a computer usable storage medium having computer-readable program code embodied in the medium. The computer-readable program code is configured to perform operations corresponding to the methods and/or systems described herein.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

DETAILED DESCRIPTION

Figure 1:
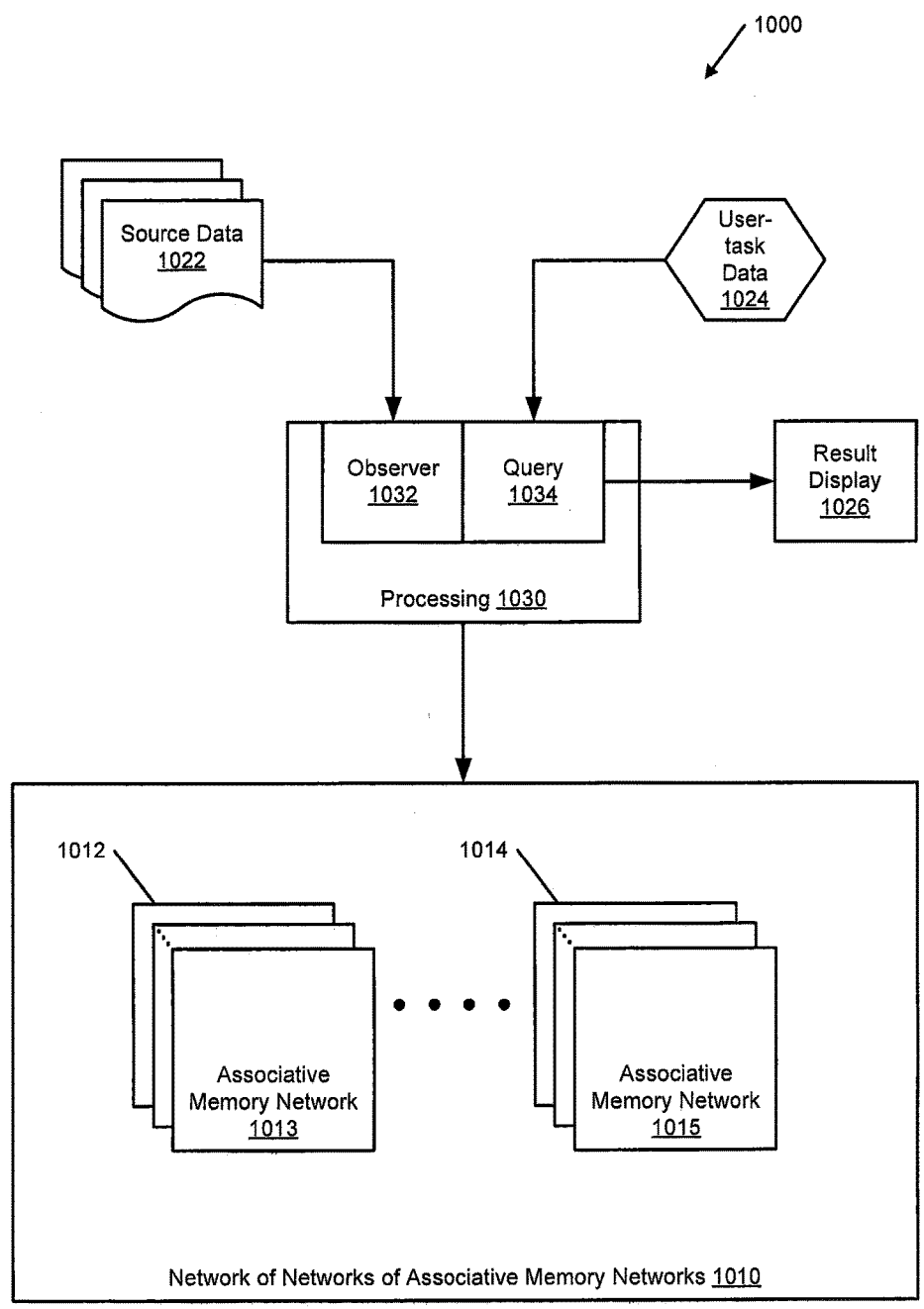
FIG. 1 is a block diagram of associative memory systems, methods and/or computer program products according to various embodiments of the present invention.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and flow charts of methods, systems and computer program products according to embodiments of the invention. It will be understood that a block of the block diagrams or flow charts, and combinations of blocks in the block diagrams or flow charts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flow charts provides support for methods, computer program products and/or systems (structural and/or means-plus-function).

It should also be noted that in some alternate implementations, the functions/acts noted in the flow charts may occur out of the order noted in the flow charts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

Some embodiments described herein provide associative memory systems that include a distributed associative memory base. The distributed associative memory base may include at least one network of networks of associative memory networks. Some embodiments provide that a respective associative memory network may include associations among respective observer agents and multiple observed agents that are observed by the respective observer agent. Ones of the associative memory networks may be physically and/or logically independent from other ones of the associative memory networks.

Some embodiments further include a processing system that is configured to observe associations into, and imagine associations from, the distributed associative memory base using multiple streaming queues that correspond to ones of multiple rows in the associative memory networks. As used herein, streaming refers to a characteristic wherein a succession of queues are generated, transmitted, processed and/or received over time.

Some embodiments provide methods of querying a distributed associative memory base. Such methods may include translating a semantic-space based query that is received from a user into a physical-space based query that is expressed as multiple row-based identifiers corresponding to multiple physical memory locations in at least one of multiple associative memory networks in the distributed associative memory base. As described herein, a user may include a person, organization, application and/or hardware device that is capable of generating and/or transmitting a query and/or receiving and/or transmitting results of a query. Some embodiments include generating multiple query queues that correspond to the row-based identifiers and streaming the row-based identifiers to a multiple count server nodes that correspond to the associative memory networks.

Some embodiments include determining count information responsive to the row-based identifiers from the node servers and translating the count information from the node servers into semantic-space based result information that is responsive to the semantic-space based query.

Some embodiments of the present invention include methods of using a distributed associative memory base. Such methods may include generating a plurality of streaming query queues that correspond to a physical-space based query that is expressed as multiple row-based identifiers of respective multiple physical memory locations in at least one of multiple distributed associative memory networks. Some embodiments include mapping ones of the streaming query queues to multiple node readers that are operable to receive count information from multiple count server nodes that correspond to the distributed associative memory networks. Methods may further include mapping the received count information back to corresponding ones of the streaming query queues.

Some embodiments may include associative memory methods that include providing a distributed memory base that includes a network of networks of associative memory networks. Such networks may include a network of associative memory networks, such that a respective associative memory network may include associations among a respective observer entity and multiple observed entities that are observed by the respective observer entity. In some embodiments, ones of the associative memory networks are physically and/or logically independent from other ones of the associative memory networks. Some embodiments include imagining associations from the associative memory base using multiple streaming queues that correspond to ones of multiple rows of ones of the associative memory networks.

Some embodiments of the present invention including methods of encoding data in a large sparse matrix. Such methods may include providing a sparse matrix that includes non-zero data locations that are identified by row identifier and column identifier values and reading fixed-length encoded matrix index words. Some embodiments include, for a given row in a sparse matrix, indexing continuous consecutive cells, counts and/or bits having zero value by providing encoded index offset values having variable word lengths in at least one fixed-length encoded matrix index word. Additionally, variable word length non-zero data values may be read from at least one fixed-length encoded matrix index word and the variable word length non-zero data values may be associated with corresponding column identifiers.

As disclosed herein, embodiments of the present invention may result in computational efficiencies and improvements that are previously unavailable using conventional technologies. For example, a distributed associative memory base may be used to compute information distances between a query search element and ones of a plurality of associative memory classes to determine closeness values corresponding to the information distances Although examples of operations for encoding data are provided herein, the architecture described herein may be open to many different types of encoding operations that may be used in isolation and/or combination with one another. For example, any one or more of many sparse matrix methods may be applicable in embodiments described herein. In some embodiments, more than one type of encoding may be used in combination to address different characteristics that may occur in different matrices in the associative memory base. In this regard, different input-output mapping demands corresponding to different matrix characteristics may be addressed. In this manner, the architecture described herein is not limited to a specific encoding and thus may provide flexibility regarding the different matrix and/or memory characteristics.

Reference is made to FIG. 1, which is a block diagram of associative memory systems, methods and/or computer program products according to various embodiments of the present invention. As shown in FIG. 1, associative memory systems, methods and/or computer program products 1000 according to various embodiments of the present invention include an associative memory base 1010 that includes a network of networks 1012, 1014 of associative memory networks 1013, 1015. Although illustrated for exemplary purposes as two networks 1012, 1014, of associative memory networks 1013, 1015, embodiments herein may include one and/or more than two networks 1012, 1014 of associative memory networks 1013, 1015. A respective associative memory network 1013, 1015 includes therein associations and/or frequency thereof among a plurality of observed entities for a respective observer.

Still referring to FIG. 1, a processing system, method and/or computer program product 1030 is provided. The processing system, method and/or computer program product 1030 is configured to observe (read) associations into, and imagine (query) associations from, the network of networks 1012, 1014 of associative memory networks 1013, 1015 in the associative memory base 1010. The processing system, method and/or computer program product 1030 includes an observer system, method and/or computer program product 1032 and a query system, method and/or computer program product 1034. The observer system, method and/or computer program product 1032 is configured to observe into a respective network 1012, 1014 of associative memory networks 1013, 1015 the associations among a respective observer entity and a plurality of observed entities that are observed by the respective observer entity. The query system, method and/or computer program product 1034 is configured to imagine associations of entities, users and/or events from the respective network 1012, 1014 of associative memory networks 1013, 1015 in response to user queries. Results of user queries may be configured for display by a result display 1026.

Each of the respective associative memory networks 1013, 1015 may be decentralized from one another physically and/or logically. In some embodiments, respective associative memory networks 1013, 1015 may each be implemented on more than one physical device. Some embodiments provide that respective associative memory networks 1013, 1015 may each be implemented on the same physical device that includes logically different devices. In this regard, as the associative memory base 1010 may scale linearly or almost linearly, and thereby allow large networks of associative memories to be provided.

Figure 2:
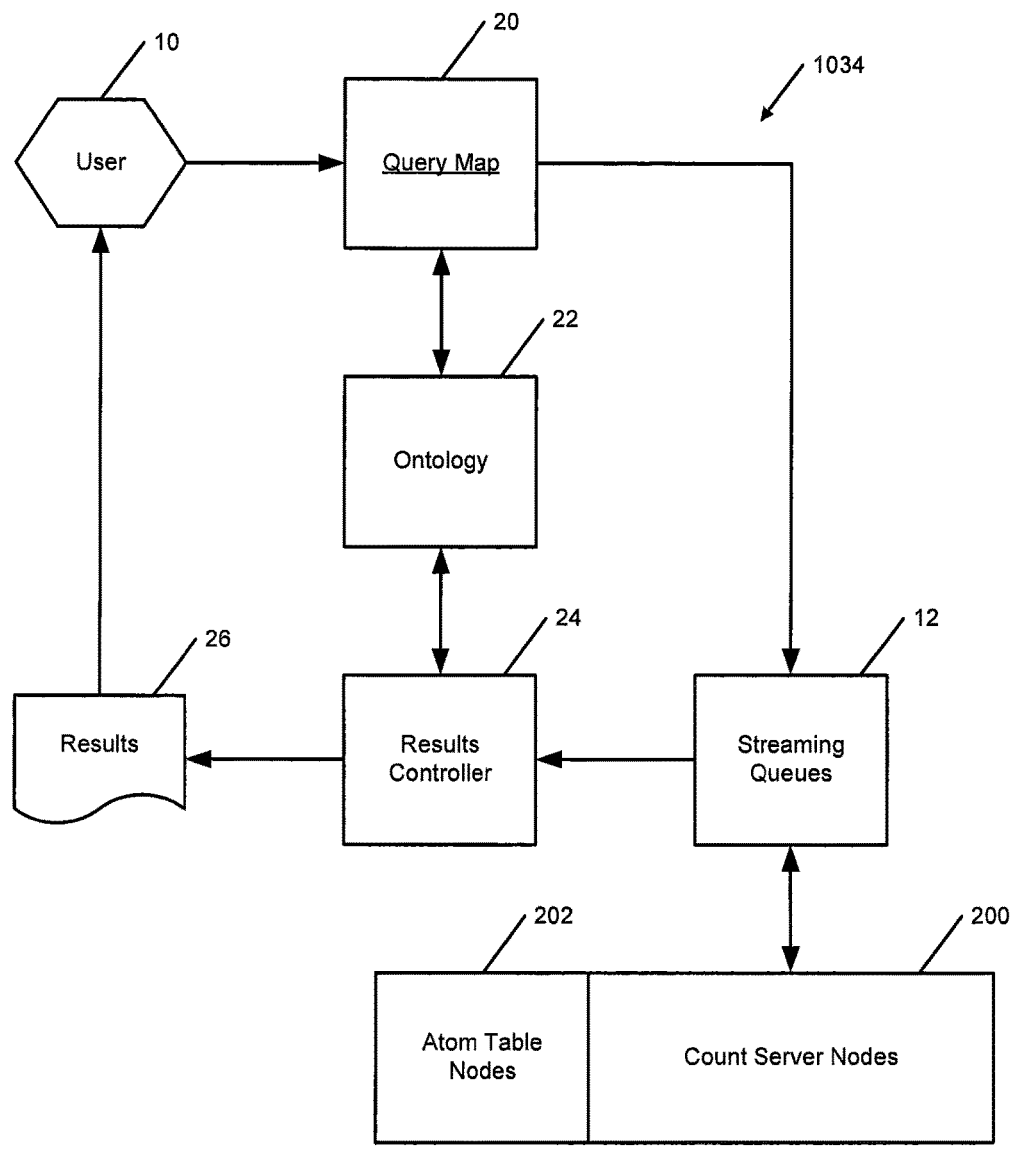
FIG. 2 is a flow chart illustrating a query overview for querying an associative memory base according to some embodiments of the present invention.

Reference is made to FIG. 2, which is a flow chart illustrating a query overview for querying 1034 an associative memory base 1010, as described above regarding FIG. 1, according to some embodiments of the present invention. A query as described herein may be performed by a system and/or computer program product, in conjunction with an associative memory base as described herein. A user 10 submits a user query in terms of a user space that may include semantic, vocabulary, language, nomenclature and/or taxonomy characteristics that may be specific to and/or typical of a user and/or a class of users.

A query map 20 receives the user query and maps the query expression to a physical representation of the associative memory base. Stated differently, the query map 20 may translate a query from user space to physical space that corresponds to the associative memory base. In this manner, the user space or user ontology is mapped down to the space corresponding to what is physically stored. For example, the user ontology may be mapped down to specific ones of the associative memories, matrices, rows, columns and/or margins thereof.

Some embodiments provide a mapping that may use an ontology 22 to determine taxonomic meanings of the user query in terms that are consistent with the physical representation of the associative memory base. In some embodiments, mapping may include determining variants of terms in the user query. Examples of variants may include synonyms, aliases, and/or acronyms corresponding to terms in the user query. Some embodiments provide that mapping may include applying mapping policies corresponding to different ones of the query terms. In some embodiments, mapping policies may provide policies regarding rank order and/or recency, among others. For example, where the query terms include a temporal dimension, mapping policies may provide that more recent information has more relevance. In this manner, mapping policies may provide information on the semantic use of the query terms.

Once the query is mapped into physical space, the query is expressed as a series of queues corresponding to multiple requests for count information from multiple physical locations in the specific ones of the associative memories, matrices, rows, columns and/or margins thereof. Some embodiments provide that the series of queues may be streamed 12 such that each queue may correspond to a request for count information from a specific row of a specific matrix in a specific associative memory. By providing a streaming flow of data, the full control of the query may be realized such that the system is not overwhelmed by data amounts that otherwise may significantly exceed typical buffer sizes. In this manner, a fast and flexible implementation of a massive scale associative memory base may be provided.

A plurality of count server nodes 200 may receive requests corresponding to the streaming queues 12 and provide count information in response thereto. In some embodiments, the count server nodes 200 may correspond to specific ones of the associative memories that may be independently located relative to one another. For example, in some embodiments, a count server node 200 may be provided for each of the associative memories. In this manner, the associative memory base may provide an associative memory network that may be implemented with virtually limitless growth and data capacity without overwhelming communication, processing and/or storage hardware resources.

An atom server may be operable to include and/or access atom table nodes 202 that can be used to map a single category:value to a row in a matrix. The location of the atom table node 202 may be used to support a reverse look-up so that the returned results from the query may be associated with the category:value in the original query.

After the count information is received from the count server nodes, a results controller 24 is operable to access the ontology 22 and resynthesize the physical language count information back to the user language. In some embodiments, the results controller 24 may collate and organize the count information according to the mapping policies. Results 26 may be presented to the user 10 and may be in a metric space that may capitalize on the transactional frequency data corresponding to the counts.

Figure 3:
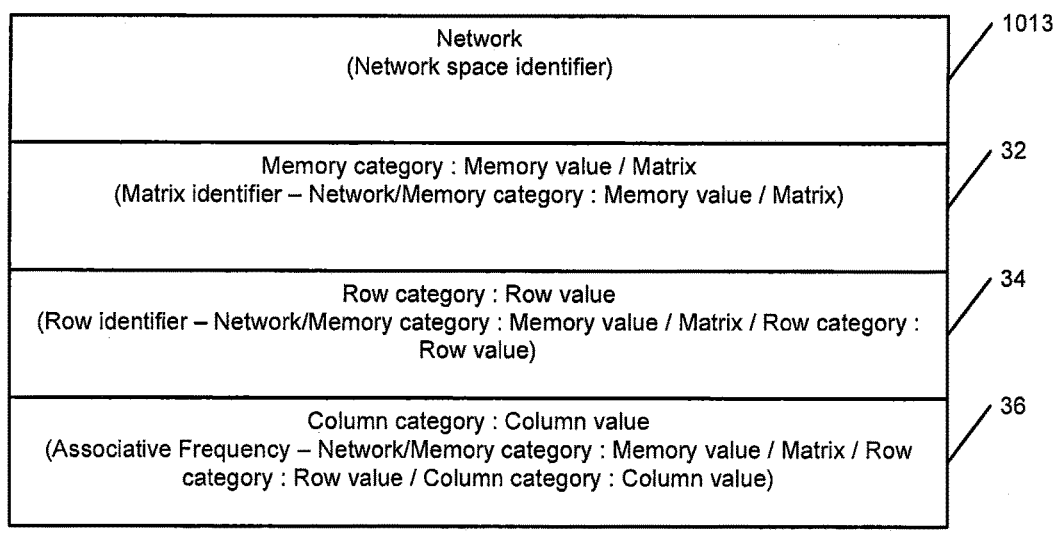
FIG. 3 is a block diagram illustrating a physical namespace hierarchy of an associative memory base according to some embodiments of the present invention.

Reference is now made to FIG. 3, which is a block diagram illustrating a physical namespace hierarchy of an associative memory base 1010 according to some embodiments of the present invention. The top level of the hierarchy in the physical namespace includes a network identifier 30 corresponding to each of the networks 1013, 1015 of associative memory networks. In some embodiments, the associative memory base may include many networks 1013, 1015, which may be located, created, administered, populated and/or originated independent of one another. Each network 1013 is further partitioned in terms of memories. In particular, as used herein, attributes for partitioning networks 1013 may be identified by a category:value ordered pair. For example, a partition corresponding to a particular memory may be identified using an ordered pair that defines memory as the category and a memory value as the value. In this manner, for example, a partition corresponding to a person named John may be identified as "person:John".

In some embodiments, each memory may include multiple associative memories and/or matrices, which may include specific identifiers. Some embodiments provide that some memories may only include a single associative memory and/or matrix. In such embodiments, a single associative memory and/or matrix may be identified consistently among the memories using an identifier such as "default", among others.

Within each memory, a row within a matrix may be identified using the category:value ordered pair concept discussed above regarding memories. For example, a row corresponding to the city of London may be identified as "place:London". Some embodiments herein provide that the identification of a specific row within a specific matrix in a specific network may be used to represent a query term. In this manner, the corresponding count server node may receive, as an input, a query including a term that is identified as "Network/Memory category:Memory value/Matrix/Row category:Row value."

In response, the count server node 200 may provide corresponding column information in the form of the aforementioned category:value identification. In this regard, a specific cell in the memory may be identified as "Network/Memory category:Memory value/Matrix/Row category:Row value/Column category:Column value" and may include a count value that represents the particular associative frequency corresponding to the semantic association between the agent, row and column attributes. For example, a value stored in the cell identified in the physical namespace as "Network/place:London/Default/Person:John/Activity:banking" would represent the number of times the memory (place) London observed person John conducting banking activities. In this regard, the association between the row and column (John and banking) is observed from the perspective of the memory (London). Accordingly, a row-based query may be used to determine the frequency of association that represents the number of counts in the triple association between the memory, row and column.

By determining the associative frequency, events and/or associations may be evaluated using statistical processes in addition to semantic reporting. For example, weighting, relevancy, entropy ranked and/or recency may be determined and/or used to provide analysis of the frequency of the triple association. In this manner, analyzing the associations using experiences provides significantly greater analytical value than merely storing and/or reporting that the relationships exist.

Figure 4:
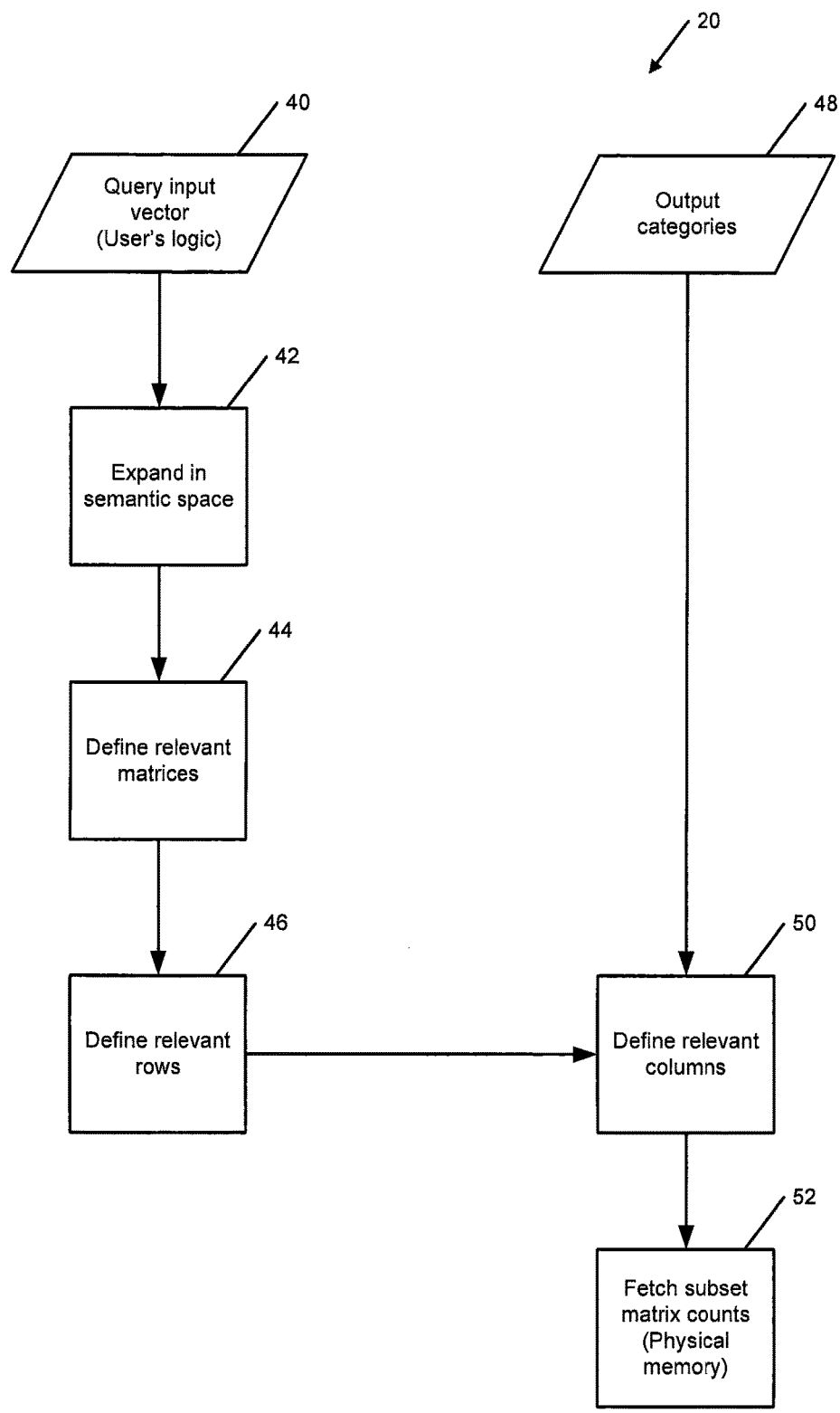
FIG. 4 is a flow chart illustrating an overview of a query map operation 20, as described above regarding FIG. 2, according to some embodiments of the present invention.

Reference is now made to FIG. 4, which is a flow chart illustrating an overview of a query map operation 20, as described above regarding FIG. 2, according to some embodiments of the present invention. The user's logic is received as a query input vector 40, which may be a set of terms provided by the user. The query input vector is expanded into semantic space to represent the physical name space that corresponds to the namespace of the physical memory of the associative memory base (block 42). The expansion may be performed using the ontology 22, as described above regarding FIG. 2 and may generate an attribute vector that may be used to define relevant matrices (block 44). Stated differently, ones of the matrices that have some memory/knowledge of attributes in the attribute vector may be defined. In this manner, the physical structures that include information relevant to the query may be identified.

Relevant rows with information corresponding to other ones of the query terms may be defined (block 46). In this manner, physical location of the rows within each of the defined matrices that include information corresponding other ones of the query terms are identified. For example, in the case of an attribute vector including query terms corresponding to "person:John", "place:London", and "activity:banking" may define a relevant matrix corresponding to "person:John" and relevant rows corresponding to "place:London" and "activity:banking". Accordingly, streaming queues corresponding to each of the defined rows may be processed as inputs to the count server nodes 200 described above regarding FIG. 2. For example, one of the streaming queues may provide an input defined as "Network1/person:John/Default/place:London" and another one of the streaming queues may provide an input defined as "Network1/person:John/Default/activity:banking".

An output category 48 may be provided to define relevant columns corresponding to the query terms in the attribute vector (block 50). In this manner, the physical locations within the memory base of knowledge corresponding to the query terms in the attribute vector are specifically identified. Some embodiments provide that the namespace of the physical locations may be translated and/or resolved into integer indices. In some embodiments, the translation and/or resolution of the namespace identifiers into integer indices may be performed independently at each level of the hierarchical namespace structure.

Once each of the physical memory locations corresponding to the row/column identifications are defined, the subsets of matrix counts corresponding to those physical memory locations are fetched (block 52). As a row-based organizational approach may be used, the partitioning is based on namespace. In this regard, the partitions may provide a manageable data quantity that may be processed via the streaming queues. Additionally, some embodiments provide for a variable data distribution strategy that may provide, for example, memory routing vs. row routing in the case where a memory is particularly small. The variable distribution strategy may consider a memory size and adapt the routing responsive thereto.

Figure 5:
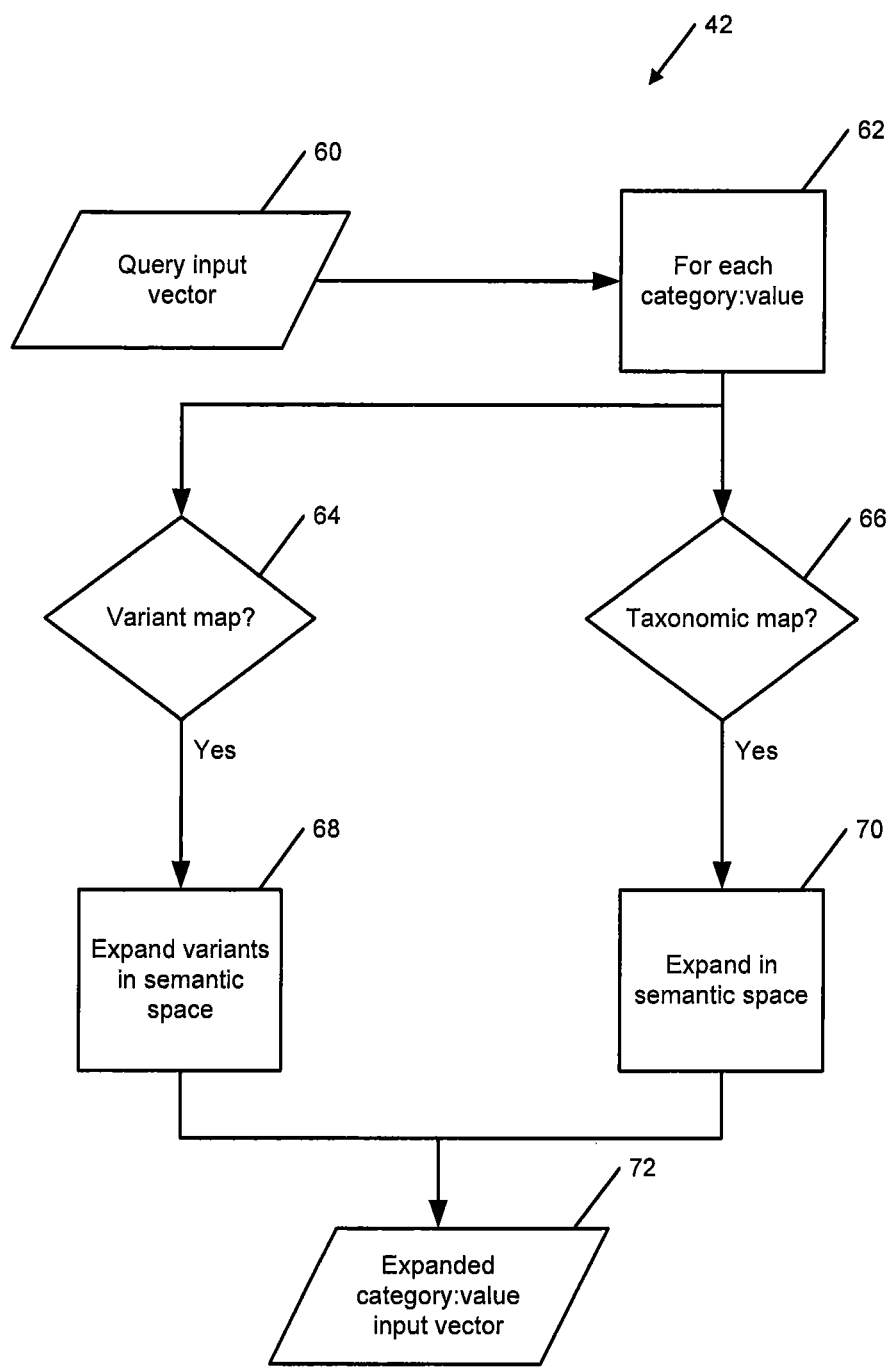
FIG. 5 is a flow chart illustrating operations corresponding to expanding semantic space 42, as described above regarding FIG. 4, according to some embodiments of the present invention.

Reference is now made to FIG. 5, which is a flow chart illustrating operations corresponding to expanding semantic space 42, as described above regarding FIG. 4, according to some embodiments of the present invention. Expanding semantic space 42 includes, for each category:value 62 in a query input vector 60, determining if a taxonomy exists for the attribute, generating a taxonomic map (block 66), determining variants and generating a variant map (block 64).

Some embodiments provide that a variant map may provide a query expansion to include attributes corresponding to different spellings, acronyms, abbreviations, etc. In some embodiments, taxonomic maps may provide a query expansion that provides a controlled expansion of the attribute vocabulary. For example, a taxonomic map corresponding to the attribute "January" may include "winter", "$1^{st}$ month", and/or "cold", among others. Similarly, a taxonomic map corresponding to the attribute "truck" may include "vehicle", "cargo", and/or "Mack", among others.

In some embodiments, an expansion according to taxonomy may provide additional attributes that increase and/or decrease in level of abstraction. In some embodiments, the taxonomic mapping may operate similar to a thesaurus function in that the attribute may be expanded to include synonyms. Some embodiments provide that the taxonomic mapping may provide all nouns and verbs corresponding to the query attribute.

If variant maps and taxonomic maps are generated corresponding to the query attribute, each of these query attributes are expanded, respectively (blocks 68 and 70). Some embodiments provide that a hierarchical taxonomic structure may be provided to supplement and/or replace a query attribute. The query input vector is then expanded to include the variant and/or taxonomic expansions (block 72). In this manner, the query input vector is, now provided as an expanded attribute vector expressed in expanded physical namespace.

Figure 6:
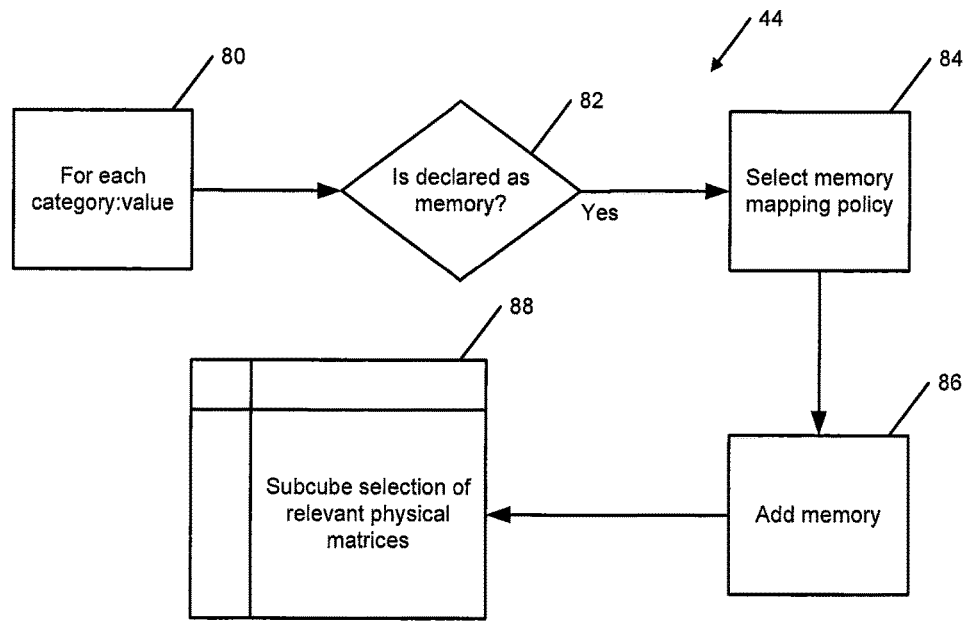
FIG. 6 is a flow chart illustrating operations corresponding to defining relevant matrices 46 of the expanded attribute vector, as described above regarding FIG. 4, according to some embodiments of the present invention.

Reference is now made to FIG. 6, which is a flow chart illustrating operations corresponding to defining relevant matrices 46 of the expanded attribute vector, as described above regarding FIG. 4, according to some embodiments of the present invention. For each category:value 80, operations determine if the category:value is declared as a memory (block 82). If the category:value is declared as a memory, then a corresponding memory mapping policy may be selected (block 84).

The memory mapping policy may be operable to define how many matrices, if more than one, are included for the memory. For example, the simplest mapping policy may define that the memory includes a single matrix. In some embodiments, a memory mapping policy may provide semantics that define multiple matrices and/or memories as a function of one or more characteristics, such as temporal divisions. For example, a time slicing semantic may provide that a new matrix is generated/provided for each predefined temporal unit, such as an hour, day, week, month, quarter, season and/or year, among others. In this manner, steady state system performance may be achieved since the matrices corresponding to specific time slices may not continue to grow beyond a manageable scale and may provide steady state ingestion of retrieved information. In some embodiments, the memory mapping policy may define a recency bias corresponding to time sliced matrices. For example, more recent data may be more relevant, interesting, important and/or compelling than less recent data. In this regard, information from time sliced matrices may be independently weighted to provide greater weight to more recent data and less weight to less recent data. In some embodiments, weighting the matrix data may be performed on the counts as they are retrieved from the matrix such that the counts that are received corresponding to the streaming queues include the weighting. Some embodiments provide that the weighting may be performed on the count data after the results are received from the streaming queues.

Some embodiments provide that a memory mapping policy may include a capacity-based policy such that a maximum matrix size may be defined to achieve an objective of containing the matrix dimensions to as small as reasonably possible. For example, a memory mapping policy may be physically defined for system performance based on advantages of knowing matrix dimensional limits. Although a time slicing semantic, as discussed above, may naturally achieve that objective as well, some data may not be temporally based and thus time slicing may be inapplicable for defining a matrix dimensional limitation.

Based on the memory mapping policy, one or more memories/matrices are added (block 86) to provide a subcube selection of the relevant physical matrices corresponding to each category:value declared as a memory (block 88).

Figure 7:
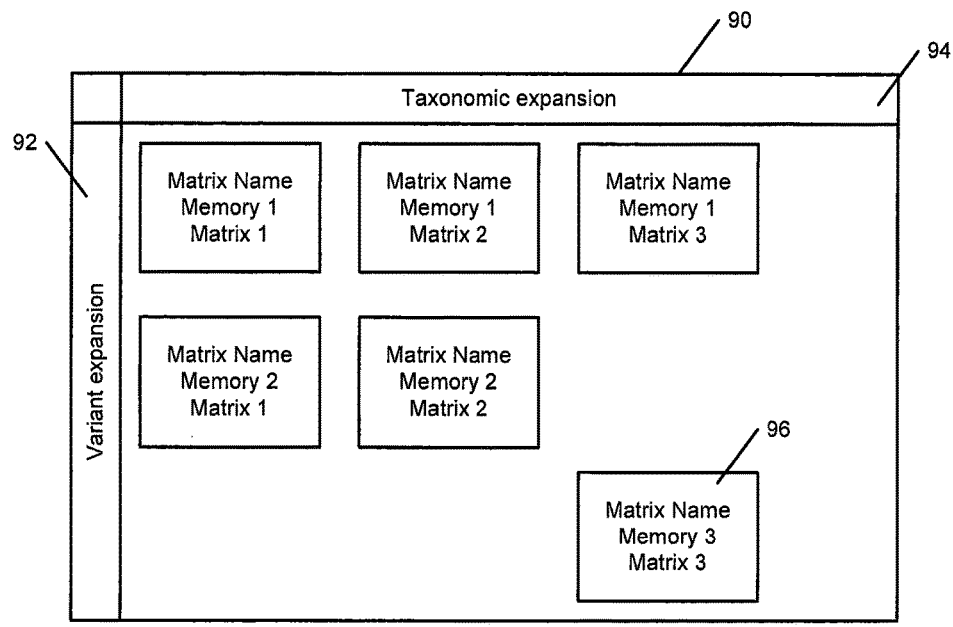
FIG. 7 is a block diagram illustrating an expanded subcube of selected matrices, as discussed above regarding FIG. 6, in accordance with some embodiments of the present invention.

Reference is now made to FIG. 7, which is a block diagram illustrating an expanded subcube of selected matrices of the associative memory base 1010 as described in FIG. 1 and as discussed above regarding FIG. 6, in accordance with some embodiments of the present invention. Some embodiments provide that the subcube of selected matrices may be expanded as variant expansion 92 along a first axis and a taxonomic expansion 94 along a second axis. In this manner, the relatedness of memories 96 may be maintained.

In some embodiments, the taxonomic expansion 94 provides that the different memories 96 for the same matrix/memory are provided in the same row. For example in the case of a temporal policy, memory 1 matrices 1, 2 and 3 may correspond to time slices for months January, February and March, and may be arranged in a row to preserve the relatedness of the different memories 96. By preserving the relatedness of the memories 96, the data may be further exploited to include a recency and/or distance bias, among others.

Some embodiments provide that the variant expansion 92 provides for the relatedness of the memories regarding the variants. For example, the columnar arrangement of memories may preserve the relationship between synonyms, abbreviations, replacements, and/or acronyms, among others. Note that, at this point, the subcube is represented by matrix names and does not include row or column information. For example, as discussed above, the frequency information (counts) corresponding to the triple store association includes the memory (agent), row and column. In that regard, the subcube of selected matrices represents identifications of the memories and/or matrices. Accordingly, satisfying the query also includes defining the row and column subsets.

Figure 8:
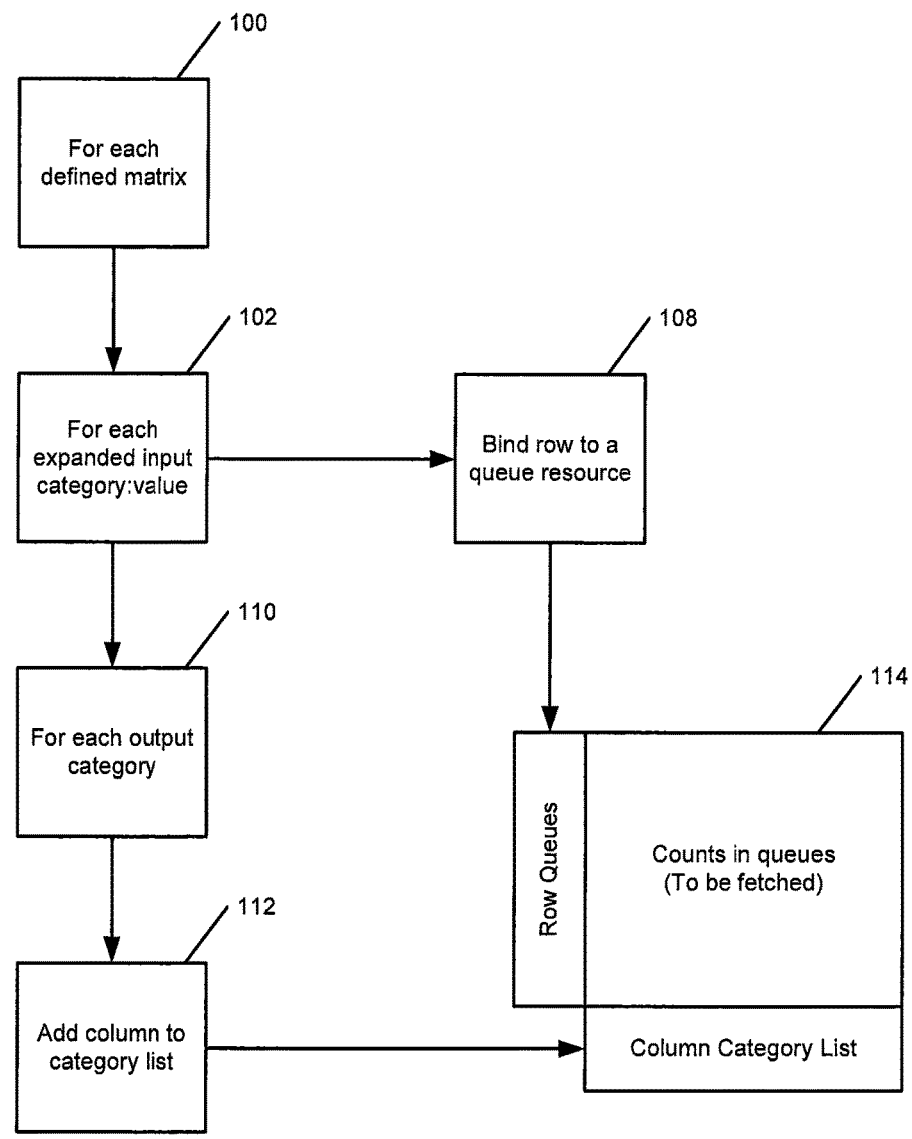
FIG. 8 is a flow chart illustrating defining the row and column subsets, as discussed above regarding FIG. 4, in accordance with some embodiments of the present invention.

Reference is now made to FIG. 8, which is a flow chart illustrating defining the row and column subsets, as discussed above regarding FIG. 4, in accordance with some embodiments of the present invention. Some embodiments provide that defining the row and column subsets is performed for each of the matrices corresponding to an expanded category:value (block 100). For each expanded input category:value (block 102), a row corresponding to the category:value input may be bound to a queue resource (block 108) to define a row queue. Some embodiments provide that the matrix may not be not checked to see if a row corresponding to the category:value is included. In this regard, the row queue may be defined without specific knowledge of the matrix content.

In some embodiments, the determination may include determining if the row exists in the matrix. Some embodiments provide that the determination is made and, if the row is not in the matrix, then no queue resource is bound corresponding to that category:value input. If the matrix includes a row corresponding to the category:value input, that row may be bound to a queue resource (block 108) to define a row queue.

In some embodiments, multiple queue resources may be provided as a pool of multiple queues that are available to be bound to rows as the rows are defined. Some embodiments provide that queue resources may include a fixed and/or predefined format and/or size. In this manner, processing and/or streaming the queues may be performed using a standardized approach based on the fixed and/or predefined format and/or size. In some embodiments, queue resources may be generated and/or created for the rows as the rows are defined.

For each output category (block 110), the output category is added to the column category list (block 112). In this manner, the column portion of the row/column subsets may be defined. For each of the defined matrices, the defined row queues and column category list may define a subset 114 for which the counts may be retrieved. In this manner, the margins of each of the defined matrices may be defined. The margins of the defined matrices may be used to define which portions of each of the rows in each of the matrices include data that corresponds to the query.

Figure 9:
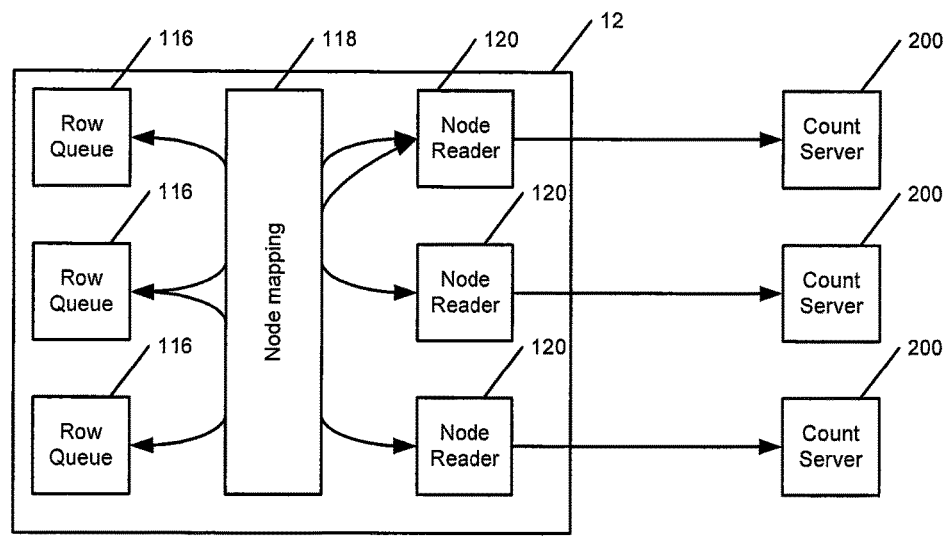
FIG. 9 is a flow chart illustrating operations corresponding to streaming queues 12 as discussed above regarding FIG. 2, according to some embodiments of the present invention.

Reference is now made to FIG. 9, which is a flow chart illustrating the operations corresponding to streaming queues 12, as discussed above regarding FIG. 2, according to some embodiments of the present invention. After binding the queue resources to the queues, as discussed above regarding FIG. 8, the row queues 116 may be streamed to access count server nodes that correspond to specific ones of the associative memories/matrices that may be independently located relative to one another. A node mapping operation 118 may be used to map multiple ones of the row queues 116 to multiple node readers 120, that may include a one-to-one correspondence to the multiple count server nodes 200. In this regard, the node mapping operation 118 may provide a many-to-many interface between the row queues 116 and the node readers 120.

In some embodiments, a node reader 120 may perform a request from its corresponding count server node 200 based on a query corresponding to a single row queue 116. Some embodiments provide that the node reader 120 may perform a batch request from its corresponding count server node 200 based on queries corresponding to multiple row queues. For example, multiple ones of the row queues 116 may include queries from the same associative memory and/or matrix. In this manner, the number of requests of a matrix from a particular count server node 200 may be reduced and/or minimized.

Responsive to the requests from a node reader 120, the count server node 200 may return count data to the node reader 120 that corresponds to the row queues 116. In some embodiments, the node reader 120 is operable to return counts and/or corresponding identifiers to the row queue. Some embodiments provide that the node mapping operation 118 includes at least one computation. In this manner, the node mapping may be performed without using a lookup table. Accordingly, the distributed associative memory base may adapt and/or grow without exceeding dimensionality limitations that a look-up table might present.

Figure 10:
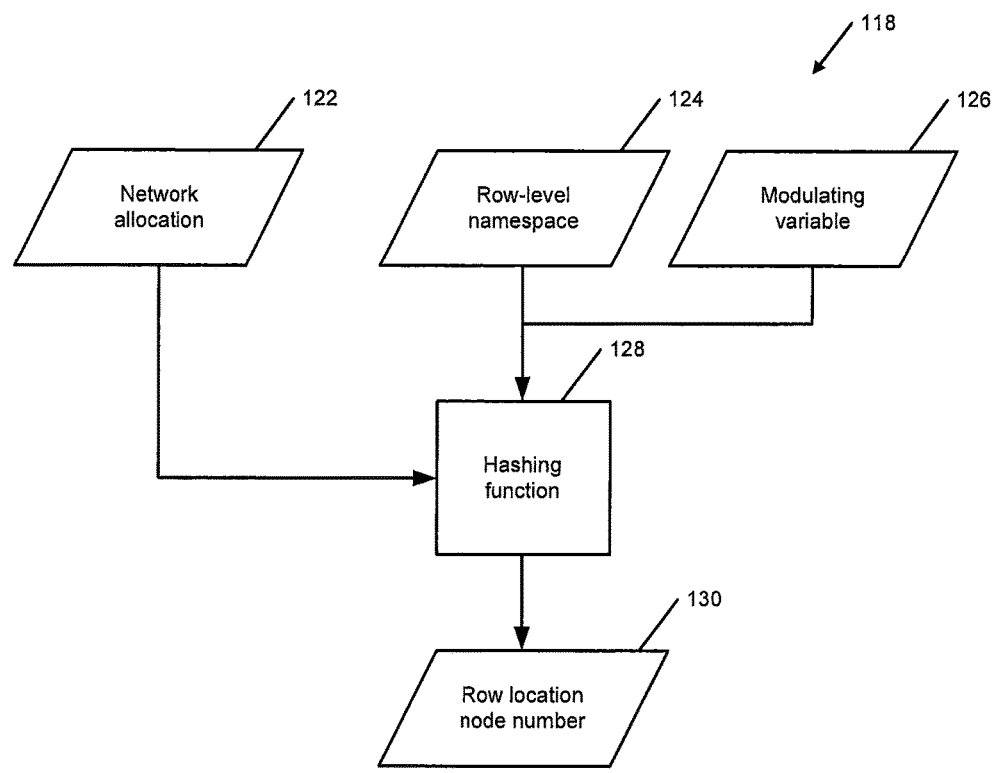
FIG. 10 is a flow chart illustrating operations for mapping a defined row in a row queue to a row location number according to some embodiments of the present invention.

Reference is now made to FIG. 10, which is a flow chart illustrating operations for mapping a defined row in a row queue to a row location number, as discussed above regarding node mapping 118 in FIG. 9, according to some embodiments of the present invention. Since the node reader (120 of FIG. 9) may be specific to each of the count server nodes (200 of FIG. 9), the row location node number is determined. For each row queue, the row-level namespace 124, along with any modulating variables 126, may be subjected to a hashing function 128 to generate a hash code representing a row location number 130. In some embodiments, network allocation information 122 may also be used by the hashing function 128. In some embodiments, the network allocation 122 may correspond to the network resources that comprise the associative memory base 1010. Some embodiments provide that the row location node number 130 is determined via computation. In this regard, the row-level namespace may be converted to an integer row location node number that may include an identification corresponding to which machine of a large number of machines includes the row.

The modulating variables 126 may provide other concatenations that cause the hash code to deviate to other spaces. In this manner, flexibility may be provided. For example, as the associative memory base 1010 grows, the modulating variables may be adjusted to provide identifications corresponding to additional machines.

Some embodiments provide that a hashing function 128 may include hashing function applied to the row-level namespace 124 and/or the modulating variables 126 to generate a hash code. In some embodiments, the network allocation 122 may include a quantity of machines in the cluster and the machine cluster offset. Some embodiments (not illustrated) provide that a modulo operation may be applied to the hash code using the quantity of machines in the cluster. The result of the modulo operation may be combined with the machine cluster offset to determine the row location node number 130. Approaches using the machine cluster information in a modulo operation, however, may have the effect of unnecessarily imposing limits on the growth and scale of the associative memory base.

Figure 11:
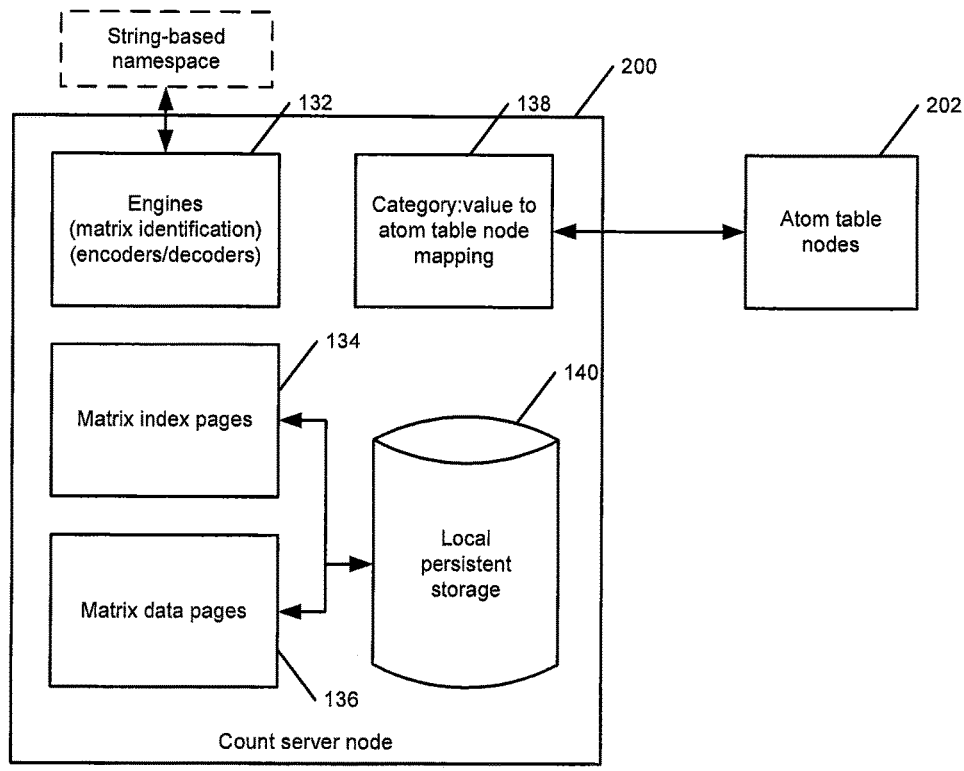
FIG. 11 is a block diagram illustrating an overview of a count server in accordance with some embodiments of the present invention.

Reference is now made to FIG. 11, which is a block diagram illustrating an overview of a count server node in accordance with some embodiments of the present invention. In some embodiments, the count server includes one or more count server nodes 200 and one or more atom table nodes 202, as discussed above regarding FIG. 9. A count server node 200 may include multiple processing engines 132 configured to drive internal processes such as, for example, matrix identification, encoders and/or decoders, among others.

Some embodiments provide that the count server node 200 may include category:value to atom table node mapping 138 that may provide an atom table location number corresponding to the category:value attribute. The atom table location number may be used to select an atom table, if applicable, within the selected atom table node 202 to resolve an identifier that becomes the key value to the matrix. The key value to the matrix may be used in matrix index pages 134 and/or the matrix data pages 136. In some embodiments, the matrix index pages 134 may include one or more B+ tree pages, but other forms of indexing may be used to relate the key value to the matrix. As described herein, matrix index pages 134 may include the identification of other pages, which may also be matrix index pages 134 or may be matrix data pages 134. The matrix data pages 134 may include matrix location information regarding the location of data, such as, for example, count data corresponding to the query.

Some embodiments provide that the matrix index pages 134 resolve the physical location of the data in a persistent storage 140 based on the key value. In some embodiments, a portion of the key value may include a page address in the persistent storage.

Thus, the count server node 200 receives namespace based strings, converts them to key values, retrieves count data corresponding to the key values. On the return, some embodiments provide that the key values may be converted back to namespace based strings. In some embodiments, the returned values may be maintained as identifier integers that may flow back into the queue streams. In this manner, subsequently applied ordering and stepping controls may operate on the category:value as an integer identifier rather than as a namespace based string. In this manner, more efficient integer compare operations may be used instead of string compare operations. Accordingly, the interface definition to the count server node 200 is namespace string based in the input direction.

The persistent storage 140 is local to each count server node 200. In this manner, other than the atom table nodes 202, the local persistent storage 140 provides a shared nothing architecture in which each node is independent and self-sufficient, and there may be no single point of contention across the system. As the count server node 200 performs substantial search and count retrieval operations locally, the associative memory base may be increased by adding additional machines thereby providing substantially linear scalability in a distributed associative memory base.

Figure 12:
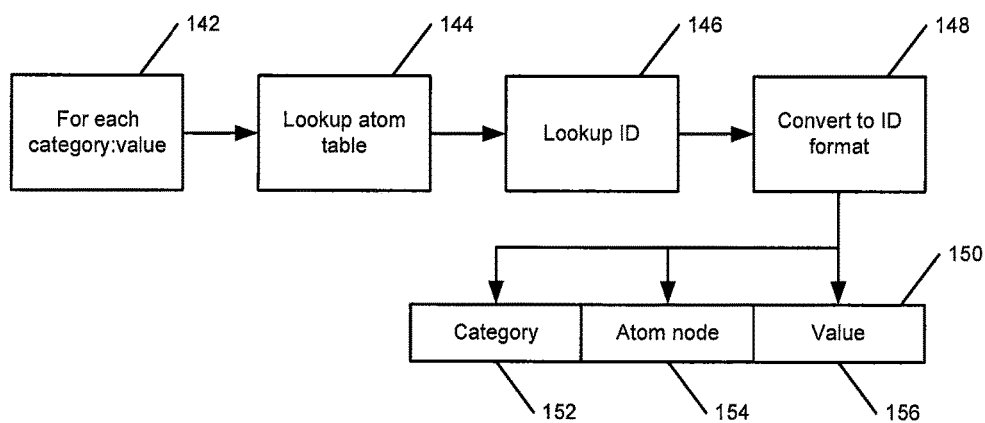
FIG. 12 is a flow chart illustrating operations for category: value to identification bitfield mapping (block 138) in a count server node 200, as discussed above regarding FIG. 10, according to some embodiments of the present invention.

Reference is now made to FIG. 12, which is a flow chart illustrating operations for category:value to identification bitfield mapping (block 138) in a count server node 200, as discussed above regarding FIG. 11, according to some embodiments of the present invention. For each category: value (block 142) an atom table look-up is performed (block 144). In some embodiments, the atom table look-up may be used to determine which among multiple atom table nodes includes the identification data corresponding to the category:value in the query. After the atom table node is looked up, the identification data is looked up in that atom table node (block 146). Although described as look-up operations, some embodiments provide that the atom table may be determined computationally via a hashing function and/or other computational method.

The identification data is converted to provide an identification format that may be referred to as a key value (block 148). In some embodiments, a key value format 150 may include a category index field 152, an atom node field 154, and/or a value index field 156, among others. Each of the category index field 152, atom node field 154 and value index field 156 may be configured to include data values that correspond to the category, atom node, and value information, respectively. The key value format 150 may provide that the various fields 152, 154, and 156 may be flexible in length. By providing an atom node field 154, a reverse look-up may be performed later when associating the return data from the matrix with the category:value. In some embodiments, the key value format 150 may include a fixed bit length. For example, the key value format may be 16, 32, 64, 128 and/or 256 bits, among others.

Figure 13:
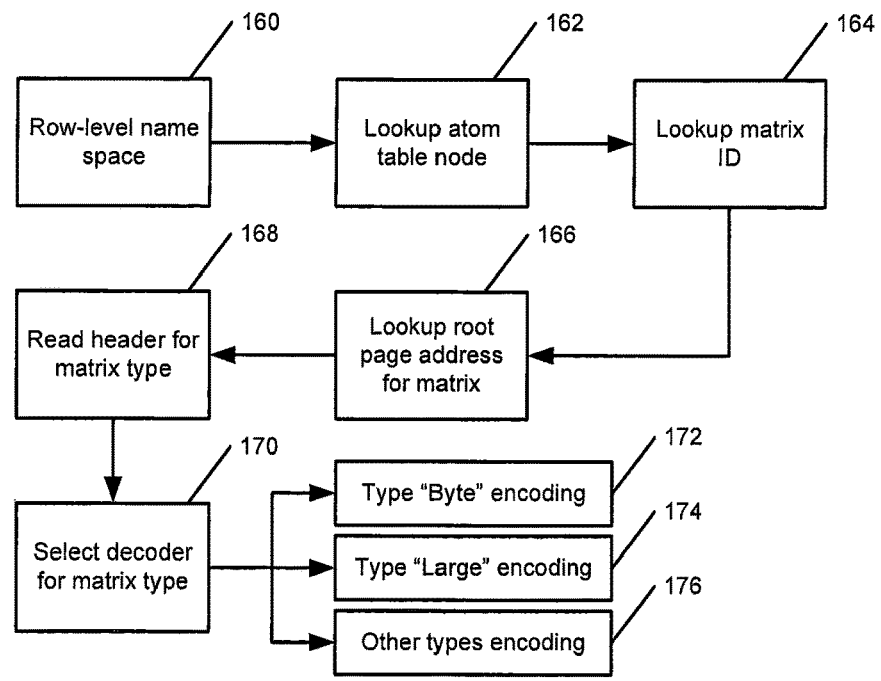
FIG. 13 is a flow chart illustrating operations for matrix identification in a count server node 200, according to some embodiments of the present invention.

Reference is now made to FIG. 13, which is a flow chart illustrating operations for matrix identification in a count server node 200, according to some embodiments of the present invention. Identifying the matrix corresponding to row-level namespace 160, such as, for example, a category: value attribute, may include looking-up an atom table node (block 162). The matrix identifier, also referred to as a key value, may be looked-up (block 164). In some embodiments, the key value and/or one or more fields therein may be compressed.

A root page address for the matrix is looked-up using the key value (block 166). In some embodiments, the root page represents the starting page corresponding to an encoded matrix. Some embodiments provide that that header of the root page is read to determine the matrix type (block 168). In some embodiments, a matrix type may include a "Byte" type matrix that is small enough to include all of the rows of the matrix in the root page. In this regard, the decoder for the matrix may be selected (block 170) for a type "Byte" decoding (block 172).

Some embodiments provide that the matrix type may include a large matrix that uses more than one page to identify all of the rows. In this regard, the decoder for the matrix may be selected (block 170) for a type "Large" decoding (block 174). Other types of decoding (block 176) may be provided as well according to some embodiments of the present invention. For example, prior/next, triangular, and/or bit plane decoding, among others, may be used.

Figure 14:
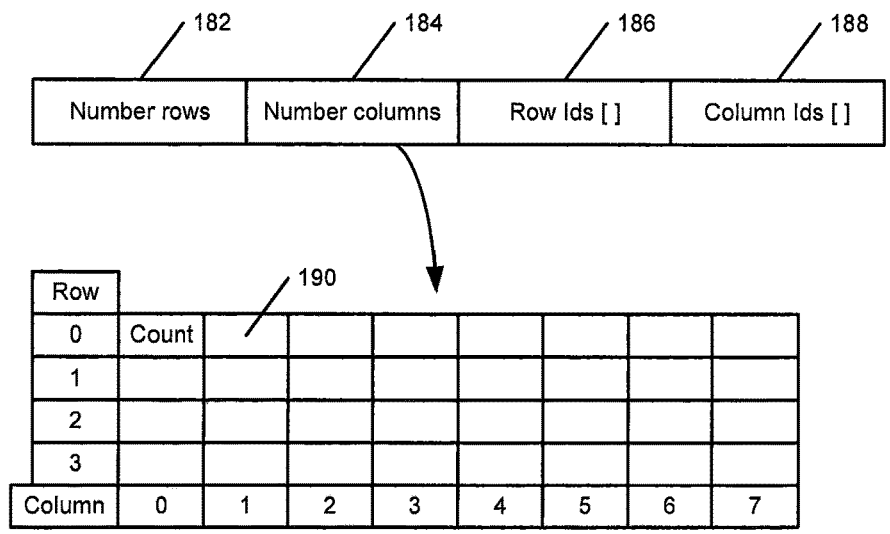
FIG. 14 is a block diagram illustrating a standard byte matrix that is encoded according to some embodiments of the present invention.

Reference is now made to FIG. 14, which is a block diagram illustrating a standard byte matrix that is encoded according to some embodiments of the present invention. As discussed above regarding FIG. 13, a byte matrix is not a large matrix and may reside on a single root page. In some embodiments, a maximum size may be defined for the byte matrix. For example, a total size may be limited not to exceed 16 k bytes. Some embodiments may provide byte matrices including different total sizes that may be less and/or more than 16 k bytes. In some embodiments, other types of locally compact representations may be encoded including, for example, prior-next, triangular, and/or bit-plane, among others.

In some embodiments, the byte matrix includes header information 180 that defines the number of rows 182, the number of columns 184, the row identifiers 186, and/or the column identifiers 188, among others. In some embodiments, the row identifiers 186 and/or the column identifiers 188 may be provided in their index order and may be determined via index variable such as "N" and "M", respectively. In this regard, the byte matrix may include an N×M array of cells 190 that include counts. By using row indexing, once the row index is determined, the other rows can be accessed directly using an offset value relative to the current row. Although when initialized, the byte matrix may be heavily populated, as the byte matrix is further populated, it becomes increasingly sparse. In some embodiments, the data may be flattened by including rows and/or columns that share the same date and/or temporal characteristic.

Figure 15:
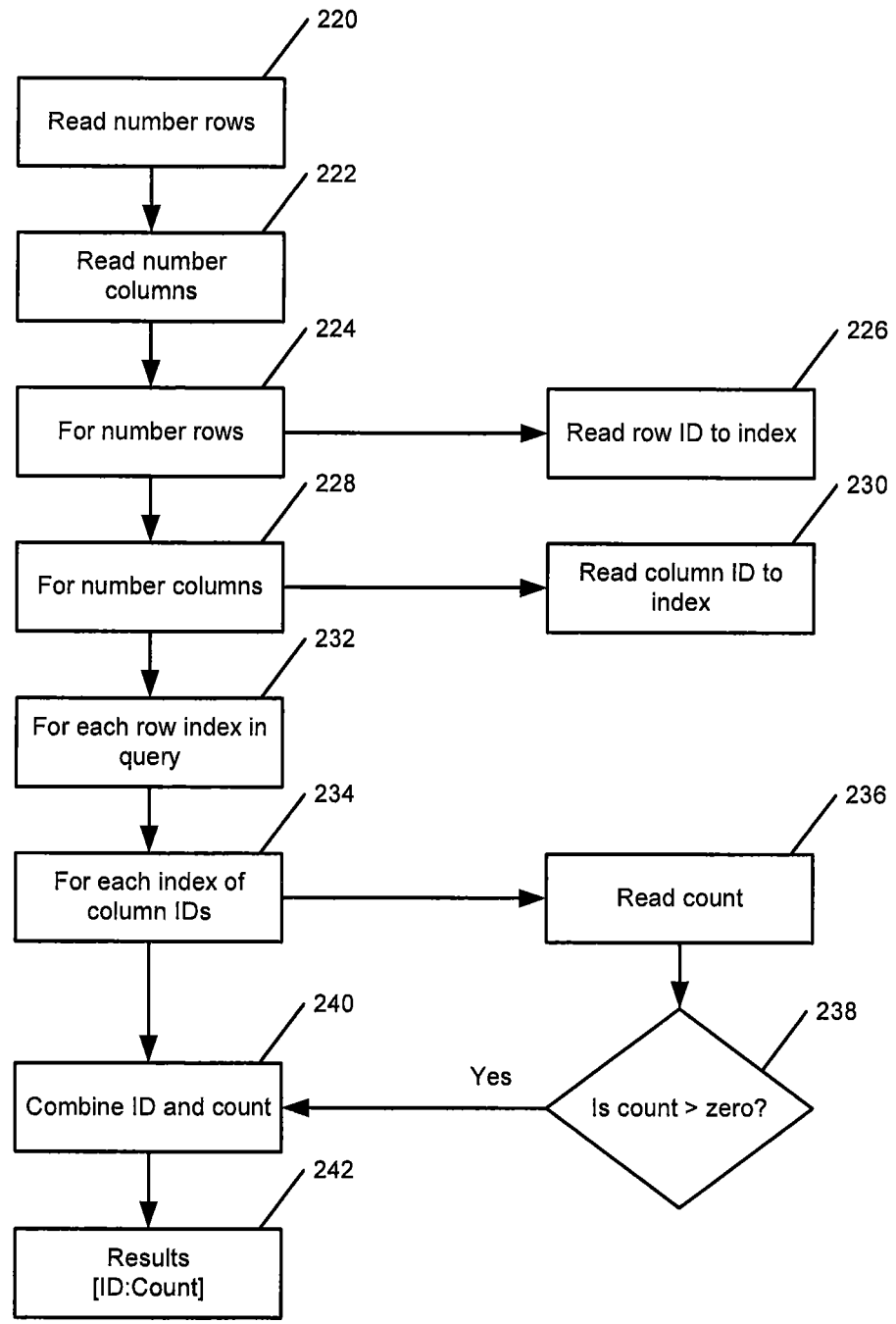
FIG. 15 is a flow chart illustrating operations for decoding a standard byte matrix as discussed above regarding FIG. 14, according to some embodiments of the present invention.

Reference is now made to FIG. 15, which is a flow chart illustrating operations for decoding a standard byte matrix as discussed above regarding FIG. 14, according to some embodiments of the present invention. Some embodiments provide that decoding a standard byte matrix includes reading the number of rows (block 220) and reading the number of columns (block 222). As discussed above regarding FIG. 14, the number of rows and the number of columns may be determined by reading the header information 180.

For the number of rows (block 224), the row identifiers are read to a row index (block 226). Similarly, for the number of columns (block 228), the column identifiers are read to a column index (block 230). Counts corresponding to each cell are read by indexing each indexed row identifier and column identifier combination (blocks 232, 234, 236). Specifically, for each row index in the query (block 232) and for each column index in the query corresponding to each of the row indexes (block 234), the count data is read (block 236). If the count is greater than zero (block 238), then the row/column identifier and the corresponding count are combined (block 240) to provide an indentifier:count result (block 242). If the count value is zero, then no result corresponding to the identifier may be provided.

Figure 16:
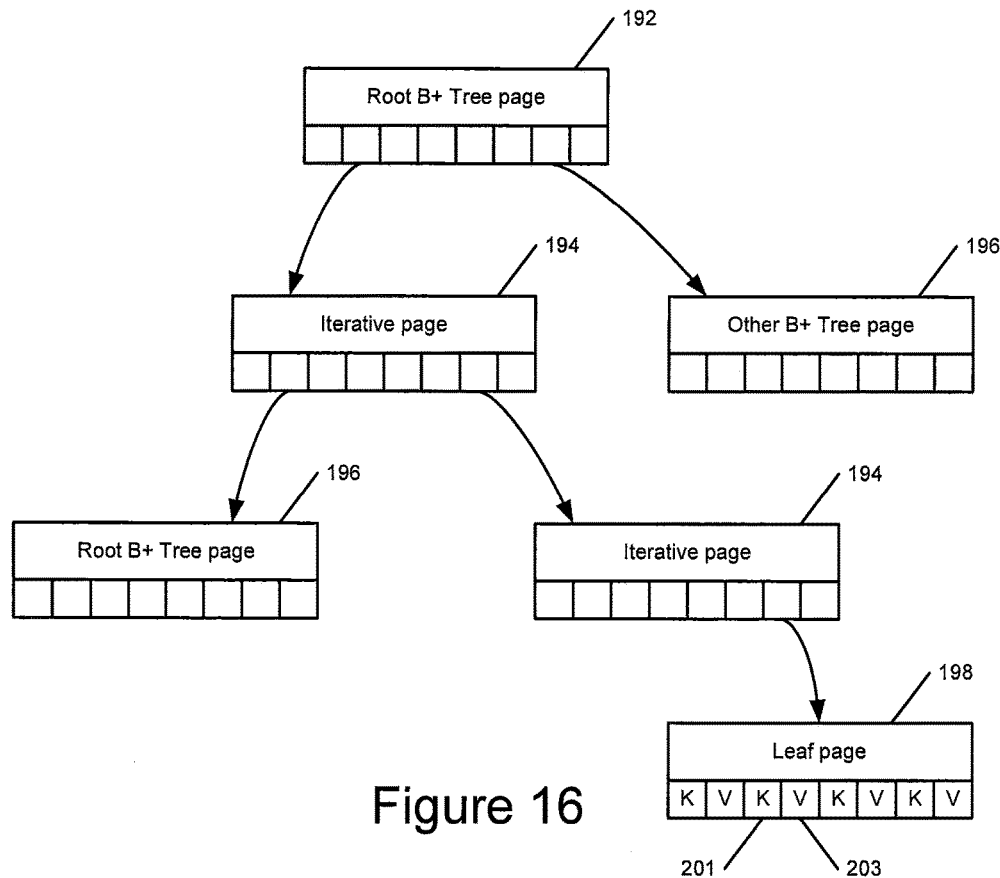
FIG. 16 is a block diagram illustrating a large matrix tree for encoding a large matrix according to some embodiments of the present invention.

Reference is now made to FIG. 16, which is a block diagram illustrating a large matrix tree for encoding a large matrix according to some embodiments of the present invention. In some embodiments, the large matrix tree may include, for example, a B+ tree page, which may represent sorted data in a manner that allows for efficient insertion, retrieval and/or removal of the counts, each of which may be identified with a key. Some embodiments provide that the large matrix tree may include a large fan-out that may minimize the number of input/output operations to provide observations on very large, sparse, count matrices. In this manner, the large matrix tree may reduce a large matrix to areas of non-zero count values.

In some embodiments, the large matrix tree includes a root page 192 that may include references to iterative pages 194 that may further define a leaf page 198 that includes keys 201 and values 203 that include the rows and count data within the large matrix. Some embodiments provide that the root page 192 and/or an iterative page 194 may include references to other B+ tree pages 196 and/or other iterative pages 194. Some embodiments provide that the keys 201 define a starting point of an encoded data string corresponding to one or more encoding schemes. For example, some embodiments provide that a key 201 may provide a starting point of a run length encoding and/or associative count encoding that may be provided by the value 203. In some embodiments, the value 203 points to a portion of the cells in a particular row of the matrix. Some embodiments provide that the value 203 may include a fixed length, such as, for example, 4, 8, 16, 32, 64 and/or 128 bytes, among others.

Figure 17:
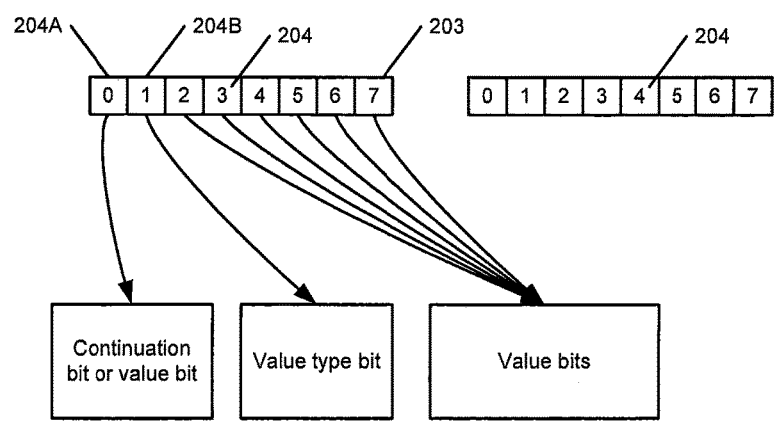
FIG. 17 is a block diagram illustrating cell run encoding, as discussed above regarding FIG. 16, according to some embodiments of the present invention.

In some embodiments, very large, sparse matrices may be encoded using a cell run encoding as described herein. Some embodiments of cell run encoding may be further explained with reference to FIG. 17, which is a block diagram illustrating cell run encoding, as discussed above regarding FIG. 16, according to some embodiments of the present invention. In some embodiments, cell run encoding may provide a data compression for very large, sparse matrices that may include selectively hybridized characteristics of a run length encoding and an infinite integer encoding. Run length encoding is a form of data compression in which runs of data may be stored as a single data value and count, rather than as the original run. For example, in the case of very large sparse matrices, run length encoding may be used to span large quantities of zero values. Additionally, infinite integer encoding provides data compression of variable length integer values that may occur between runs of zeros as may be typical in a very large, sparse matrix.

By way of non-limiting example, each value 203 may include multiple bytes 203 that may each include multiple bits 204. Although as illustrated herein, the byte length includes 8 bits, the invention is not so limited. For example, some embodiments include bytes that include more and/or less than 8 bits. Some embodiments provide that a size of bytes as used herein may be dependent on one or more characteristics of the data. For example, where the data includes substantially low counts, a byte size may be reduced to result in greater efficiency for such data. Further, some embodiments provide that counts may use variable byte length encoding to provide a virtually infinite size without experiencing data overflow.

Some embodiments provide that within each byte 203, "bit 1" 204B may define either a value type bit or a value bit as part of the remaining bits of the byte 203. In this regard, where "bit 0" 204A may always be a continuation bit, "bit 1" 204B may provide two different uses, depending on whether there is a continuation or not. Accordingly, when a new value is started (continuation ended in the last byte), then the new value type is provided by "bit 1" 204B. For example, if the continuation bit of the prior byte is a "1", then the "bit 1" 204B may be included with bits 2-7 as a value bit. If the continuation bit of the prior byte is "0", then a "bit 0" value of "0" may indicate the end of the current run with a value. Instead, if "bit 0" includes a value of "1" then the value is continued in the next byte.

Some embodiments provide that if the current run is ending with a value (prior bit 0=0), then "bit 1" 204B of the byte may indicate a value type. For example, if the value type is a "0", then a zero run length may be indicated, which provides that the rest of the bits in that byte are zero. In contrast, if the value type is "1", then an associative count may be indicated, which may provide that bits 2-7 in that byte may be a binary representation of an integer value using infinite integer encoding.

Figure 18:
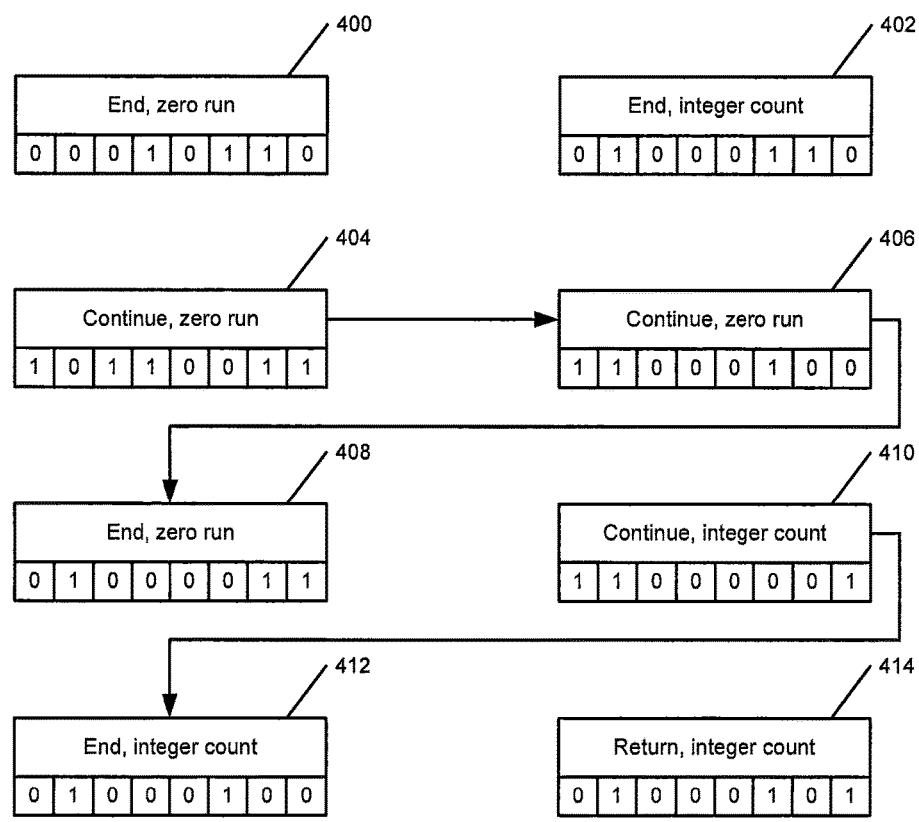
FIG. 18 is a block diagram illustrating an example of cell run encoding as described above regarding FIG. 17, according to some embodiments of the present invention.

Reference is now made to FIG. 18, which is a block diagram illustrating an example of cell run encoding as described above regarding FIG. 17, according to some embodiments of the present invention. The first byte 400 illustrated in this example, includes zeros in the first and second bits. Assuming a prior continue bit value of zero, the first bit zero value indicates that the current byte is ending the run with a value and the second bit zero value indicates that the value type is a zero run length. The numerical value corresponding to bits 2-7 is 22, which is added to the identifier (assumed to be zero initially) to generate the new identifier value, which is 22. Since this was a zero run, there is no corresponding count value.

The second byte 402 includes a zero and one in the first and second bits, respectively. The first bit zero value indicates that the current byte is ending the run with a value and the second bit one value indicates that the value type is an integer count. The integer value is the numerical value corresponding to bits 2-7 (000110), which is 6. The return identifier value of 22 is associated with the integer count value of 6. The identifier is incremented by one to become 23.

The third byte 404 includes a one and zero in the first and second bits, respectively. The first bit one value indicates that the current byte value will continue into the next byte and the second bit zero value indicates that the value type is a zero run. The bits in the remaining 2-7 bit positions (110011) are preserved to be concatenated with subsequently occurring bits until the zero run value is fully determined.

Continuing, the fourth byte 406 includes a one in each of the first and second bits. The first bit one value indicates that the current byte value will continue into the next byte. Since the prior continuation bit (third byte 404, first bit) is a one, then the value type is already determined as a zero run. In this regard, the second bit may be included in the value field. Accordingly, the bits in the remaining 1-7 bit positions (1000100) are concatenated with the value bits of the previous byte. Accordingly, the current value is the first value (110011) concatenated with the second value (1000100), or 1100111000100.

Still continuing, the fifth byte 408 includes a zero and one in the first and second bits, respectively. The first bit zero value indicates that the current byte is ending the run with a value. Since, as in the fourth byte 406, the prior continuation bit is one, then the remaining bits 1-7 (1000011) may be included in the value field. Accordingly, the new current value is the previous current value (1100111000100) concatenated with bits 1-7 (1000011) or 11001110001001000011, which is 1,688,710. This value is added to the previous identifier 23 to result in an identifier of 1,688,733.

The sixth byte 410 includes a one in each of the first and second bits. The first bit one value indicates that the current byte value will continue into the next byte. Since the prior continuation bit (fourth byte 406, first bit) is a zero, then the value type may be determined by the second bit. The second bit one value indicates that the current byte value will be an integer count value. Accordingly, the bits in the remaining 2-7 bit positions (000001) are preserved for concatenation with the value bits of the subsequent byte(s).

The seventh byte 412 includes a zero and one in the first and second bits, respectively. The first bit zero value indicates that the current byte is ending the run with a value. Since the prior continuation bit is one (fifth byte 410), then the remaining bits 1-7 (1000100) may be included in the value field. Accordingly, the new current value is the previous current value (000001) concatenated with bits 1-7 (1000100) or 0000011000100, which is 196. Since this value is an integer count, the return identifier value of 1,688,733 is associated with the integer count value of 196. The identifier is incremented by one to become 1,688,734.

Note that within the eight exemplary bytes described above, the non-zero data from identifier 0 through identifier 1,688,735 were determined and associated with their respective identifiers via the cell run encoding.

The eighth byte 414 includes a zero and one in the first and second bits, respectively. The first bit zero value indicates that the current byte is ending the run with a value. Since the previous byte did not have a continuation bit value of one, the second bit one value indicates that the value type is an integer count. The integer value is the numerical value corresponding to bits 2-7 (000101), which is 5. The return identifier value of 1,688,734 is associated with the integer count value of 5. The identifier is incremented by one to become 1,688,735.

Figure 19:
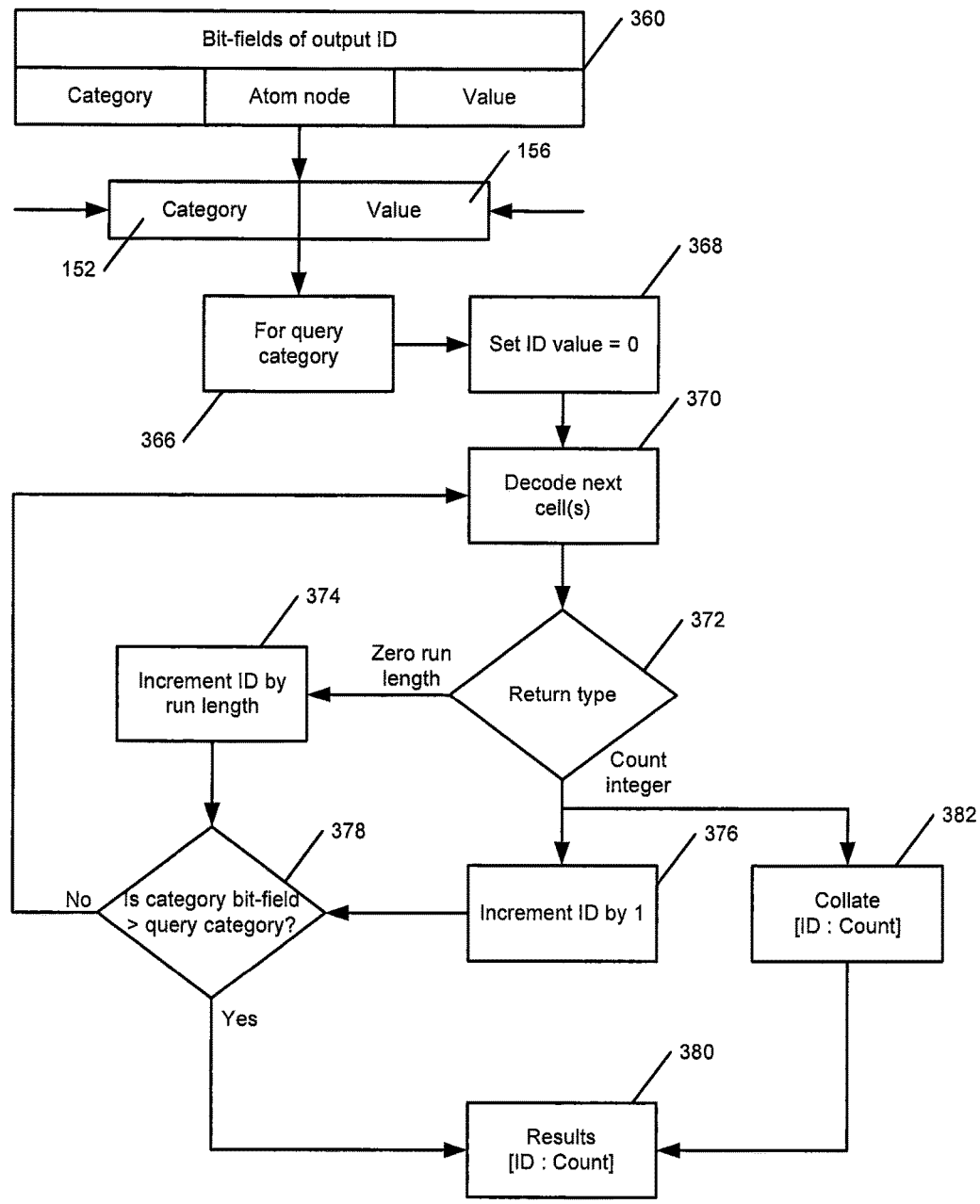
FIG. 19 is a flow chart illustrating operations for scanning an output category according to some embodiments of the present invention.

Reference is now made to FIG. 19, which is a flow chart illustrating operations for scanning an output category according to some embodiments of the present invention. Although the operations for scanning an output category may be more applicable to a large matrix as described above regarding FIG. 16, portions of the scanning operation may be applicable to the standard byte matrix as described above regarding FIG. 14. For every query output category, the bitfields of the output identifier 360 include a category index field 362 and a value index field 364. As described above regarding FIG. 12, the output identifier, which may be referred to as a key value may originally include a category index field 152, an atom node field 154, and/or a value index field 156, among others. For the purposes of the scanning operations according to some embodiments, however, the atom node field 154 may be removed such that the category index 152 and the value index 156 may be combined to form an output identifier 360. Operations include, for each query category (block 366), initializing the scan by setting the output identifier value to zero (block 368).

The cell(s) corresponding to the output identifier 360 in that category is decoded (block 370) and the type of cell encoding is returned (block 372) in the instance of a large matrix. As a standard byte matrix may not use cell run encoding, a zero run length may not occur and thus the type of cell therein may be inapplicable. If the cell encoding is zero run length, then the output identifier 360 is incremented by the run length (block 374). By advancing the output identifier 360 to the end of the run of zeros, very large, sparse matrices may be processed in an efficient manner. If the cell encoding is an integer count, then the output identifier 360 is incremented by 1 (block 376) so that the next output identifier value may be evaluated.

As the category index 152 and the value index 156 are concatenated into a single value, once the output identifier 360 is incremented beyond the lower bits that are associated with the value index 156, the category index 152 will advance to a value that corresponds to the next query category. In this manner, once the category bit-field 152 is incremented beyond that corresponding to the query category (block 378), then the results are returned (block 380) and collated with the corresponding identifiers (block 382). If the category index is not greater than the query category, then the next cell is decoded (block 370). In this manner, all of the output identifiers 360 may be evaluated for each query category.

Figure 20:
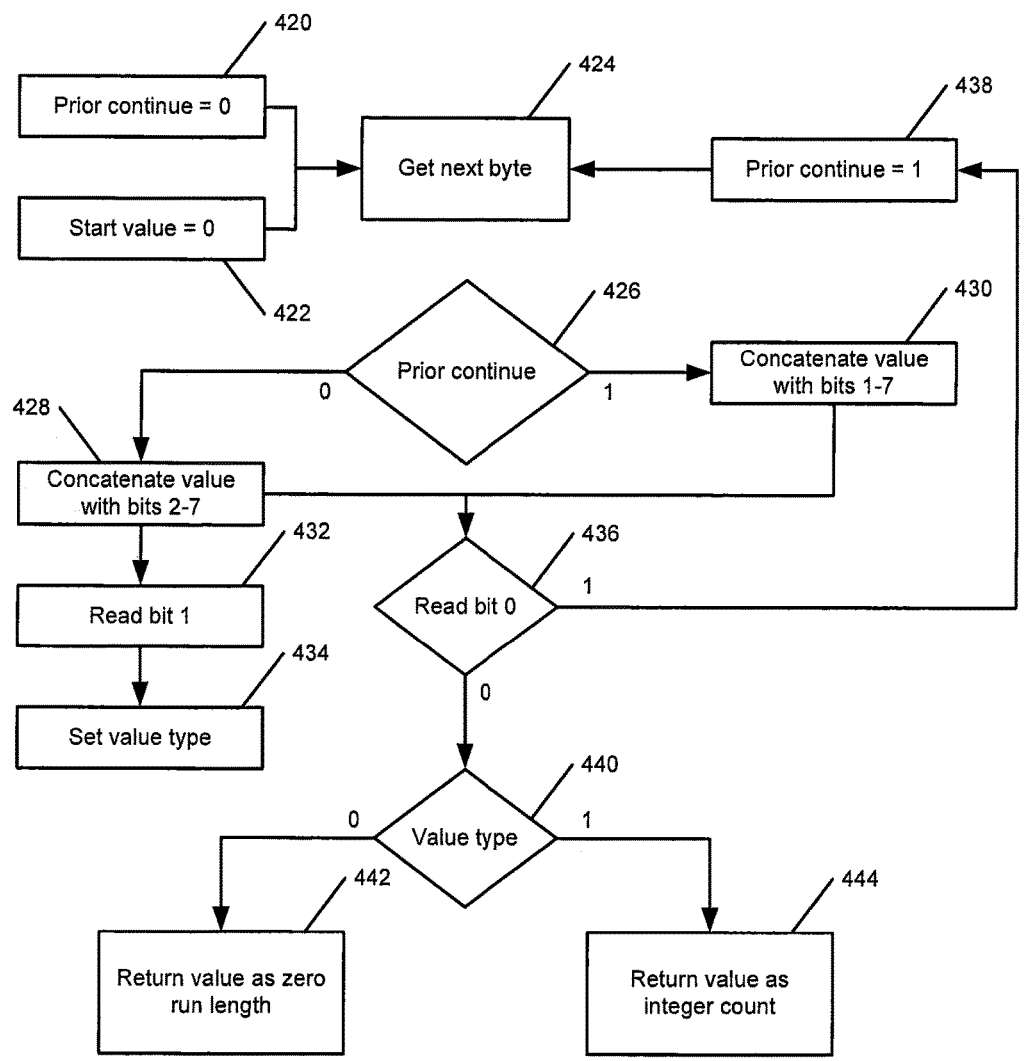
FIG. 20 is a flow chart illustrating operations of a cell run decoder as used in a large matrix according to some embodiments of the present invention.

Reference is now made to FIG. 20, which is a flow chart illustrating operations of a cell run decoder as used in a large matrix according to some embodiments of the present invention. In some embodiments, the cell run decoder may include a byte-by-byte decoder that may provide an integer count and/or a halting function corresponding to the decoding bytes that are encoded using the cell run encoding as described above regarding FIG. 17. Some embodiments provide that instead of fetching a stored identifier, an identifier value may be computed as described herein. In order to ensure that the starting point is not within a run length or integer count, the continue bit of the prior byte is zero (block 420) and the start encoded value is zero (block 422). The next byte is retrieved (block 424) and the prior continue bit is read (block 426). If the prior continue bit is zero then the encoding value is concatenated with bits 2-7 (block 428). Note that on the first byte (as indicated by the prior continue bit of zero), the second bit (bit 1) is read to determine the value type (block 432) and the value type is set (block 434).

After the concatenation (block 428), the first bit (bit 0) is read (block 436) to determine whether or not subsequent bytes are necessary to determine the final encoded value. In this regard, the first bit may be a continuation bit signaling that a subsequent byte is a continuation of the current byte. If the first bit (bit 0) is one then that becomes the new prior continue bit (block 438) and the next byte is retrieved (block 424). If first bit (bit 0) is zero, then the value type is determined by reading the second bit (bit 1) (block 440). A zero value at the second bit indicates a zero run length and the encoded value is returned as such (block 442). A one value at the second bit indicates an integer count and the encoded value is returned as such (block 444).

In the alternative, if the prior continue bit is one then the byte is a continuation of the previous byte and thus the value type is already known. Accordingly, the prior continue bit is one (block 426) and the value type is known by via a previously decoded byte. In this regard, as the value type is known, the second bit may be included in the value field and the encoded value may be concatenated with bits 1-7 (block 430).

In some embodiments, the value being accumulated includes a pointer and/or a form of a pointer to a next non-zero data location. In some embodiments, the value being accumulated includes an integer that represents a count and may be encoded using an infinite integer encoding. In either instance, a virtually limitless field length via the above described encoding may provide a virtually infinite value size without data overflow. In some embodiments, the encoding described herein may be considered as a variable word size linked list that provides a pointer into identifier space.

Figure 21:
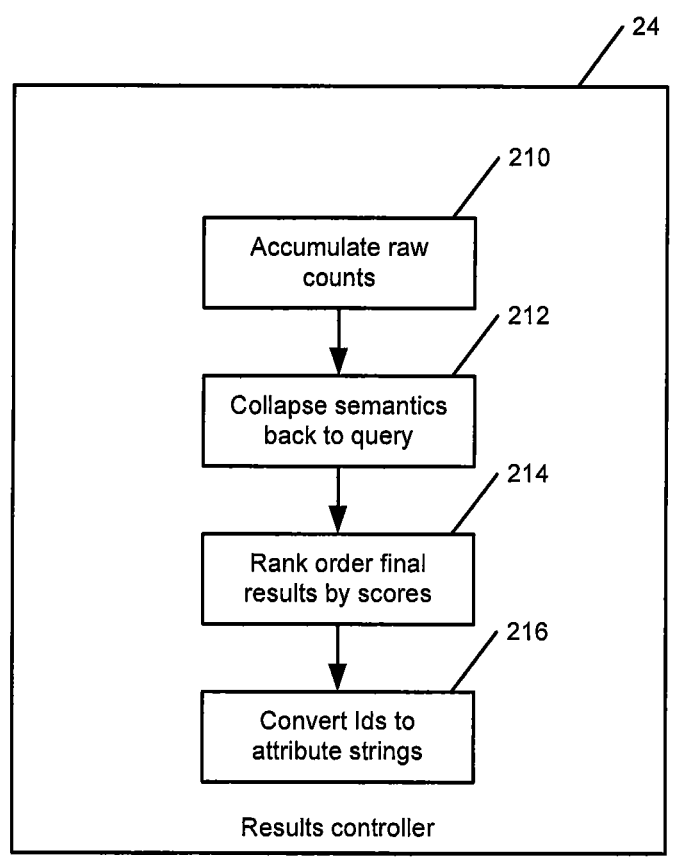
FIG. 21 is a flow chart illustrating an overview of operations in a results controller according to some embodiments of the present invention.

Reference is now made to FIG. 21, which is a flow chart illustrating an overview of operations in a results controller 24 as illustrated in FIG. 2, according to some embodiments of the present invention. The raw count data is accumulated from the row queues (block 210). In some embodiments, the raw count data includes column identification and a corresponding count value. Some embodiments provide that the column identification and corresponding count value may be defined in terms of the physical space of the data location. The semantics may be collapsed back to the query to express the return column identifier and count data in the query terms (block 212).

Some embodiments provide that the final results are rank ordered (block 214). In some embodiments, scoring the final results may be performed to provide information regarding relative relevance among the data. For example, in the context of time slices, newer data may be considered to be more relevant than older data. In this regard, the results may be weighted independently to capture the relative relevance among data. For example, in addition to the triple stores of associations, the counts also serve to provide frequency information, which may be captured in the final results by weighting associations having greater frequencies of occurrence more heavily than those having fewer frequencies of occurrence.

The identifiers are converted to attribute strings (block 216). Some embodiments provide that, by waiting until after the ranking and/or scoring, the converted queue stream is provided in a predictable order that is consistent with the relative importance in terms of the query.

Figure 22:
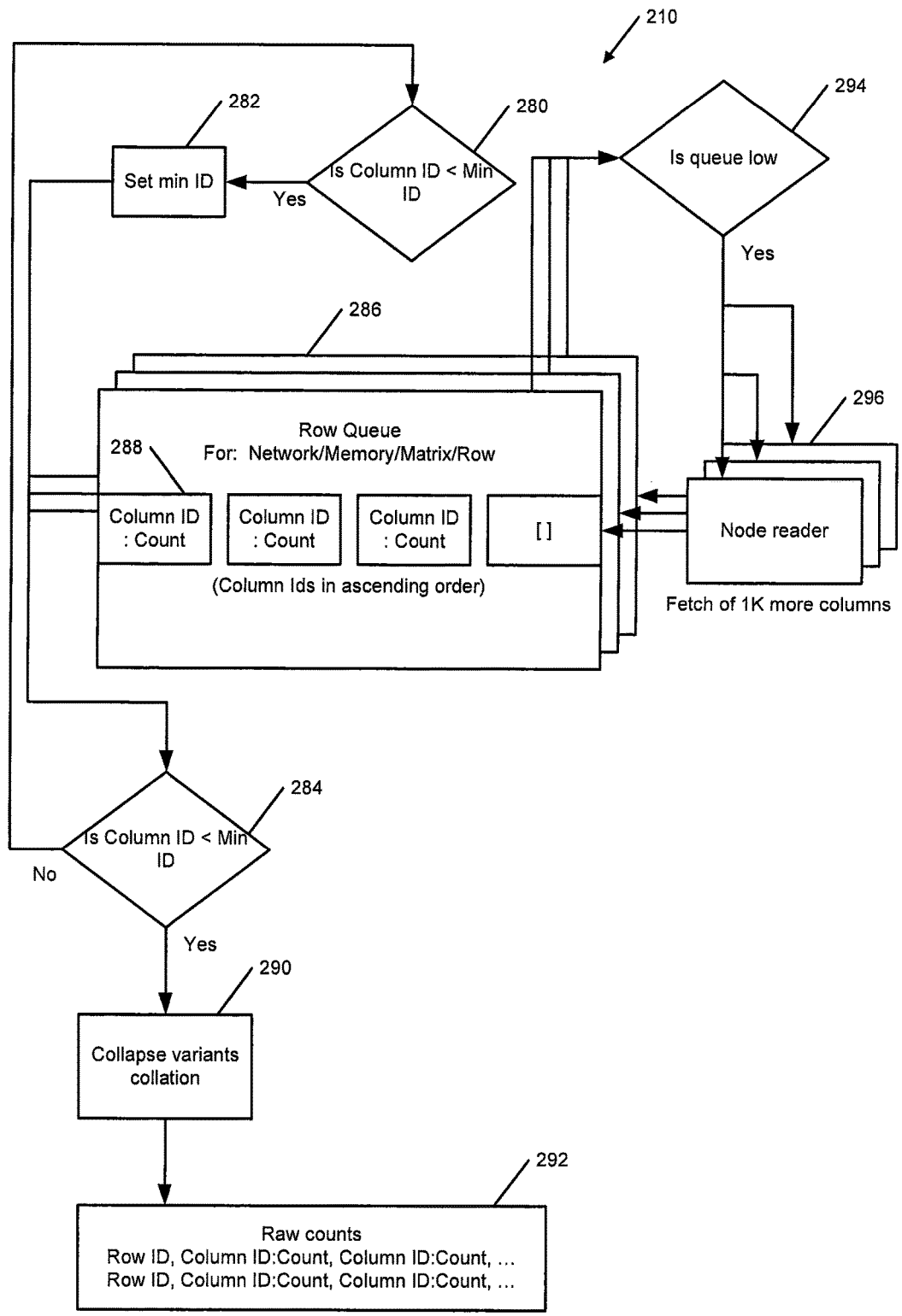
FIG. 22 is a flow chart illustrating operations for accumulating raw counts according to some embodiments of the present invention.

Reference is now made to FIG. 22, which is a flow chart illustrating operations for accumulating raw counts 219 as described above regarding FIG. 21, according to some embodiments of the present invention. Whether originating from a byte matrix or from a large matrix, a series of column identifiers and the corresponding count data are provided back to the row queues. In some embodiments, the column identifiers corresponding to each row queue may be provided in a predefined order. For example, the column identifiers may be arranged in an ascending order. By providing a predefined order based on the column identifier, the organizational scheme of the matrix may define relationships among the data that may be preserved. For example, a column identifier may provide that a first high bit value field of the identifier describes an attribute type (category) and a second low bit value field describes the attribute value (value) to describe the category:value. When reading the ordered returned data, once the category field advances to a new type, it can be deduced that all of the values corresponding to that the previous attribute type have been read.

The row queues 286 that may be generated by binding the each of the network:memory:matrix:row query items, as described in namespace, may be matched to queue resources that may be streamed responsive to requests for count data and/or satisfaction thereof. For example, when the amount of data within a queue and/or the number of queues being processed is low and/or below a defined threshold (block 294) then one or more of the node readers 296 may fetch more columns and/or counts from the corresponding rows. Some embodiments provide that the column and count data is fetched via the node reader 296 in a streaming manner and fed into the corresponding row queues 286 as it is fetched. The column identifier:count data may continue to be fed into a row queue 286 until the node reader 296 indicates that the requested data has been provided. In this manner, the data may be continually processed in a manner that may avoid overwhelming processing resources.

Note that the column identifier:counts 288 may be provided and/or arranged in the row queues 286 in a predefined order relating to the column identifier. In some embodiments, the column identifier:counts 288 may be arranged in ascending order of the column identifiers. Some embodiments provide that the column identifier:counts 288 are sorted by virtue of the arrangement of data in a byte matrix and/or a large matrix tree. For example, the arrangement of the data in the matrices identifies the non-zero portions within very large, sparse matrices that are substantially unpopulated. In some embodiments, the arrangement of data provides additional richness in that related categories of data may be co-located. Accordingly, the column identifier may be semantically significant. In this manner, the organization of the associative memory base may directly contribute to the speed and flexibility of the exploitation thereof.

Some embodiments provide that if the column identifier is less than a minimum column identifier value (block 280) of the pending row queues 286 then that column identifier is set as the minimum identifier (block 282). Stated differently, the operations may function as a column identifier iterator to retrieve the column identifier:count data from the row queues 286 in an order starting from the minimum column identifier value that is in the row queues. The column identifier:count data for those of the row queues 286 that corresponds to the minimum identifier value is retrieved and, if applicable, may be collapsed with variants of that column identifier:count to collate the related counts (block 290). In this manner, the raw counts 292 may be accumulated (block 292).

Figure 23:
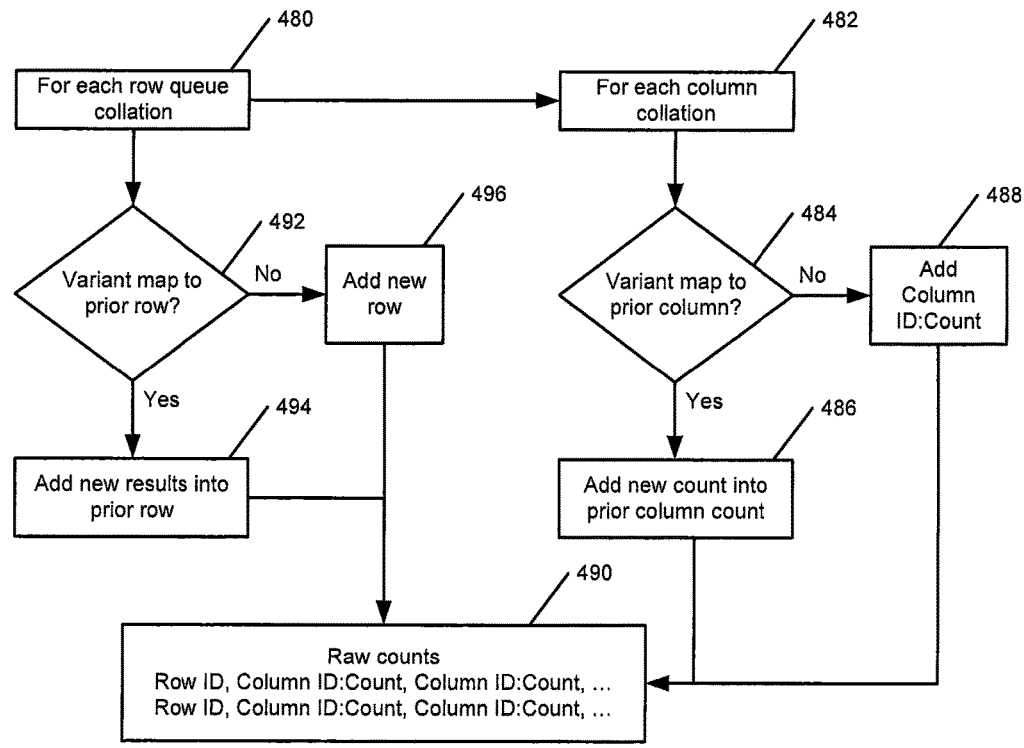
FIG. 23 is a flow chart illustrating operations for a variant collapse according to some embodiments of the present invention.

As described above regarding FIG. 7, the subcube of selected matrices may be expanded as variant expansions. Now that the query results corresponding to the expanded variants have been returned, reference is now made to FIG. 23, which is a flow chart illustrating operations for a variant collapse according to some embodiments of the present invention. As the variants are generally considered to be equivalents, count information corresponding to variants of a query term may be additive. For example, where variants of a query term "Joseph" may include "Joe" and "Joey", the raw count data corresponding to "Joseph", "Joe", and "Joey" may be summed to collapse the previously expanded variants.

Operations according to some embodiments may provide that for each row queue collation (block 480), a determination may be made as to whether the variant maps to the prior row (block 492). If the variant maps to the prior row, then the new results are added to those of the prior row (block 494) in the raw counts (block 490). The raw counts (block 490) may be stored as column identifier:count data corresponding to each row identifier. For example, the raw counts may be provided as "Row identifier, column identifier:count, column identifier:count, . . . " If the variant does not map to the prior row, and then a new row is added (block 496) to the raw counts (block 490).

For each column collation within each row queue collation (block 482), a determination may be made as to whether the variant maps to a prior column (block 484). As the variants are treated additively, a count for a variant that maps to a prior column is added to the count of the prior column (block 486) in the raw counts (block 490). If the variant does not map to a prior column, then the column identifier: is added (block 488) to the raw counts (block 490).

Figure 24:
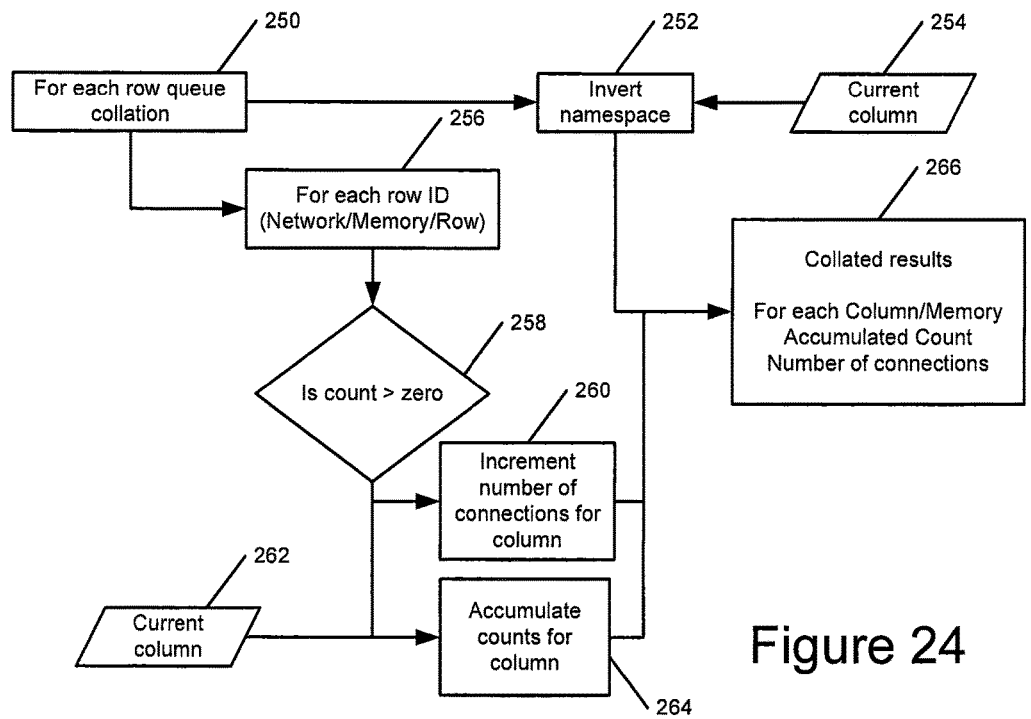
FIG. 24 is a flow chart illustrating operations for accumulating raw results according to some embodiments of the present invention.

After the variants are collapsed, as described above regarding FIG. 23, the raw results may be accumulated, as described in reference to FIG. 24, which is a flow chart illustrating operations for accumulating raw results according to some embodiments of the present invention. Operations for accumulating raw results may provide a synchronization of the data coming from the row queues with respect to each column identifier. In some embodiments, for each column step (block 250), and for each row identifier (Network:Memory:Row) (block 256), if the count is greater than zero (block 258), then the current count (block 262) for that column is accumulated with other counts for that column (block 264). Additionally, in some embodiments, the number of connections for that column is incremented (block 260) to maintain the number of connections that correspond to the accumulated count in the collated results (block 266).

Some embodiments provide that the namespace for the current column (block 254) is inverted (block 252) and including in the collated results (block 266). Inverting the namespace may provide an answer oriented collation. For example, where the original namespace was defined based on increasing granularity, the inverted namespace may be column oriented. In this regard, the collated raw result may provide a row count and a number of connections for every "Column:Row:Memory:Network".

Further, the expansion and collapse of the variants, as discussed above regarding FIG. 23, represent one example of a Boolean structure that may be applied to the input query. In this regard, some embodiments provide that the input query may include one or more types of Boolean structure, which may be expanded and/or collapsed before and/or after, respectively, retrieving the raw counts. Accordingly, in some embodiments, the Boolean specification of the query may be applied to the interpretation of the row counts. In this manner, Boolean satisfaction may be used to process input queries including varying levels of logical complexity to extract the richness of the distributed associative memory base relative to the query logic.

Figure 25:
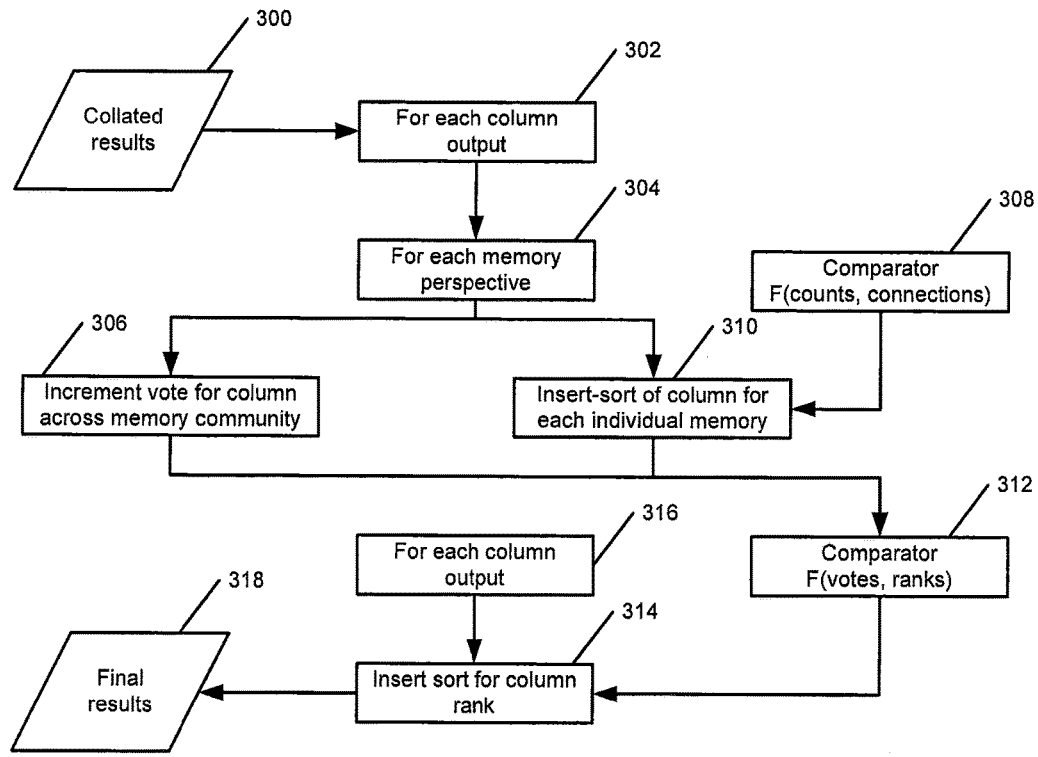
FIG. 25 is a flow chart illustrating operations for providing rank order results according to some embodiments of the present invention.

Reference is now made to FIG. 25, which is a flow chart illustrating operations for providing rank order results, as discussed above regarding FIG. 21, according to some embodiments of the present invention. Rank order operations on collated results (block 300) may be performed for each memory perspective (block 304) for each column output (block 302). In some embodiments, operations on each of the column/memory perspective combination may include incrementing a vote for each column across the memory community (block 306). The vote may correspond to a non-zero value and may be provided as a temporary result that provides a measure of connectedness. For example, the vote may represent a semantic existence of the connection. Some embodiments provide that each non-zero column/memory result includes one vote.

Using a comparator function (block 308) that may compare collated results in terms of counts and connections, a sort of the columns is inserted for each individual memory (block 310). A comparator function (block 312) that may compare the votes and column sorted ranks may provide an overall column rank (block 314) corresponding to each column output (block 316) to provide rank ordered final results (block 318).

Figure 26:
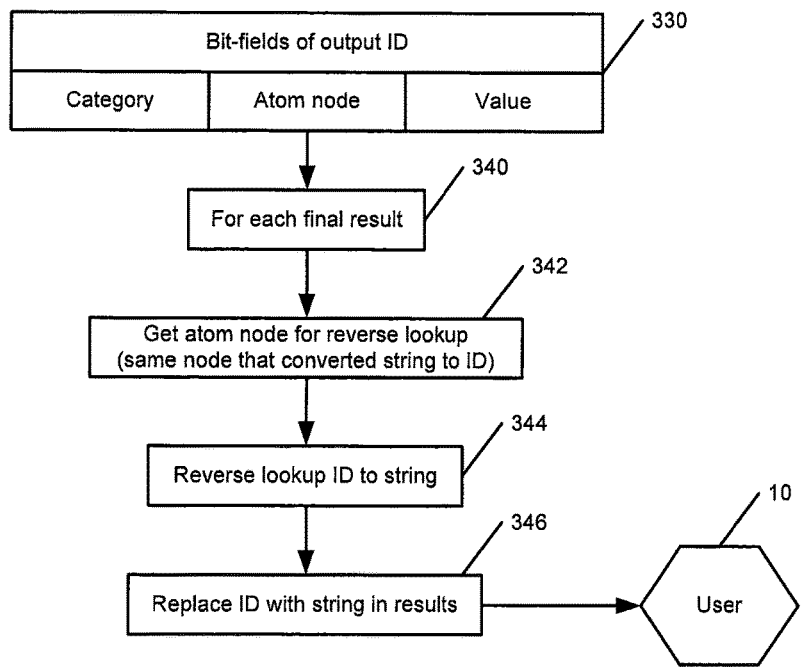
FIG. 26 is a flow chart illustrating operations for converting output identifiers to namespace strings according to some embodiments of the present invention.

Reference is now made to FIG. 26, which is a flow chart illustrating operations for converting output identifiers to namespace strings, as discussed above regarding FIG. 21, according to some embodiments of the present invention. As described above regarding FIG. 11, the output identifiers may include fields corresponding to category, atom table node and value. For each final result output identifier (block 340), the atom node is determined for a reverse lookup (block 342). A reverse lookup is performed to determine the query string name that corresponds to the output identifier (block 344). The query string name is used to replace the output identifier (block 346).

Figure 27:
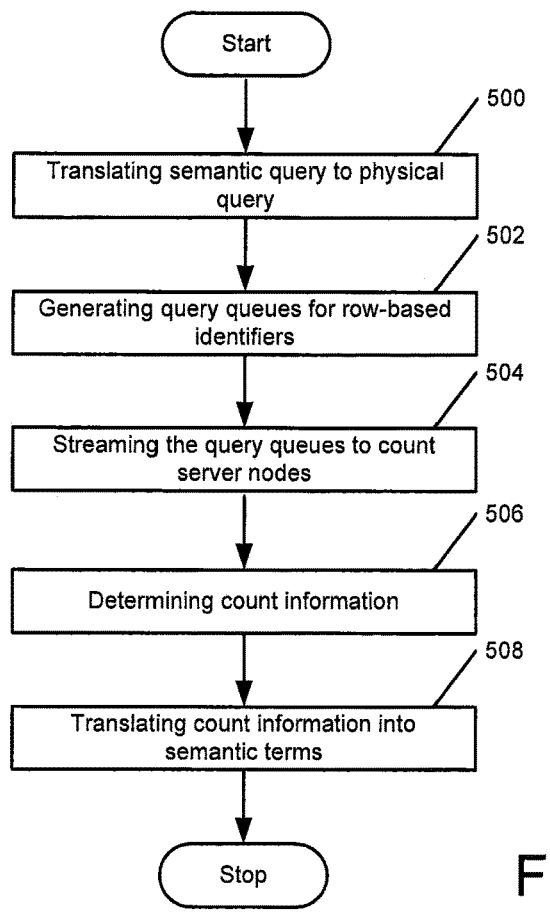
FIG. 27 is a flow chart illustrating operations for querying a distributed associative memory base according to some embodiments of the present invention.

Reference is now made to FIG. 27, which is a flow chart illustrating operations for querying a distributed associative memory base according to some embodiments of the present invention. A semantic-space based query that is received from a user is translated into a physical-space based query (block 500). Some embodiments provide that the physical-space based query that is expressed as multiple row-based identifiers that correspond to respective physical memory locations in at least one of multiple associative memory networks in the distributed associative memory base.

Multiple query queues that correspond to the row-based identifiers may be generated (block 502). The query queues may be streamed to multiple count server nodes that correspond to the associative memory networks (block 504). Count information responsive to the query queues may be determined from the node servers (block 506). Count information from the node servers may be translated into semantic-space based result information that is responsive to the semantic-space based query.

Figure 28:
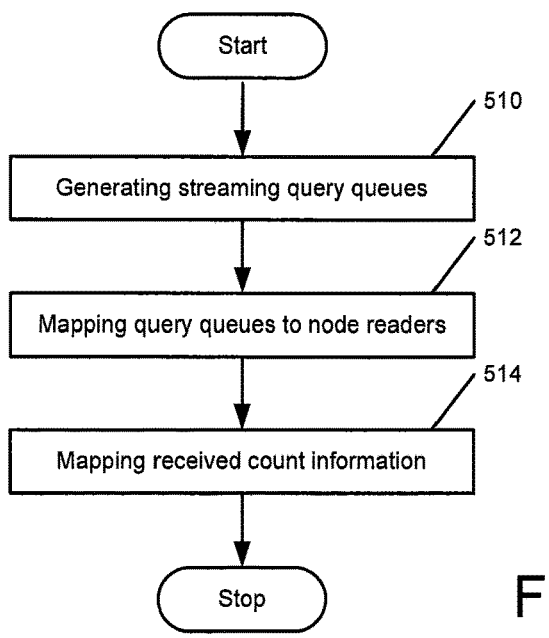
FIG. 28 is a flow chart illustrating operations for using a distributed associative memory base according to some embodiments of the present invention.

Reference is now made to FIG. 28, which is a flow chart illustrating operations for using a distributed associative memory base according to some embodiments of the present invention. Multiple streaming query queues that correspond to a physical-space based query may be generated (block 510). In some embodiments, the streaming query queues may be expressed as a multiple row-based identifiers of respective physical memory locations in at least one of multiple distributed associative memory networks.

Some embodiments include mapping ones of the streaming query queues to multiple node readers that are operable to receive count information from multiple count server nodes that correspond to the distributed associative memory networks (block 512). The received count information may be mapped back to corresponding ones of the streaming query queues (block 514).

Figure 29:
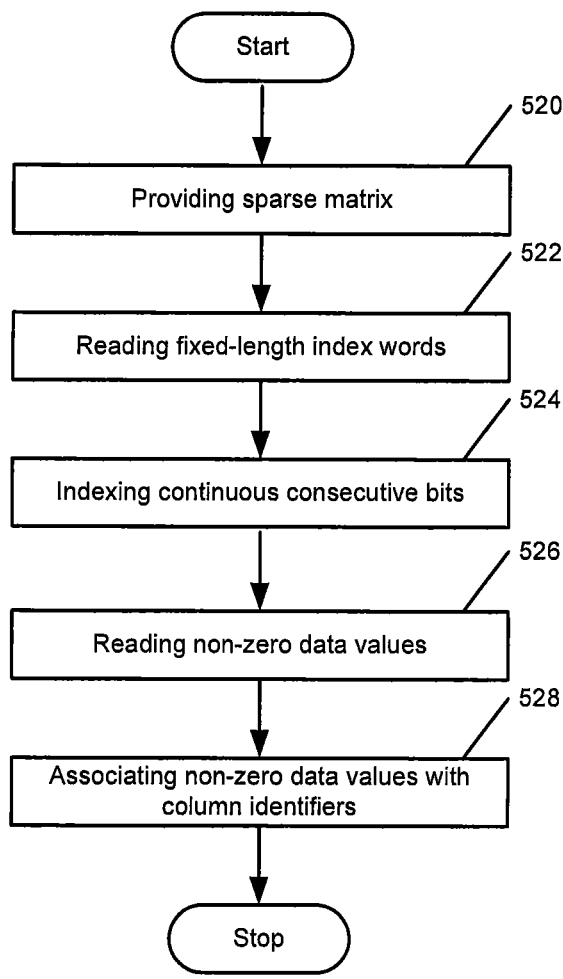
FIG. 29 is a flow chart illustrating operations for encoding data in a large sparse matrix according to some embodiments of the present invention.

Reference is now made to FIG. 29, which is a flow chart illustrating operations for encoding data in a large, sparse matrix according to some embodiments of the present invention. A sparse matrix that includes non-zero data locations that are identified by row identifier and column identifier values may be provided (block 520). Fixed-length encoded matrix index words may be read (block 522). For a given row in a sparse matrix, continuous consecutive bits having zero value may be indexed by providing encoded index offset values having variable word lengths in at least one fixed-length encoded matrix index word (block 524). Variable word length non-zero data values may be read from at least one fixed-length encoded matrix index word (block 526). Variable word length non-zero data values may be associated with corresponding column identifiers (block 528).

Associative memory systems, methods and memory bases as described herein may be used to support high performance computing as a massive "correlational" store as well as connection store. Formally speaking, "correlation" may be commonly understood as any statistical relationship between variables. For example, in finance, we may want to know how one stock moves in relationship to another.

Systems described herein may store the counts of connections, which may represent raw counts. Such count data may or may not provide meaningful information. For example, consider the sun coming up every morning as coincident with every other event in the day. For raw counts, the key:value sun:up may have a strong association—the strongest possible count—with everything else. Ask anything in the query and sun:up will be the strongest association based on raw coincidence counts. For example, stocks:up will have the strongest possible association with sun:up. However, there is no dependency between stocks:up and sun:up. The sun coming up provides no information to the direction of the stock market. On the other hand, assume that if Punxsutawney Phil Sowerby sees his shadow on Groundhog Day, then there may be a late Spring. If not, there may be an early spring. If this coincidence pattern were true (just assume), then there is a dependency between Phil seeing his shadow and the onset of Spring. In general, dependency may measure how often one thing's presence depends on another thing's presence. Beyond existence of a connection or even strength of connection, dependence measures the deeper informativeness of each link.

The mathematics of cognitive distance will now be explained, including derivations of its various approximations for reasoning by similarity according to some embodiments of the present invention. In addition to an intuitive explanation, discussion of distances measures, such as Hamming distance and Jaccard similarity (distance), which are intimately related to associative memories, is provided. Additionally, the similarity of Jaccard similarity and the Shannon entropy measure for similarity are addressed.

The Jaccard Distance based on the Shannon mutual information can be generalized to information distance based on Kolmogorov Complexity. This normalized form of information distance may be referred to as the cognitive distance because it is a universal distance measure that can be derived from physics as well as from information theory.

Additionally, the Shannon mutual information can be used when approximating the cognitive distance between ensembles. However, in order to approximate the distance between single objects, an approximation that goes beyond Shannon entropy may be used. Considering intelligence as a problem of compression may come closer to the true nature of Kolmogorov complexity.

Reasoning by similarity may be fundamental to associative memories. Whether Hopfield Networks or neurocomputing, both approaches address bit-distances, or Hamming distances. Given two bit vectors, the Hamming distance between them is the number of bits that are different. The converse, similarity, is the number of bits that are the same.

The Ising Spin Model of magnetic spins, UP or DOWN and how they interact to transition from chaos (non-magnetic) to order (magnetic), may be isomorphic to associative memories. For example, state vectors can be stored in a network of neurons that are connected to each other. Such a network of neurons can be described by connections and counts forming a content-addressable associative memory. When a new bit vector is applied to such a network, it asynchronously flips the vector bits to recall the closest memory location (mathematically speaking, a fixed point) formed by previously loaded vectors.

Figure 30:
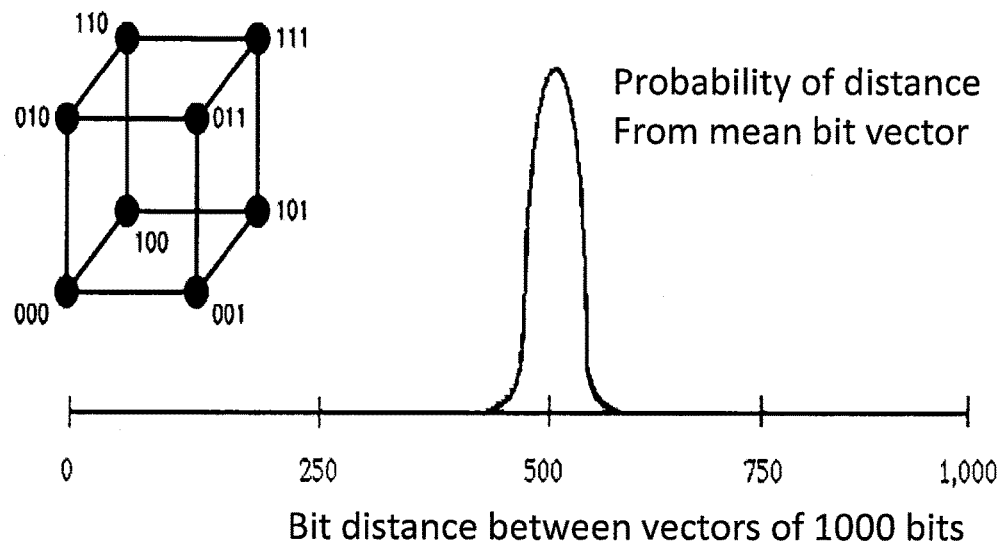
FIG. 30 is a cube defined by 3 bits and a plot of the probability of distance from a mean bit vector between vectors of 1000 bits according to some embodiments of the present invention.

Brief reference is now made to FIG. 30, which is a cube defined by 3 bits and a plot of the probability of distance from a mean bit vector between vectors of 1000 bits according to some embodiments of the present invention. Given three bits, a cube describes the vertex location of each vector in Hamming space. The Hamming distance from one vertex to another is seen as the number of bit-flip, such as the distance from 000 to 111 as 3. As the Hamming space becomes larger, such as to 1000 bits, the probability of distances falls exponentially. Assuming a mean vector of 500 bits ON and 500 bits OFF, the likelihood of a vector with more than 80 bits different is only 0.0000001%. Vectors that are different are very different by this distance measure.

The nature of Hamming space particularly provides that distance probabilities are much farther away than in Euclidean space. For example, in a random vector space of 1000 bits, the mean distance between any two vectors is 500 bits with a standard deviation (one "sigma") of only 16 bits. In other words, at a distance of 5 standard deviations to the mean, only 80 bits are different but only one in a million vectors are likely to be outside this distance. Things that are far away are very far away. In this regard, Hamming space may maximize the probabilities of such separation more than Euclidean space.

Hamming space may also addresses continuous variables through discretization. Many techniques of discretization are possible, including thermometer codes, percentile binning, and/or entropy-based binning over a continuous variable range, among others. In this way, bit vectors can represent both structured and unstructured data sources containing both categorical and continuous variables. In the same way that schema-free graphs may unify the connection knowledge from different data sources, the universal representation of a bit vector may unify different data types into the more ideal properties of Hamming space for measuring distance between vectors.

Some embodiments provide that neurons may also prefer these bit-oriented properties through the "line coding" of neural synapses. Each synapse is discrete, and the receiving neuron does not know the source or semantics of the input neuron. As with each bit in a bit vector, each synaptic input line represents its part of the input pattern, and these input lines are all the receiving neuron can use for its computations. Some embodiments provide that the memory base disclosed herein may work the same way. Matrices may represent simplified neurons by storing connections and counts between category:values, transformed into line code IDs. The matrix does not know the source or semantics of the IDs that feed its perspective.

Hamming distance assumes that every bit in a vector space is either ON or OFF, that the vector is always complete. In reality, many observations of the world may present themselves as partial vectors. For example, two documents will likely be of different lengths and partially different terms. A more generalized associative memory may allow unknown bits as neither ON nor OFF. For comparing vectors of different size and different attributes across diverse observations, Jaccard distance may be similar to Hamming distance but without a penalty for non-matching OFF bits. Looking at only what is ON in the two vectors, Jaccard similarity is defined as:

$$J(A, B) = \frac{|A \cap B|}{|A \cup B|}.$$

In other words, similarity is a measure of the intersection of ON bits in vectors A and B (both bits ON) compared to their union (either bit ON). A memory base as disclosed herein may work similarly in evaluating only the ON bits. An entire memory space can easily reach billions if not trillions of attributes, whereas specific query vectors concern only a subset of the universe when reasoning by connection and similarity.

Depending on the application and uncertainty in data, the memory base may further limit the measure of similarity to only the intersection of what is known. For example, not knowing whether someone is married cannot be assumed as unmarried. In national security, a well known aphorism warns, "[a]bsence of evidence is not evidence of absence." As famously distinguished according to "known knowns . . . known unknowns . . . and unknown unknowns", systems, methods and a memory base as disclosed herein have exhibited better accuracy with this approach for alias detection, looking for similar persons to a target person. In some embodiments, vector-space matching has been found to be 40× more accurate than rule-based pattern matching. Some embodiments include the feature and relationship connections of data. For example, given one thing, features and relationships may be looked-up as the "signature" vector to compute Jaccard-like similarity. As well, entropy may be computed to weigh the "interestingness" or informativeness of these connections. For example, in a "bad guy" database, being male is completely uninformative if all the persons are male. It adds no information to help the matching. Similarity distance may be based on semantic connections as well as on statistical frequencies.

In computer science, entropy may be a measure of information, in terms of bits. Entropy may measure the degree of information uncertainty in the data. Entropy may provide a non-parametric approach to measuring dependency, which is independent of the actual random variables but rather depends on their distribution. A major weakness of many traditional methods like regression analysis, Principle Component Analysis (PCA), Fisher discriminant analysis, etc. is that they are not invariant under a transformation of the variables. For example a linear scaling of the input variables (that may be caused by a change of units for the measurements) is sufficient to modify PCA results. Feature selection methods that are sufficient for simple distributions of patterns belonging to different classes can fail in classification tasks with more complex decision boundaries. In addition, methods based on linear dependence (like correlation) cannot take care of arbitrary relations between the pattern coordinates and the different classes.

In contrast, entropy, and more precisely the mutual information, can measure arbitrary relations between variables and may not depend on transformations acting on the different variables. Entropy does not depend on variables but instead depends on their distribution. Thus, entropy may provide a more general measure of dependence.

Figure 31:
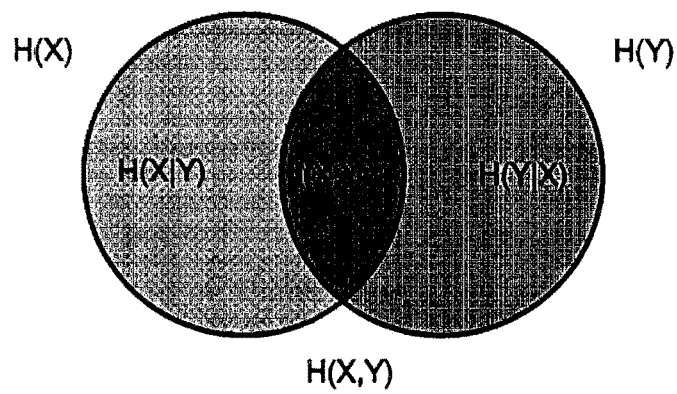
FIG. 31 is a Venn diagram illustrating entropies according to some embodiments of the present invention.

Reference is now made to FIG. 31, which is a Venn diagram illustrating entropies according to some embodiments of the present invention. A Venn diagram may provide a common way to explain the different elements of entropy, denoted by H. H(X) and H(Y) represent the information in each separate circle for variable X and Y, respectively, called marginal entropy. H(X,Y) represents their combined information, or joint entropy, which is the entire space of the diagram. I(X:Y) is the mutual information, shared by both X and Y. H(X|Y) and H(Y|X) represent conditional entropies, such as the information "left over" in X when given Y and visa versa. Thus, H(X)=H(X|Y)+I(X;Y). In other words, the total entropy of X equals the conditional entropy of X given Y and the mutual information between X and Y. Additionally, H(X|Y)=H(X)−I(X;Y). This may represent the "divergence" of X given Y and is discussed below. Mutual information is central to the diagram and may be central to the mathematical links to distance, dependency, divergence, and complexity.

More formally, dependency is a general concept, which can be formalized using mutual information:

$$I(X;Y) = \sum_{y \in Y} \sum_{x \in X} p(x,y) \log\left(\frac{p(x,y)}{p(x)p(y)}\right),$$

For simplicity, point-wise mutual information (pmi) measures the information content of the cell count between x and y at one point, one cell, in an associative matrix:

$$pmi(x;y) \equiv \log\frac{p(x,y)}{p(x)p(y)}$$

In other words, pmi is the logarithm of the lift. Lift is the probability of the coincidence count between two attributes, x and y, divided by the two probabilities of each attribute separately. For example, not knowing anything about English, we would like to learn if the concatenation of "vice" and "president" has any meaning. We look for how often do we see "vice president" in a document vs. finding "vice" and "president" separately. To the degree the combined frequency lifts away from the independent frequencies, there is meaning in "vice president" together.

"Mutual information", which may be the sum of pmi over all values in a category for example, may be used interchangeably for both I(X;Y) and pmi, unless the distinction needs to be made clear when applied to different uses. In either case, the computation of mutual information at each point may use 4 counts from a memory base. The probability of p(x,y) uses the count x,y divided by N, the number of total data observations. Similarly, p(x) and p(y) uses the independent counts of x and y also divided by N.

Further, mutual information between two variables can be extended to three and more variables. More information often "lives" in these higher interactions. For example, binary events a and b are independent if and only if P(x, by)=P(x)P(y) from which I(x,y)=0 follows, which implies that x is irrelevant to y. However, independence is not a stable relation: x may become dependent on y if we observe another event z. For example, define z to happen depending on when x and y take place. The exclusive-OR function may be an example. For example, two independent random events (e.g. sources generating 0s and 1s) are observed. Whenever only one of the two sources generates a 1, a bell rings that we call event z. The bell (Z) makes source X and Y dependent. Therefore, even if X and Y are independent and random, they become dependent in the context of Z. This contextual dependency will be further described in the applications below, in, for example, the computation of conditional distances or classifications that assume the class as a condition.

In contrast with the esoteric interactions corresponding to the XOR function, 3-way interactions are substantively more complex. For example, consider the task of detecting criminal behavior by finding regularities in huge amounts of data. The attributes of a person's employment and criminal behavior may not be particularly dependent attributes (most unemployed people may not be criminals, and most criminals may be employed). However, adding the knowledge of whether the person has a new sports car paid for by cash suddenly makes these two attributes dependent. For example, it may be a lot more likely that an unemployed person would buy new sports car with cash if he were involved in criminal behavior. The opposite may also be true in that it may be less likely that an unemployed person will buy a new sports car with cash if he is not involved in criminal behavior. The dependency is not absolute, however, as the person may be unemployed and wealthy. The relationship is only more likely. This concept is captured by the measure of the intersection of all three attributes, or inter-action information. Interaction information may be expressed as:

$$I(X;Y;Z)=H(X,Y,Z)-H(X|Y,Z)-H(Y|X,Y)-H(Z|X,Y),$$

where the interaction information among three attributes can be understood as the amount of information that is common to all the attributes, but not present in any subset. Like mutual information, interaction information is symmetric, meaning that $$I(X;Y;Z)=I(X;Z;Y)=I(Z;Y;X).$$

Three-way mutual information or interaction information may be very relevant in many difficult classification and pattern recognition examples. In biochemistry for example, additional information may be found in higher dimensional hyper-matrices. The memory base as disclosed herein may store such "triple" interactions together with corresponding triple semantics. Each matrix may include a conditional label and all of its internal statistics may be conditional to this label. In this way, pair-wise mutual information is extended to three-way "conditional mutual information" (and interaction information). This allows memory base to discern the signal from the noise much better than systems implementing 2-way correlations (dependencies).

Returning to the Venn diagram of entropies, the two conditional entropies, dxy=H(X|Y)+H(Y|X) can be seen as the compliment of mutual information, also called variation information. Variation information may represent how far apart things are. It is a distance measure since it satisfies dxx=0, is symmetric (dxy=dyx), and satisfies the triangle inequality.

As illustrated in the Venn diagram, dxy=H(X,Y)−I(X;Y). Stated differently, the distance dxy can be seen as the difference between a complexity term, the joint entropy H(X,Y), and a similarity term, the mutual information I(X,Y). Imagine two Venn diagrams, one much larger than the other in total joint entropy H(X,Y) but where the amount in mutual information is the same. Mutual information is the same, but in the bigger diagram the distance between X and Y (i.e., H(X|Y)+H(Y|X)) is greater. Casting H(X,Y) as a measure of complexity for the joint distribution P(X,Y), distance can be seen as a tension between complexity and similarity. If two attributes X and Y share the same mutual information with the class attribute C (e.g., C may represent credit risk: C={high, low}) we would choose the attribute, which has the smaller complexity for predicting high or low C. This may be likened to Occam's razor in that if we can explain something using different attributes we may choose the simplest one, i.e. less complex one.

The concept of entropy can be generalized to what may be referred to as Renyi entropy, which seeks the most general class of information measure that preserves the additivity of statistically independent systems and is also compatible with a Kolmogorov probability axiom, as provided below:

$$H_\alpha(X) = \frac{1}{1-\alpha} \log\left(\sum_{i=1}^{n} p_i^\alpha\right)$$

Here, X is a discrete random variable with possible outcomes 1, 2, ..., n and corresponding probabilities $p_i$=P(X=i) for i=1 ..., n; a is a real or complex number that is greater than or equal to 0 and not equal to 1. The Renyi entropy may appear to be singular for α=1, but one can show that it is well defined for around α=1. For example, α=1 is referred to as Shannon entropy.

Renyi entropy has been applied in economics, ecology, demography and information science to quantify diversity. In this context the value of α may be referred to as the order of the diversity. It may define the sensitivity of the diversity value to rare vs. abundant species by modifying how the mean of the species' proportional abundances ($p_i$) is calculated. In this sense, n may be the richness, i.e. the total number of types in the dataset.

Some values of a give the familiar kinds of means as special cases. In particular, α=0 may correspond to the harmonic mean (Hartley entropy), α=1 to the geometric mean (Shannon entropy) and α=2 to the arithmetic mean (often called Renyi entropy). As a approaches infinity, the generalized mean with denominator 1−αapproaches the maximum $p_i$ value, which is the proportional abundance of the most abundant species in the dataset. In practice, increasing the value of α may increase the effective weight given to the most abundant species.

When α=1 (Shannon entropy) the geometric mean of the information (log $p_i$) may be used, and each species may be exactly weighted by its proportional abundance $p_i$. When α>1, the weight given to abundant species may be exaggerated, and when α<1, the weight given to rare species may be stressed. At α=0, the species weights may cancel out the species proportional abundances, such that mean $p_i$ equals 1/n even when all species are not equally abundant. This so called Hartley entropy may simply be the logarithm of n. This may be similar to a Shannon transmission problem where all probabilities for the random variables are equal. At α=0, the effective number of species exp($H_\alpha$) may equal the actual number of species (n).

Besides using Renyi entropy for search and discovery as a measure for entity diversity (e.g., people, products, companies, customers), the Hartley entropy can be used as the most basic classification algorithm. For example, an application of the memory base for spam filtering provided significant performance improvements by simply adding up the associative counts in one memory versus another. Hartley entropy may work when the random variables are expected to be substantially equally distributed. For unknown distributions of random variables, the more universal cognitive distance approximated by Shannon mutual information may be used.

As disclosed herein, a universal measure of information beyond Shannon's entropy that does not rely on probabilistic assumptions and the concept of transmitting ensembles of bit strings may be provided. For example, a measure of information content of an individual finite object, and in the information conveyed about an individual finite object by another individual finite object may be provided. The information content of an object x may be an attribute of x alone, and not depend on, for instance, the averages chosen to describe this information content. The resulting theory of information may be based on Kolmogorov complexity K(x) and may take into account the phenomenon that 'regular' strings are compressible.

By way of example, Shannon's classical information theory may assign a quantity of information to an ensemble of possible messages, for example, the ensemble consisting of all binary strings of length 99999999. Assuming that all messages in the ensemble are equally probable, we require 99999999 bits on the average to encode a string in such an ensemble. However, there is no indication regarding the number of bits needed to convey any individual message in the ensemble. For example, the string consisting of 99999999 1's can be encoded in about 27 bits by expressing 99999999 in binary and adding the repeated pattern "1", or even shorter as $3^2 \times 11111111$, and the 8 1's can be encoded as $2^3$. In order for this approach to work however, an algorithm for decoding the encoded string is established.

Using the length of an algorithm to encode a string as a proxy for Kolmogorov complexity leads to a deeper understanding for randomness too. For example, a random string can be encoded only by enumerating the whole string (K(X)=|x|, where |x| is the length of the string). In contrast, a string showing a pattern as a regularity can be encoded with a program much smaller than the length of the string (K(x)«|x|). Think of the number PI=3.1415 ..., an infinite sequence of seemingly random decimal digits. Yet the complexity and thus randomness of PI may be small because it contains just a few bits of information, i.e. the length of a minimal program needed to produce all its decimal digits.

An intuitive view to understand K(x) is to think of it as a compressor. For example, a book containing random strings cannot be compressed, while a book by Shakespeare can be compressed considerably. Two infinite random strings will have infinitely many substrings in common while the DNA of a human will have more substrings in common with a chimpanzee than a cat. This notion of similarity may be used for reasoning in the memory base.

The Kolmogorov similarity may look quite similar to entropy similarity. For example:

$Ik(x:y)=K(x)-K(x|y)\sim K(x)-K(y)-K(xy)$.

In the Venn diagram for entropy, this was expressed as:

$I(X,Y)=H(X)+H(Y)-H(X,Y)$.

Similar to Shannon Entropy, K(x)−K(x|y) is the amount of information y knows about x. K(xy)(~K(x,y)) is the minimal length needed to encode the concatenated string xy. K(xy) is larger than K(x) but not larger than K(x)+K(y), very similar to the Venn diagram above. If x and y have the same complexity, then:

$K(x)=K(y)=K(xy)$.

For example, if two files are absolutely different, then there is no benefit of compressing them together as a combined compression will be no shorter than the two separate compressions. However, to the degree that the documents are similar, the compression size of both documents together may become shorter than their compression separately. Similarly, to the degree that randomness does occur within an object, the compression length will be increased.

The Kolmogorov (or information) distance may look similar to the entropy distance, as the difference between a complexity and a similarity term:

$Dxy=H(X,Y)-I(X,Y):dKxy=\max\{K(X),K(y)\}-Ik(x:y)$.

In this manner, Kolmogorov complexity may be used for a universal information distance.

The Shannon mutual information and the algorithmic (Kolmogorov) mutual information may be closely related. One can show that the distance dIxy based on mutual information may be a good approximation to dKxy for certain cases. A mutual information of a thousand bits may be considered large if X and Y themselves are only a thousand bits long. In contrast, a mutual information of a thousand bits may be considered very small if X and Y would each be very large, say 1 M bits. Normalizing $H(X,Y)-I(X,Y)$ in the case of entropy may be performed to arrive at a distance that is unbiased by the size of the random variables compared:

$$DExy=\{H(X,Y)-I(X,Y)\}/H(X,Y)=1-\{I(X,Y)/H(X,Y)\}.$$

DExy is the Jaccard distance=1. This is the entropic form of intersection relative to union, i.e. the mutual information relative to the joint entropy.

The normalized information distance may be an equivalent For example:

$$DIxy=1-Ik(x:y)/\max\{K(x),K(y)\}=\max\{K(x|y),K(y|x)\}/\max\{K(x),K(y)\}.$$

Kolmogorov complexity and the universal information distance may not be expressly computed as a side effect of their universality due to the Turing halting problem. However, other way may be used to approximate Kolmogorov complexity. For example, compressors like gzip, PPM, and/or others may be used. Regarding the similarity between single objects, K(x) may be approximated using Shannon-Fano code, one of the earliest compressors. The distance between two objects like "cowboy" and "saddle" occurring in a very large collection of documents, indexed by a web search engine such as Google may be calculated. For example, the Shannon-Fano code for any object may be ~log Px. Px=x/N, x being the number of pages returned when searching for "cowboy" and N being the number of total pages indexed. Also including the page counts for "saddle" as y and "cowboy saddle" as xy, substituting this into the above formula for DIxy provides:

$$DIxy=\max\{\log(x), \log(y)\}-\log(x,y))/(\log N-\min\{\log(x), \log(y)\}.$$

Doing the same for "cowboy", "movie", and "cowboy movie", the raw coincidence count between "cowboy" and "movie" is much higher than that for "cowboy" and "saddle", but saddle is much closer—has a smaller distance—than "movie" in cognitive space. Using Google page counts as in these examples, this distance has been called the Google Similarity Distance.

Some embodiments provide that a query seeks an answer that corresponds to the more popular category. For example, the query "Where did Steve Jobs likely live?" may be posed. The memory base would be queried "Steve Jobs" and answers corresponding to co-occurrences to the category city would be sought. Using the max distance would show Palo Alto as the first result before San Francisco. This filtering out of larger, more popular entities is what we wanted in the "cowboy saddle" case. San Francisco as the more popular category has more entities in its neighborhood. As such, not all of them can be close. For the less occurring city of Palo Alto (with the bigger Kolmogorov complexity), Steve Jobs is relatively speaking more important than San Francisco. In other words, the category San Francisco has a lot of information that is irrelevant to the fact of Steve Jobs lived in the Silicon Valley, and symmetrically, Steve Job contains much information, irrelevant to San Francisco. In this regard, such irrelevant information must be accounted for.

The table below illustrates the counts, coincidence, maximum distance and minimum distance of various terms to "cowboy" from Google searches.

|  | Independent counts | Coincidence to cowboy | MAX Distance | MIN Distance |
| --- | --- | --- | --- | --- |
| Cowboy | 95,300,000 | 95,300,000 | 0.0000 | 0.0000 |
| Cow | 137,000,000 | 98,800,000 | 0.0470 | −0.0055 |
| Cowgirl | 53,400,000 | 21,220,000 | 0.1993 | 0.1327 |
| Horse | 431,000,000 | 43,000,000 | 0.3314 | 0.1461 |
| Saddle | 64,600,000 | 7,170,000 | 0.3522 | 0.3160 |
| Movie | 1,890,000,000 | 73,000,000 | 0.4678 | 0.0672 |
| N | 100,000,000,000 |  |  |  |

Given the independent and coincidence document counts from Google searches, the maximum distances are computed as shown above, with "cow" as closest to "cowboy" and "saddle" closer than "movie", a very popular concept. Computing the minimum distance, however, the popularity of "movie" is allowed. Minimum information distance elevates the more popular result of "movie" (lower Kolmogorov complexity), while the rest of the distance sequence stays relatively unchanged.

To include the more popular information, the minimum distance of $\{K(x|y),K(y|x)\}$ may be computed instead of the maximum distance. This is not a distance in the strict sense. Triangle inequality and density constraint are violated, but this is intended. For partial matching, the triangle inequality does not hold. For example, Marilyn Monroe is close to JFK, and JFK is close to the concept of president, but Marilyn Monroe is not closely related to the concept of president. Relaxing the neighborhood requirement (density constraint), some concepts may be allowed to have denser neighborhoods. Allowing those very popular objects to have denser neighborhoods makes it possible to select them more often. The use of minimum information distance may be restricted to popular (frequent) categories. Normalizing this distance by dividing it by $\min\{K(x),K(y)\}$ analogous to the max distance case, we derive:

$$dIxy_{min}=\min\{K(x|y),K(y|x)\}/\min\{K(x),K(y)\}.$$

Doing the equivalent substitution in the previous equation as for the cowboy and the saddle example, where we have used the Shannon-Fano code to write $K(x)\sim\log(f(x)/N)$, we derive:

$$dIx,y_{min}=\log(f(x,y)/N)-\max\{\log(f(x)/N), \log(f(y)/N)\}/\min\{\log(f(x)/N), \log(f(y)/N)\}=(\min\{\log f(x), \log f(y)\}-\log f(x,y))/(\log N-\max\{\log f(x), \log f(y)\}).$$

As with entropy, these independent and pair-wise counts can be extended to the conditional information of triple-wise hyper-matrices in the memory base. The example around "cowboy" may represent a single term query. However, when additional context is included, the memory base as disclosed herein may also compute conditional distances.

For example, responsive to the query "[i]n what city was Alan Turing likely born?" If only asking about Alan Turing and cities, cognitive distance may provide candidate cities like, London, Manchester, and Wilmslow, for example. But for the specific question, the context of "born in" may be added to the computation of information distance. This may be performed by adding a condition to all terms in the equation for the original information distance. For example the minimum distance would look like:

$$dIxy|c_{min} = dI_{min}(x,y|c) = \{K(x|y,c), K(y|x,c)\}/\min\{K(x|c), K(y|c)\},$$

where c stands for the conditional information "born in" in this example. In this manner, distance can be computed between two things as well as for the distance of semantic triples when context is applied.

There are many similar measures of "interestingness", all of which may be based on the 3 fundamental counts of xy, x, and y. However, Kolmogorov complexity may be the more universal distance measure. As will be described, the memory base can lookup and compute over any of these counts (xy, x, y, and N) in real time. While raw counts may not tell too much to the naked eye, the memory base can easily and quickly compute a normalized distance measure that highlights the information most interesting for the user, given a certain query. Besides discovery (search), normalized information distance can be used for clustering (unsupervised learning), and classification and prediction (supervised learning). This application of the universal information distance for pattern recognition and prediction may be referred to as cognitive computing.

Kolmogorov complexity is based on a theory about the quantity of information in individual objects and may go beyond traditional statistics and information theory. Kolmogorov complexity measures how compressible a string is. A string whose complexity is close to its length is a random string, while regular strings can be compressed, i.e. generated by a program with a code length that is far shorter than the string length. For example, assume two different data files. Compress them separately. Then take both files together in a single compression. To the degree that the files are similar, the compression of both files together will be smaller than the compressed files taken separately. The similarity between any two such objects is measured by how much information they share, leading to a smaller compression when combined. There is a growing recognition that intelligence may be closely related to data compression.

In essence, the memory base may be considered as a compressor. Beyond a web search engine that calculates inverted indices, the memory base calculates a more informative associative index consisting of a full semantic graph and its counts. Rather than data per se, the memory base transforms data into these counts. These counts are directly related to the compression of information about "things". For example, the first method of compression, after Shannon founded Information Theory, was the Shannon-Fano code, based on word frequency. Higher frequency words are given shorter codes, thus they are less complex (small $K(x)$). In similar vein, the memory base stores frequencies, allowing measures of information and complexity as the intelligence needed to compute patterns and predictions.

An associative memory is a non-parametric, non-functional, minimal commitment form of machine learning. This is in contrast with conventional reductionist data modeling approach of trying to fit observed data statistically to a model. Instead, a memory simply stores all observed connections and counts in context and in real-time. There are no parameters, such as a "learning rates" to slowly adjust weights. There is no slow "fitting" of the model to the data. New data may be learned as data arrives, instantly transformed into connections and counts.

Using the memory base, "modeling" may be shifted to query time, which allows inference to consistently be up to date and flexible. Memories remain free of data assumptions and model parameters, letting the data speak for itself. This may be accomplished by the deep mathematically founded measure for similarity and distance. As discussed, distance in Hamming space, Shannon entropy, and Kolmogorov complexity are related, all offering in essence a measure of distance. If analogy is the "fuel and fire" of all our human thinking, then distance is its compliment for computation.

To be successful using the approach of delaying computation until a question is asked, query-time computations may be required to be exceedingly fast. In addition to storing the required counts, the lookup and aggregation of these counts must also be substantially instant. Particularly for queries that must quickly evaluate hundreds, thousands, or even millions of statistical pairs and triples, the physical organization of memory is critical. The implementation of memory base described herein provides the physical organization of the memory.

As described above, the concepts of dependence, divergence, and distance may be expressed in many mathematically related forms, whether based on Shannon entropy or Kolmogorov complexity. Such forms may include the counting of term frequencies, x and y, along with the associative frequency, xy, relative to the total number of observations, N. While systems disclosed herein may store and quickly recollect these counts for any of these computations, the Kolmogorov complexity approach may be more universal than other approaches.

Figure 32:
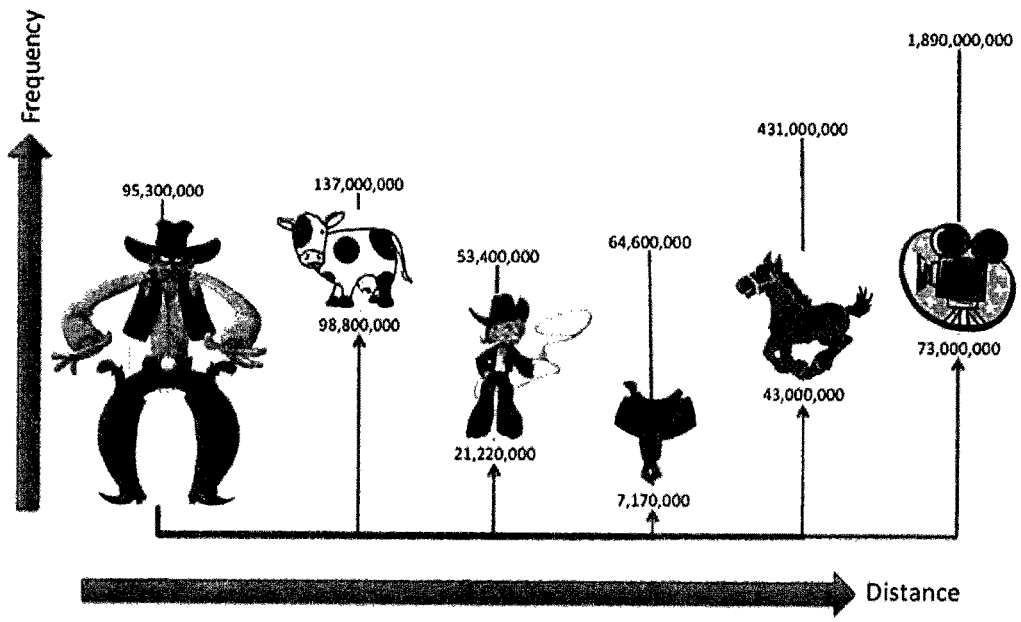
FIG. 32 is a plot of frequency and distance of search terms corresponding to an example of distance versus frequency.

Reference is now made to FIG. 32, which is a plot of frequency and distance of search terms corresponding to an example of distance versus frequency. For example, imagine a Google search for "cowboy saddle" that returns the count of documents with both terms. This is the count of xy. Searching for "cowboy" 610 and then "saddle" 616 returns their independent counts, of x and of y. A search of "cowboy movie" returns more results than "cowboy saddle" as stronger xy. If based purely on raw counts, we would say that movie has a stronger association. However, normalizing to the independent count of "movie" 620, as much higher than "saddle" 614, shows that "movie" 620 is NOT closer to "cowboy" 610 when compared to "saddle" 614—in cognitive distance, which may also be referred to as the Google Similarity Distance when using such search engine frequencies. Such simple Web searches show quite impressively how useful normalized information distance can be to lift the cognitive closeness of two concepts ("saddle" 616 to "cowboy" 610) away from the popular, high frequency concepts ("movie" 620), which may be less interesting.

The document counts for each term and the document counts for each term with "cowboy" 610 are shown as frequencies, low to high. For example, "saddle" 616 is indexed to over 64 million documents, co-occuring in the same document with "cowboy" 610 over 7 million times. Based on coincidence counts, "cow" 612 and "movie" 620 are most strongly associated with "cowboy" 610, but when distance is computed, "cow" 612 remains closest to "cowboy" 610 and "movie" 620 becomes more distant. In the most extreme comparison, the count for "cowboy saddle" is an order of magnitude lower than "cowboy movie", but "saddle" 616 is cognitively closer to "cowboy" 610.

In some data related discussions, for example in the context of national security, concerns may arise that larger and larger "haystacks" simply make it more difficult to find the needles. For example, as more and more links are made to a node, information may decrease. In the limit, a node connected to everything means nothing in the sense of the connection carrying no information. In some embodiments, the needles may be filtered from the haystack using a semantic context as a first filter. For example, the entire contents of a data source may be less relevant when a specific data type may be sought. Some embodiments provide that semantic subsets can be large in big data. In this regard, the strength of the link may provide a filter. For example, the links may be rank ordered according to their strength. Raw strength may contribute to this, but to further filter the needle from the hay, cognitive closeness (or Cognitive Distance as its compliment) may provide a deeper measure. A metaphor of the needle in a haystack may be countered with the suggestion to use a magnet. In the same way, the magnetic "spins" of objects may be measured in order to find others that are also spinning UP when a target is spinning UP. Some embodiments provide that such dependencies may be computed in order to lift the dependent objects from the massive stack of hay.

Several properties may be critical to compute such correlations, especially en masse. The implementation of a scalable associative memory as disclosed herein may include row partitioning for row dominance in queries, attribute grouping for locality of answers, global sorting to aggregate across answers, and streaming aggregation to provide answers quickly.

Such properties are described for the fast recollection of "raw" connections and counts. For example, a query can address any one matrix or any one row of the matrix, which streams all the values of any category group, all collocated. This recollection of raw connections supports simple query as in a graph store. Some embodiments provide that a memory base as disclosed herein may include the raw coincidence count of every category:value returned. When two or more memory-matrix-rows need to be aggregated, all category:values may be sorted in a globally consistent order, allowing the aggregation of merged semantics and statistics. Some embodiments provide that this streaming aggregation may further compute statistics over the stored counts, nearly as fast as returning the counts themselves.

Figure 33:
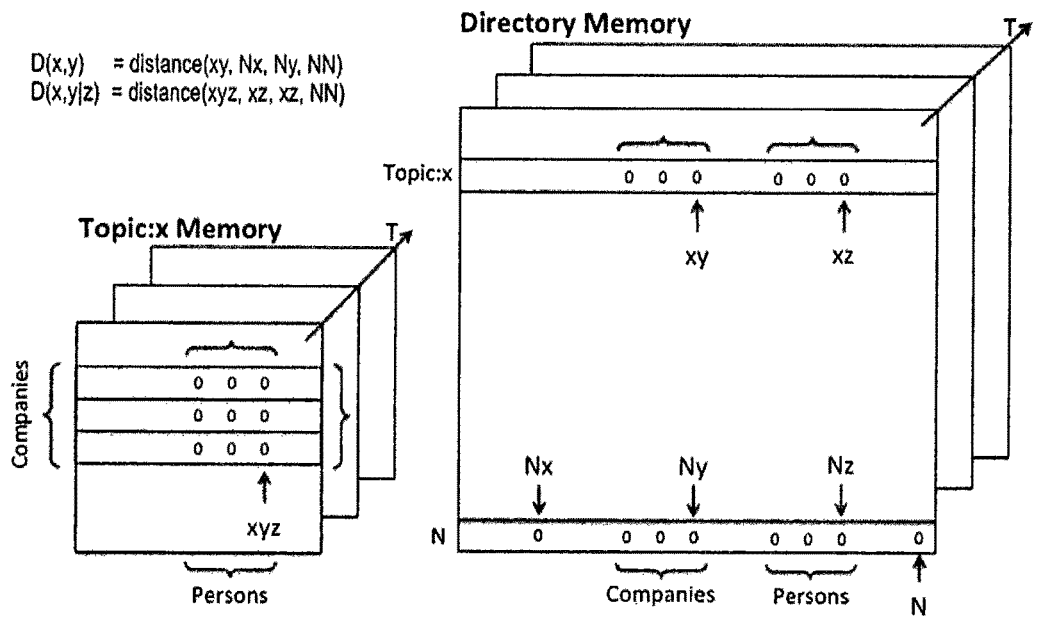
FIG. 33 is a block diagram illustrating a memory organization of required counts according to some embodiments of the present invention.

Reference is now made to FIG. 33, which is a block diagram illustrating a memory organization of required counts according to some embodiments of the present invention. The computation of pair-wise distance may use the coincidence xy count and two independent counts for x and y along with N, the total number of observations. These counts may be highlighted in a pair-wise directory memory as xy, Nx, Ny, and NN respectively, for topic:x and company:y for example. The row for N 640 may include independent counts of each attribute as well as the total count of observations, NN. For triples, the conditional pair-wise count of xyz may be found within the conditional memory. The other conditional terms, xy and xz, may be found in the directory memory. For both directory memory pairs and contextual memory triples, the matrix dimension within each memory can be used for "slicing" over time. Each memory can be queried for a single count such as for the N of x, for a vector such as for companies associated with topic:x, or for an entire contingency table such as for companies associated with persons within topic:x.

Some embodiments provide that correlation may be considered as the first use case because it is elemental and may include computing the similarity and/or distance between two things. Each cell may be a "point" in the matrix, and the computation of distance at each point may be called "point-wise". This distance filters the high frequency "noise" that is often found in a faceted entity search, particularly at scale where popular concepts have high association counts but little information. For example, in news, political leaders may often be associated with nearly every topic, from national security to healthcare, but may often not be within the investigative interests of a particular analyst given a particular query. In structured data, such as in automated call centers, some field values may be associated with every call and, again, may not be of specific interest to investigating a particular problem. The ability to recall associated entities by count strength of association does not go away. For example, an analyst may still need the ability to see the exact frequency, such as in how many times person A met with person B. However, the option to filter out such high frequencies in favor of dependencies may also be important.

Figure 34:
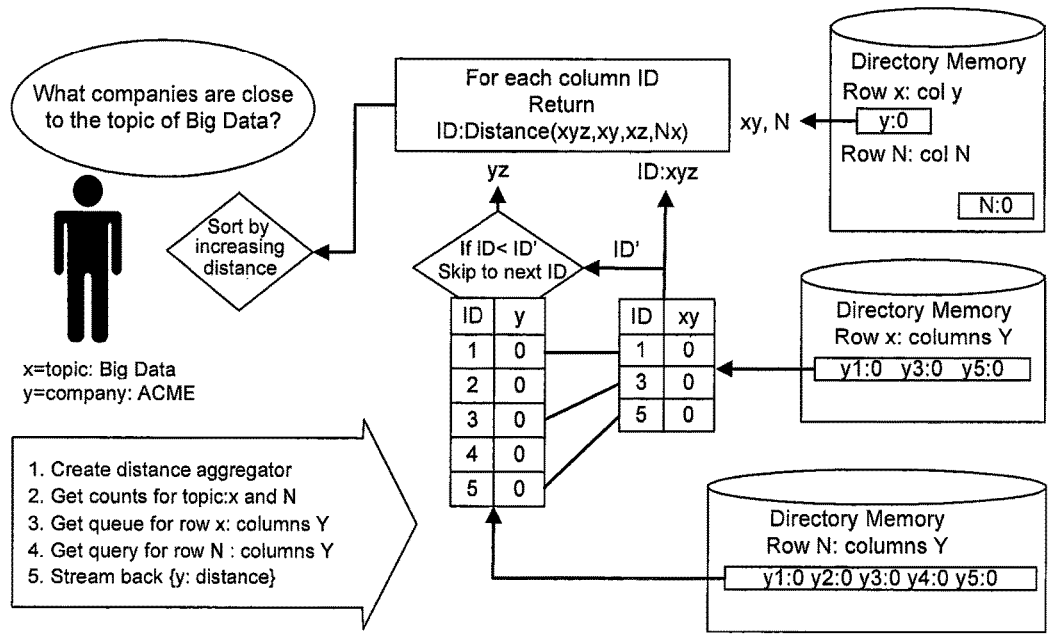
FIG. 34 is a flow diagram illustrating operations in an example of determining cognitive distance between two things according to some embodiments of the present invention.

The cognitive distance between two things may be determined. Reference is now made to FIG. 34, which is a flow diagram illustrating operations in an example of determining cognitive distance between two things according to some embodiments of the present invention. For example, starting with the simplest query of one term such as "topic: big data" and asking to see a list of associated persons, the directory memory may hold the row for the topic and the column for persons. The person IDs and the xy association between the topic and each person may all be within one row to answer this query.

Computing the distance between x and y may use other counts that may also be found in the directory memory. A special row in the directory memory that corresponds to all N's may be accessed and may include the number of independent counts for each attribute x and y as well as the total number of observations in the entire memory space. Some embodiments provide that many measures of "interestingness", "closeness", or "distance" can be computed from xy, x, y, and N.

Some embodiments include streaming aggregation over sorted attribute queues. In some embodiments, the results controller 24, as discussed above regarding FIG. 2, may include an aggregator which may perform operations corresponding to a distance function. The aggregator may be attached to one or more queues, each fed by the ID:count vector from a particular matrix row. For pair-wise computations, all pair-wise associative counts as well as independent counts may be contained in a directory memory. In this case, the row for topic x as well as the row for N of independent counts may feed the queues that feed the aggregator. Because the attribute IDs in both queues may be in common order, the aggregator can sequentially find matching IDs, compute the distance, and iterate each ID until the queue is empty. Some embodiments provide that the aggregation results may then be sorted.

Some embodiments provide that streaming aggregation in a memory base may be used to combine the distributions of coincident (xy) counts and independent (x and y) counts for each point-wise computation. The globally sorted IDs and queues in a memory base may provide efficient access to compute vast numbers of such distances. As illustrated, any one point-wise computation may aggregate the counts for computing distance from across the directory memory. However, one answer may frequently be of limited use. As when asking for a list of companies associated with a topic, the answer set may more likely range from 10 to 10,000 or more. In this regard, the memory base may provide attribute grouping and/or global sorting.

Regarding attribute grouping, when given x and looking to evaluate every possible answer in set Y, all answers over Y may be co-local. For computing distance, all xY coincidence counts as well as Y independent counts may be physically together, compacted in a hyper-space compression operation that may include relative ID encoding with zero run length encoding. Because of this compression, response time may be largely independent of answer set size whether 10 or 10,000. The aggregator may be attached to these two respective memory locations so that the attribute IDs and counts sets for xY and Y may be brought together.

In global sorting, respective IDs and counts for the two sets may also be in a common order. When asking for persons associated to a topic, the xY coincident counts between persons and the topic will be a subset of all the persons. Because only the persons connected to the topic are relevant to the query, the aggregator may go down every answer in the xY queue. The aggregator may scan down the Y queue to find the next matching ID to the xY queue, quickly skipping the rest. As soon as the aggregator has Y to match xY for the current ID, distance can be calculated and streamed back while it computes the next and the next until the xY queue is empty.

The count for x and the total count for N may be constant across the answer set. As such, they can be fetched once and do not require such streaming queues.

In faceted entity search, the user often wants to see associations of the query topic to many different kinds of things. A separate aggregator and its respective queues can address each of many categories in parallel. For example, one aggregator can work across persons associated to a topic while another works across companies. The same computation may be performed with the same x and N counts, but the xY and Y count sets may be queued and streamed from the other distributed memory locations.

Figure 35:
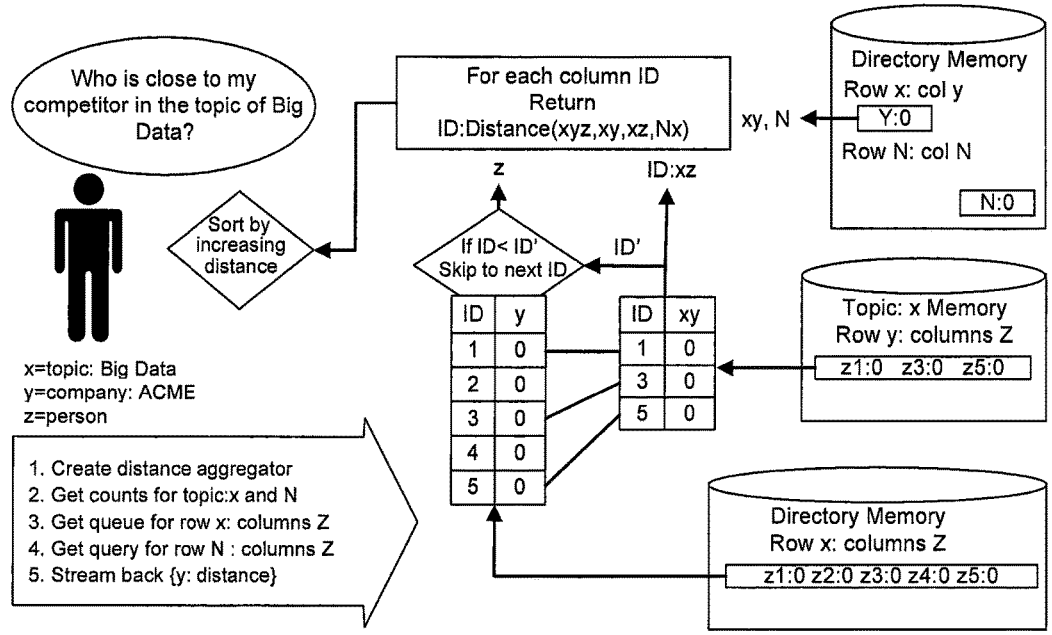
FIG. 35 is a flow diagram illustrating operations in an example of determining cognitive distance between three things according to some embodiments of the present invention.

In some embodiments, the conditional distance between three things may be determined. Reference is now made to FIG. 35, which is a flow diagram illustrating operations in an example of determining cognitive distance between three things according to some embodiments of the present invention. A simple query such a "topic: big data" shows how streaming aggregation computes distance over a large answer set, but such queries may be too simple. In faceted entity search, queries may be iterative. The user may see one interesting set of results and then include it in the query as additional context to query again. In the case of "topic: big data", the user might ask for persons associated with a topic and then include one person in the query as context to this topic. The returned associations of persons to the company are conditional within the topic. The inclusion of such context may rely on computation over semantic-statistical triples. These triple connections and counts may be contained in conditional memories, such as the memory for the topic.

Some embodiments provide for conditional streaming aggregation across memories. In some embodiments, the operations for computing distance for the information of triples may be substantially the same as that for the information of doubles. The distance aggregator may take the same input arguments and the queues attach to distributed rows. However, the attachments may shift xy to xyz coincident counts. The x and y independent counts may shift to xy and xz counts. In other words, the xy count may shift to yz conditional on x. This may be equivalent to the yz count located in the topic x memory and may otherwise be labeled as xyz, a triple association. The independent count of y may become the count of y given x, which may be located in the directory memory. Rather than the global observation count of N, normalization for the conditional may be performed by using the N of x, which is the number of observations of x.

Given two attributes in a query, such as when asking for persons associated to a given company in the context of a given topic, the triple statistics may be accessed from the named memories. If topic: x is the context of the query, then the memory for topic: x may hold the conditional associations between people and companies. If the user wants to know the raw connection strength between three things, the conditional memories may be sufficient. But to calculate "interestingness" or "informativeness" or "closeness", the other parts of the equation may be found in the directory memory. Given topic x, the normalization counts for each company y and each person z may be located in the topic:x row of the directory memory. When we care only about the condition of x, the number of observations may be limited to the number of observations of x rather than all observations across all memories. This count also may be in the directory memory, in the row for N at the column for topic: x. Otherwise, aside from the shift of where the queues attach to specific rows of the memory base, the operations may be substantially the same for pair-wise mutual information and for triple-wise conditional information.

In some embodiments, parallel aggregators can compute distances across many categories to answer how entire categories interact with other categories. In other words, the entire company-by-person contingency table within the topic memory can be searched for the strongest correlations between persons and companies, given the topic. With such larger queries, the memory base may move toward becoming query-free. When the user does not know which company to query or does not want to iteratively explore and discover such companies, a memory base can do more of this cognitive work. The memory base can quickly search through the dependencies between all companies and all associated persons, returning the most dependent companypersons as most interesting. Some examples include searching for company-company dependencies and/or seeing how all of your suppliers are dependent on your competitors.

As disclosed above, cognitive distance may be a measure of one link between two nodes. Because a memory base as disclosed herein may represent an entire graph of such links, distance can be extended to the measure of graph distances between any two links. For example, path lengths can be computed as the number of hops between two nodes. Each hop may be weighted by its cognitive distance. Some embodiments provide that one computation that may be useful in similarity-based reasoning includes analogy detection as previously described in commonly owned U.S. Pat. No. 7,478,090, issued Jan. 13, 2009 entitled "METHODS, SYSTEMS AND COMPUTER PROGRAM PRODUCTS FOR ANALOGY DETECTION AMONG ENTITIES USING RECIPROCAL SIMILARITY MEASURES."

Even if two nodes are not directly linked, their similarity can be measured by the number of features and relationships they have in common. In graph terms, two nodes are possibly connected at a radius of 2 from each other and similar to each other to the degree that they both connect to a set of shared, intermediate nodes. The degree of similarity may be a function of how many feature and relationship nodes are in common. This function may also include a weight for the informativeness of each common node. When looking for similar persons for example, if all persons share gender:male, then this attribute provides no value when measuring whether one person is closer to another. This independent, marginal entropy of each shared attribute is one such weight. However, cognitive distance may provide a much more specific measure for each attribute and for each node's distance to each attribute. Marginal entropy may measure the informativeness of a node, in general, and cognitive distance may measure the informativeness of each link, specifically.

Figure 36:
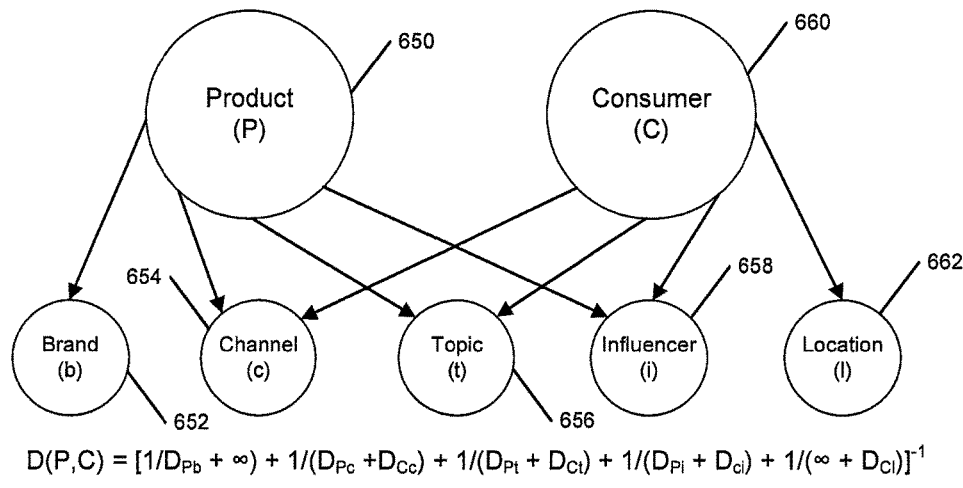
FIG. 36 is a graph illustrating links and cognitive distance to determine how close a product is to a consumer in the absence of direct links therebetween according to some embodiments of the present invention.

Brief reference is now made to FIG. 36, which is a graph illustrating links and cognitive distance to determine how close a product 660 is to a consumer 650 in the absence of direct links therebetween according to some embodiments of the present invention. In the present example, the absence of a direct link or evidence of a direct link may indicate a lack of consumer awareness of the product 660. Even if not directly connected, the product 650 and consumer 660 might share connections to the larger brand 652, the same channel 654, interest in the same topic 656, and/or connections to another, influential consumer (i.e., influencer) 662. In the graph sense, the distance between the product 660 and consumer 650 can be measured by the length and number of paths between them, assuming a path length of 2 links as the simplest form of indirect distance. The cognitive distance of each link can further measure the closeness of the product 650 to an influential consumer 658 and the closeness of the consumer 660 to this other consumer as one shared attribute.

Various aggregation operators may be possible to combine these graph links. Some embodiments may assume a resistance network and apply the rules of series and parallel circuits. The two links to a shared attribute are in series, therefore added. The multiple paths are in parallel, therefore inverted then added, then inverted again for a total distance. If one entity does not have a connection, the resistance (the distance) is infinite, resulting in a path weight of zero. In some embodiments, operators may include other approaches, such as not inverting the sum of inverted paths. The un-inverted value may represent a reciprocal of information distance, namely, similarity.

This example illustrates how indirect similarity-distance can be measured for any entity type to any other entity type. As illustrated, it may be typical to find similar entities of the same type. For example, results may yield persons that are similar to one person or parts that are similar to one part. However, operations are not limited in any way regarding finding similar entities of the same type. Take the example of asking for similar persons to a given target person. The target person can be represented as a set of connections to other attributes, such as socioeconomic features and/or relationships to other persons, organizations, and things. Cognitive distance can be computed between the target person and each of these attributes, defining a weighted "signature" of the target. Each attribute of the signature can then be used to lookup other persons connected to the attribute, again computing the distance from each attribute to the other person.

Figure 37:
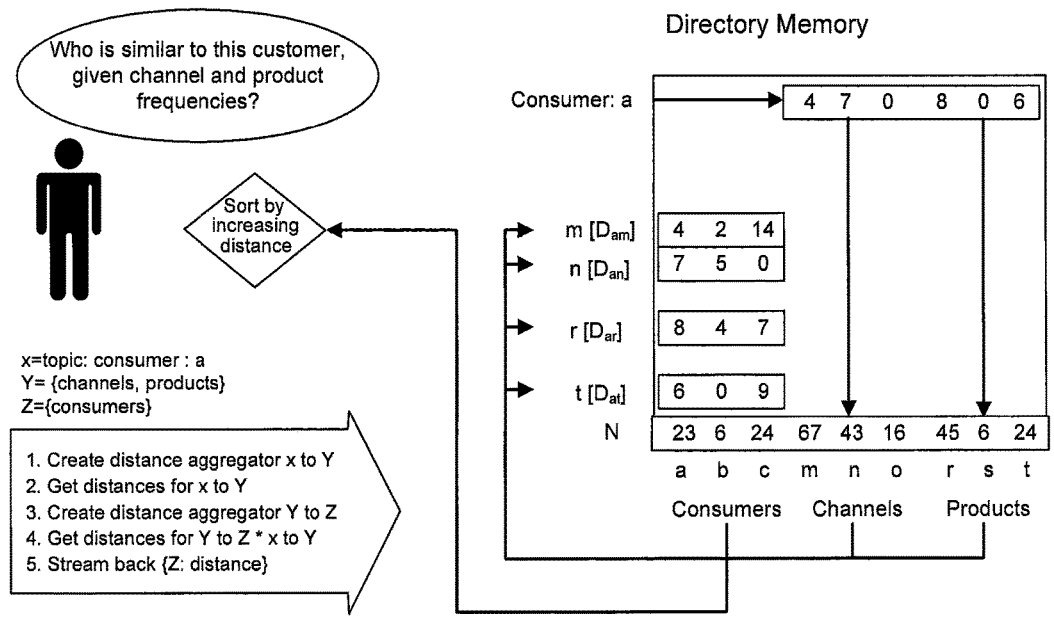
FIG. 37 is a block diagram illustrating a memory base as disclosed herein as applied to the example of FIG. 36.

Reference is now made to FIG. 37, which is a block diagram illustrating a memory base as disclosed herein as applied to the example of FIG. 36. As illustrated, rather than a graph per se, the memory base implements connections and counts within matrices. As with the two-link indirection of a graph, looking for similar entities may include two steps overall. Given a target entity such as one specific consumer, associated entities are recalled from the entity's row. Assuming a context-free lookup, all the required connections and counts are in the directory memory. The associated (non-zero) columns within the entity row may form the entity's signature vector. Using the cognitive distance function of (xy, x, y, and N) as described above for each attribute in the signature, a distance-weighted signature may be generated. The distance weighted signature may then be re-applied to the memory as the second step, also carrying the distance weights for each attribute in the signature. In other words, memory base allows the passing of "signal strengths" as part of any query input vector, such as when passing the results of one computation into another as required in the present example.

If querying for similar consumers, global sorting of all the columns will again provide streaming computations of cognitive distance across the range of consumers that are connected to attributes of the signature. For example, all the consumers may be similarly sorted across all product rows. However, rather than only computing this second set of cognitive distances, the aggregator may include the first step cognitive distance for each row. Using all these distances for each consumer, the aggregator computes the resistive network rules described for the total distance from the target consumer to each other consumer and each distance may be streamed in return as the aggregator moves down the signature rows.

As with cognitive distance for one link, the query for indirect similarity can also be contextual. For example, if querying for similar consumers when given a target consumer on a specific channel, the cognitive distance computations remain the same but shift to contextual memory-matrices, such as of the target consumer rather than the more general directory memory.

In this regard, the memory base provides recollection from memory that is more than just a mere recall. For example, given any particular query of one point or one vector, or a more general query over an entire sub-matrix or across matrices, the semantics and statistics may be pulled together at query time. The physical organization of memory is fast and flexible to perform such functions.

Some embodiments provide that the cognitive distance may then be extended to convergence, which may represent changes in cognitive distance over time. Convergence may illustrate a deeper meaning of associative "trending" between things, for example, how things are moving toward or away from each other in information space over time.

Trends can be implemented as the simple frequency of a thing over time. A trend of a stock price is its daily closing price plotted day by day for example. The memory base disclosed herein may store all frequencies over time and can also support such basic reporting. For example, from unstructured sources such as Twitter, we can mark anything like a company name or a topic like "terrorism". Mentions of the company may trend up or down over some time range. We might see that "terrorism" is trending up, however the value of such information may be limited.

Some embodiments provide that more cognitive work may be performed by the memory base, which may provide information identifying the associated other things that are trending around a topic. As discussed above, the query of "topic: big data" can return the trending frequencies for "big data". However, additionally value may be provided by identifying and/or providing other associated trends, particularly ones about which the user was unaware to ask. For example, in the context of a company, it may be valuable to know what is trending around that company. In this example, value may be provide by identifying the trends of a company's products or a company's associations to other companies. Or given a topic such as "big data", what companies are trending, associated with "big data"? Rather than show a trend line to a given topic, associated trending may provide information the user might not even know to ask.

As with any associated entity rank, ordering by strength may be too raw. For trends as well, the memory base may compute the correlational distance of connections over time. Beyond the trend of raw associative counts, a growing correlation over time may represent the convergence of things. Correlation at one point in time can measure the cognitive closeness of a competitor and vendor as in the mentioned above, but convergence may measure if they are growing closer together. Convergence may represent the trend of the relationship, to better anticipate where the association is going.

Figure 38:
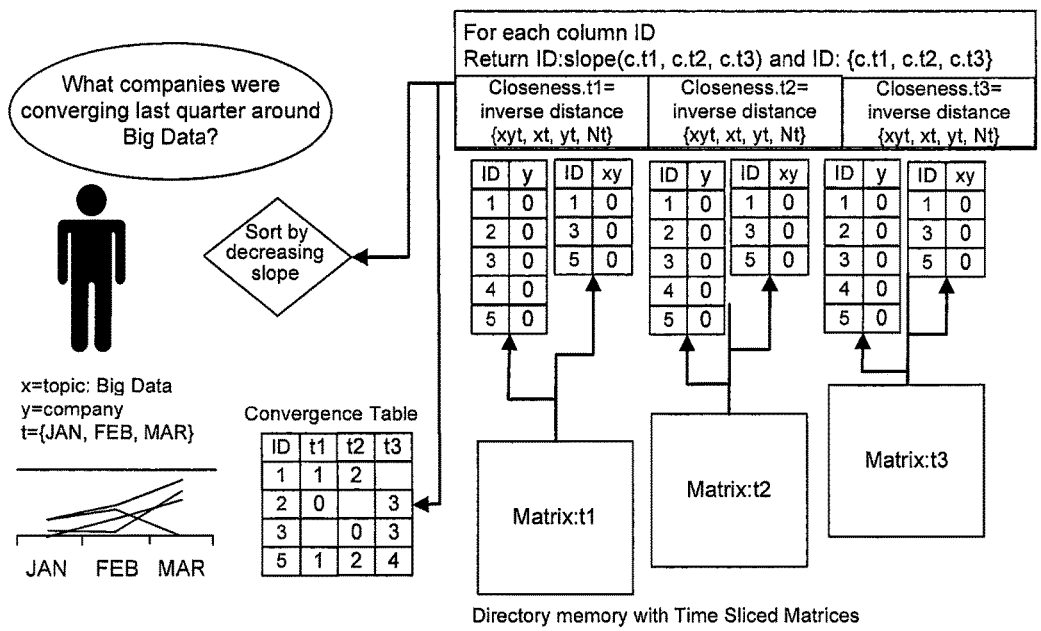
FIG. 38 is a block diagram illustrating a memory base as disclosed herein as applied to provide convergence data using time sliced matrices of the directory memory according to some embodiments of the present invention.

Reference is now made to FIG. 38, which is a block diagram illustrating a memory base as disclosed herein as applied to provide convergence data using time sliced matrices of the directory memory according to some embodiments of the present invention. As provided above, convergence may be viewed as the streaming of cognitive distances over time. Rather than only 2 vectors, one for xy and one for y, the convergence aggregator, which may be implemented in the results controller 24, may combine such vectors across many different time slices. Because the query may use only pairwise associations, access may be limited to the directory memory. Although not shown here, convergence of triple associations, such as when asking for companies converging with each other around the topic, may simply shift the aggregator to the topic memory triples over company-by-company cells as well as the directory counts for normalization. Although not shown, the aggregator may step through all vector queues, all in global sort order, computing and streaming each computation for each company. "Closeness" or similarity is the inversion of distance in this case. Slope, acceleration, and/or other indicators can be computed over the time series of closeness. The indicator can be sorted to display the most strongly converging, and/or the closeness values over time can be returned for graphic display of the convergence trends.

Some embodiments provide that recollection over time is yet another dimension of the memory base hyper-matrices. Rather than computing the distances between the topic of "big data" and a vector of companies, distances are computed for each point in time. These time-sliced counts are available in each time-sliced matrix within a memory. For pair-wise distances, these matrices may be retrieved from within the directory memory. For conditional distances, the counts for $dIxy|c(t_i)$ of every time slice $t_i$ may be retrieved from the contextual memory. Conditional information distance may be used to anticipate if three things will converge. For instance, in the context of intercepting drugs, $dIxy|c(t_i)$ may be plotted over time, such that x represents boats, y represents persons and c represents the assumed location, where a suspected convergence is most likely happen.

Continuing with the drug interception example, trends regarding the uses of different means of transportation over a certain period of time may be identified. In this case, when dealing with ensembles, the use of entropy measures to compute similarity may be appropriate. Using the previously introduced interaction information I(X;Y;Z) with X being a random variable for the means of transportation, Y being the ensemble of locations, and Z being persons, the involvement of a boat versus a plane, for example, may be anticipated.

Some embodiments provide that the memory base may recollect the appropriate counts depending on the context, categories, and time frames requested by the user. "Recollection" may include recall of the connections and counts as well as measures of cognitive distance and other information physics. While distance can be calculated for only one cell if given a very specific question (between only one topic and two given companies, for example), more general discovery and query-less querying rely on the computation of distance over vast numbers of answers. In this regard, the memory base may perform significant cognitive work for the user, evaluating many possible answers to return the most "interesting", often including answers to questions that the user would have never known to ask. Toward anticipatory sense-making, convergence over time adds the sense of momentum for expecting the future rather than just discovering the past. Convergence may provide a previously undetermined intersection of conditions, facts, and events.

Figure 39:
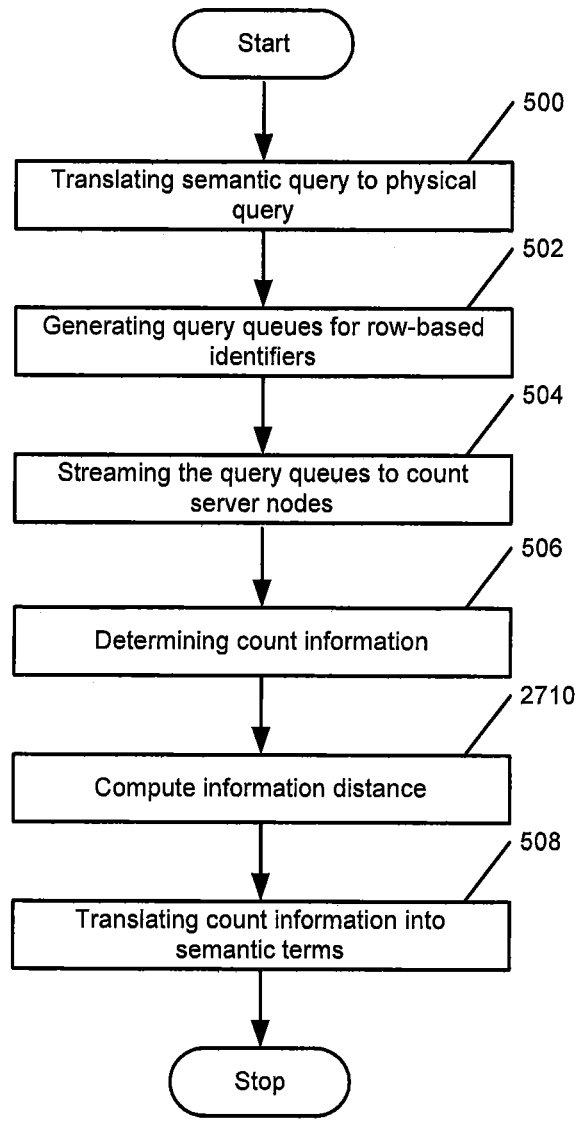
FIG. 39 is a flow chart illustrating operations for querying a distributed associative memory base according to some embodiments of the present invention.

Reference is now made to FIG. 39, which is a flow chart illustrating operations for querying a distributed associative memory base according to some embodiments of the present invention. Operations 500, 502, 504, 506, and 508 have been described above regarding FIG. 27, duplicate discussion of which will be omitted herein. Once the count information becomes available via the queues, information distances between a query search element and ones of associative memory query result elements are computed to determine closeness values corresponding to the information distances.

In some embodiments, the query search element includes a first query term that includes a category:value pair that identifies a first category and a first value or member of the first category and a second query term that includes a second category. Computing the information distances may include identifying multiple second members in the second category that have an association with the first member, identifying count values corresponding to a quantity of associations between ones of the second members and the first member, identifying an independent first member count value corresponding to the first member of the first category, identifying independent second member count values corresponding to ones of the second members, and identifying a total quantity of observations in the distributed associative memory base. Once this data is determined, the information distance or cognitive distance may be computed according to various techniques described herein (block 2710).

Some embodiments provide that identifying the independent first member count value, the independent second member count values and the total quantity of observations includes reading via one of the query queues a total quantity of observations row in the plurality of associative memory networks. Some embodiments provide that the plurality of second members in the second category that have an association with the first member are co-local within the distributed associative memory base. In some embodiments, the second members in the second category that have an association with the first member are globally sorted.

In some embodiments, the independent first member count value includes a single value used in computing the ones of the information distances. Some embodiments provide that the total quantity of observations is a single value used in computing the ones of the information distances and that identifying count values corresponding to a quantity of associations between ones of the second members and the first member is performed via a first one of the query queues. In some embodiments, identifying independent second member count values corresponding to ones of the second members is performed via a second one of the query queues responsive to identifying ones of the quantity of associations between ones of the second members and the first member.

Patterns can emerge from the interaction of even simple atoms, such as when ants work together as a colony. When many things are collected to form a class of things, such as animals that are reptiles, separate from those that are mammals, these ensembles form patterns of what it means to be a reptile or mammal. Categorization, which may be referred to as "classification", may provide a measure of the similarity-distance of a given thing to one or more of these classes of thing. Classification may be the bedrock of machine learning and its application to prediction. For example, the real questions of life and business may ask, "Is this situation good or bad? If I go left, what are the likely outcomes?" Reasoning by similarity and analogy, we may compute the more complex distance between the situation and past situations that were good or bad. For example we may remember when we moved left or right in such situations, what happened in past situations that are close to what we face now.

Cognitive distance, which may also be referred to as normalized information distance, may be useful for cognitive reasoning in faceted search and discovery, such as for correlation and convergent trending as just described. More complex patterns that might exist across many diverse points in a memory may be akin to the classic definition of emergent properties, such as when individual ants act as a colony. Each ant has its own small role to play, but acting together, the entirely new "entity" of a society is formed, acting more intelligently together than each ant alone.

This may be a metaphor for classification in that a situation or object may be described not just by a name, but also by an entire vector of its attributes or features, which may represent an even larger number of associations. A vector may include multiple different things, all possibly interacting with each other. It may be desirable to determine how the vector fits into a larger entity, which may be referred to as a class. For example, does this vector belong to the class for animal, mineral, or vegetable? Is this situation good, leading to a decision to buy, eat, or otherwise consume it? Or it is bad, leading to a decision to sell or run away from it? Classification can tell us what a thing most likely is, and classification may be fundamental to prediction, telling us what might likely happen.

Classification may be fundamental to machine learning, which is becoming an increasingly important area of computer science for this century. Some practitioners trained in data modeling methods of the last century believe that algorithmic modeling, as Kolmogorov, Solomonoff and Chaitin have formalized, may hold a universal key to machine intelligence. Data modeling may assume a universe of random variables. The data modeler has to make upfront assumptions of independence and of homogeneity across observations, including assumptions of Gaussian or other distributions. These assumptions may often be unfounded and ad hoc, especially in the Big Data arena. Therefore such methods are hardly universal. In contrast, Kolmogorov complexity $K(x)$ shows a radically different approach to machine learning and offers very practical tools for induction like the universal cognitive distance.

By way of example, a dice game including 1000 dice throws in which a player loses because the same number comes up on each throw is not unfair since the sequence of results is just as probable as any other sequence. However, intuitively, we view this as unfair based on traditional statistics. In this regard, we may rely on a measure to better differentiate a random string (throwing the dice) from a regular string that includes such a repeating pattern. Kolmogorov has defined such a measure, based on complexity. It turns out that regular strings, like the repeated sequence of one number, needs only a short program to describe it. If one die always came up 6, the entire sequence of 1000 throws may be described as "6"*1000. One the other hand, if the die was fair and random, each throw may be recorded as "516425216352 . . . " for each of the 1000 throws. While any sequence is statistically as likely as any other sequence, the measure of complexity indicates that there is a pattern in the repeated sequence. It is not random sequence. If the player had noticed the repetition early in the sequence, the next throws could have been predicted and the player would have won.

Kolmogorov's universal probability may cut through the dilemma of choosing the right laws of probability by a priori assumptions, which plague classical statistics. Instead, the likelihood of the simple sequences may be measured. There may not be many of them since most possible strings do not have such a short minimal description length. Compressibility may provide a measure of regularity, which may be used for comparison and prediction. Using cognitive distance as similarity measure, we can compare a case vector with regards to stored memories and predict such diverse things as levels of threat, when parts will break, what product a consumer will buy, and much more.

In this regard, we may seek to identify patterns that are emergent from the data itself, without a priori assumptions about data distributions and without parameter tuning to fit the data to an ad hoc function. The memory may recollect patterns quickly and automatically, without the cost and latency of traditional modeling. This may be critically important for data problems with the characteristics of heterogeneity, dimensionality, non-linearity, individuality, and/or ageing.

Regarding heterogeneity, different methods may address either discrete or continuous variables. Both may be informative together in making a prediction. No matter the data types, a universal approach to learning should address and combine them. Using Hamming space to transform all variables into bit-space, a single representation and its properties of distance may be exploited.

Regarding data dimensionality, the Law of Large Numbers may require that the number of observed events is large enough to solve for a smaller number of variables. In contrast, the world will often present a high number of variables within a low number of cases, for which decisions must still be made. The new norm may be the norm of one.

Additionally data non-linearity may be addressed. For example, assumptions of independence between variables are violated when they interact and things in the world do interact. Whether predicting the desirability of a shirt color depending on the occasion or predicting the failure of a part depending on its location, non-linear interactions need to be accommodated.

Regarding data individuality, statistical generalities are often made under the assumption of homogeneity, that all cases are drawn from one homogenous population. In contrast, however, complex objects—like people—are not generally homogenous. Vast numbers of models, one for each thing, may be required to address each individual's rich complexity and difference from others. It may be impossible to manually construct and tune each and every model at such scale. Individualized personal assistant learning should be autonomous, as an agent.

Regarding data ageing, the tradition of data science is to train, test, and deploy, hoping that the world doesn't change once deployed. In other words, a model is tuned, tested, and tuned again, then fixed—not learning anymore—once in the field. If the underlying world changes, accuracy will likely degrade and the model must be re-tuned. For non-stationary environments, machine learning must be continuous. Some embodiments provide that learning should be instant when change is rapid.

Our own brains may easily deal with such real world characteristics. We learn from both structured and unstructured data, discrete and continuous variables, often in high dimension, interacting with each other, and changing over time.

Many approaches within computational machine learning may be contrary to these facts of learning and what we know in neuroscience. For example, "neural networks" in the 1980's assumed that neurons were "slow and weak" processing units, saved only by their massive numbers by parallel and distributed processing. Computationally, each neural unit was nothing more than a thresholded summation of inputs. Neuroscience however, now knows that each neuron is a powerful computing network in itself, not just a simple node that is saved by its larger network.

Many other questionable assumptions may continue, including the common belief that animal learning is a slow process of repetition. Many methods of machine learning may involve the slow adjustment of weights by iterative passes over data or iterative methods over matrices. Unfortunately, the "sigmoid learning curve", which is part of many psychology textbooks, may teach that learning requires repetition: a slow rate to begin, gradually building over time, until leveling off at an asymptote. This "gradualists" school of learning may be commonly taught and believed, but the "absolutist" school of thought highlights our abilities to learn instantly. Evidence includes "one-shot" learning, where even one experience is sufficient to then reason about similar experiences in the future.

Many approaches to classification may involve fitting data to a model such as a logistic regression, Bayesian Networks, Support Vector Machines, or several forms of neural networks. This fitting to a specific function may imply finding some decision boundary between one class and others by the "learning" of appropriate coefficients or "weights". Such machine learning may be slow. If you believe that learning is slow, you will build slow learners. Back-propagation, for example, as one of the "neural" networks of the 80's was described by "epoch" of training time. Machine learning methods have become much faster, such as in support vector machines and the current interest in "deep learning" and hierarchical learning. These models, however, may remain focused on perceptual tasks such as learning to recognize cats or numbers from images, where the "deep" in deep learning includes the learning of perceptual features. This may indicate a subtler confounding of brain development, which is slow, with associative learning, which is fast. Psychology may define learning as a change NOT due to development (or damage). Perceptual and even conceptual feature representations do take time and can be admitted, but this confusion within the grab bag of everything called "machine learning" may have hindered the focus on learning per se, which is not just fast. It can be instant.

Fitting data to a set of weights may also create problems beyond slow parametric knob tuning, as one would need a tailor to fit a suit to any particular body. The mathematics of fitting weights may define each weight as a degree of freedom. If you have too many degrees of freedom, you can over-fit the weights. As such, data modeling is forced to select fewer attributes, fewer degrees of freedom, relative to the number of cases observed. The attributes not used may be considered to be noise in forming the general model. Such models may be "in general", but they have lost information, not noise. Being general, they cannot be universal in the sense of addressing each and every case.

Memory-based reasoning may take another approach. Rather than slow adjustment of weights to fit the data to a model, a memory is simply a memory. It instantly remembers what it sees, assimilating new cases with its memory of prior cases. Reasoning is from memory by computing the cognitive distance of a new case to the cases that have been seen before. We need to compress all knowledge, not knowing what will be important until we are presented with a new case.

The brain's ability to do this is often questioned, again because of the common psychology of how we can be so forgetful. In this regard, many artificial intelligence approaches questioned why an intelligence based on the frailties of human memory should be pursued. However, geniuses including a perfect memory may perform beyond mere recall and provide recollections that are facile and creative.

In the history of associative memories, a Hopfield associative learning algorithm included a "storage prescription formula" in contrast to the gradual adjustment of weights. A new vector is instantly stored into memory. The Hopfield prescription provides that: if two input signals have the same direction (both ON or both OFF), the weight between them is incremented; otherwise, the weight is decremented (when one is ON and the other is OFF).

However, the storage prescription of a memory base as described herein may be more elemental as a simple coincidence matrix, namely, if two inputs are ON, the weight is incremented. Hopfield and similar memories such as Kanerva's Sparse Distributed Memory assume fixed-length vectors in which every element is ON or OFF. More generally in transactional and unstructured data, things simply co-occur together and the vastness of what is not in the data may be simply irrelevant or unknown. Assuming an astronomically large vector of what is possible to co-occur (or not), it is not possible to set everything not seen as OFF. As described above, this is why Jaccard similarity ignores OFF-OFF comparisons. Otherwise, such storage formulas have no parameterization, such as in the "learning rate" of weight adjustment. Given a new input vector, a memory simply records the connections between things and how often these connections have occurred.

As described herein, the three Cs of representation may include context as well as connections and counts. While one associative memory/matrix represents a weighted graph, many memories/matrices represent a semantic triple store. Each memory is conditional to one "thing". To use this machinery for classification, we equivalently include a separate matrix for each class. By convention, a memory base as disclosed herein may use the memory with separate matrix names for each class within it. For example, a memory for a consumer named "John Smith" might include matrices to represent his online behaviors, such as one matrix for observing what he "likes" and other for observing what he "dislikes". As another example, imagine a memory for "cancer" with separate matrices to learn and classify "malignant" or "benign".

Of course, a memory can contain more than two matrix classes, but two classes may represent the most fundamental "opponent process" as in fight or flight, extend or contract, good or bad, buy or sell, etc. The approach of fitting weights typically assumes that there is a line, plane, or hyper-plane that separates two or more classes, and weight adjustments seek to define this separation. In contrast, a memory can also contain only one matrix to support "positive only instance" learning, which most learning algorithms cannot. In some situations, the learning engine does not have the opportunity to see the compliment of a class, only the positive instances of one class. Using distance as a measure, we can at least see how far or close one case is to the class. Even if we have only one matrix for what a person likes, we can still score different products and say that one is likely more likable than another.

The learning of each matrix may be "supervised" in the sense that every given case to learn may also include its class label. If a user marks an email as "spam", then a matrix for "spam" will learn the email's attributes and how they occur together under this condition. If other emails are marked as "urgent", then another matrix may observe these cases. The result is one or more matrices that represent the connections and counts for each class.

Figure 40:
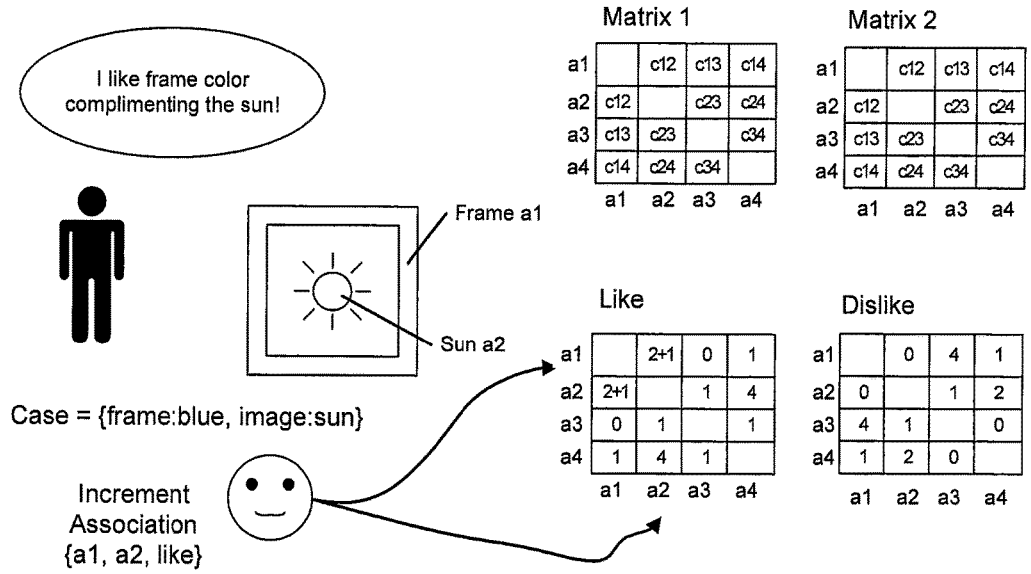
FIG. 40 is a diagram illustrating an example of classification learning within associative memories according to some embodiments of the present invention.

Reference is now made to FIG. 40, which is a diagram illustrating an example of classification learning within associative memories according to some embodiments of the present invention. As illustrated, each class may be a matrix of pair-wise coincidences between attributes (a), conditional to the class. Similar to the way every "entity" is the condition over its own memory-matrix for semantic triples for entity analytics, each class represents triples of $z=f(XY)$ for predictive analytics. Although larger vectors are typical, a case is represented by every pair-wise combination of attributes, labeled by its class by supervised learning. Given the case vector and its label, the associative counts that represent the vector are incremented in the appropriate cells of the appropriate matrix.

Aside from the matrices and the representation of connections and counts in the context of the class, there are no mathematical functions and no parameters to fit these functions during the constant and instant learning of connections, counts, and context. The memory simply remembers and can continue to learn as new cases arrive. In this way, memory-based reasoning may be consider as a form of "lazy learning", also called "just in time learning", which may follow a minimum commitment principle. Rather than fit a model as data arrives, a memory waits until the question is asked. Given all the cases assimilated up to that instant, the memory them computes the distance of the case to each requested class.

Learning via memory-based inference may be as transparent as learning in the first place. Given a new case vector, the intersection of vector elements in a case will "light up" particular cells in each matrix. In other words, each vector implicitly represents a set of associations. When the vector attributes are applied to select rows and columns of a matrix, these intersections become apparent. The associations in the matrix correspond to the vector attributes, highlighting the associations and association counts of prior vectors. As with correlations and convergence, more computation may deal with the issue of raw counts being too raw, but even naively, the number of cells and the counts of these cells in each matrix begin to give a sense of what "lights up" in memory.

Figure 41:
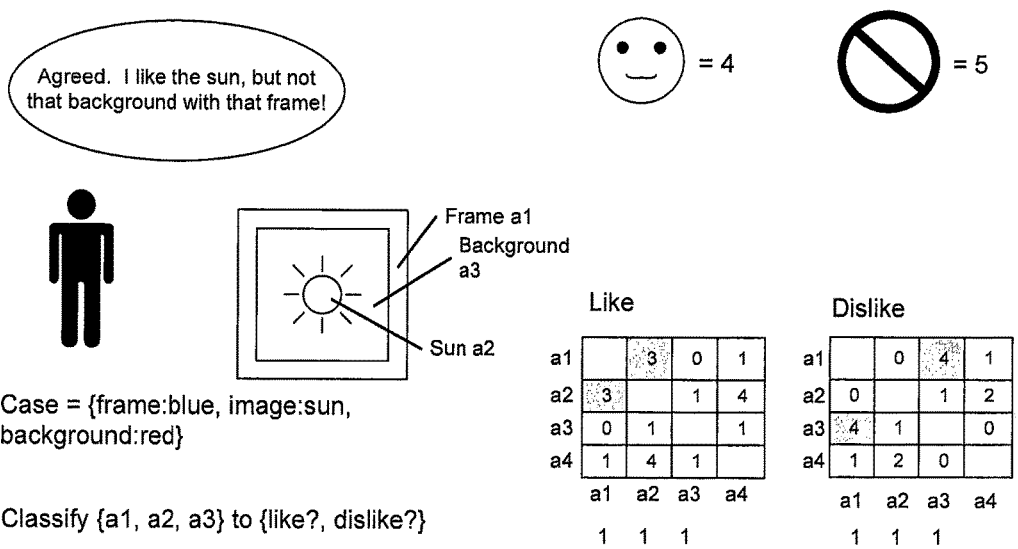
FIG. 41 is a diagram illustrating expressing class membership of a new case vector using a memory base according to some embodiments of the present invention.

Reference is now made to FIG. 41, which is a diagram illustrating expressing class membership of a new case vector using a memory base according to some embodiments of the present invention. Given a new vector, its attributes may be applied to one or more class matrices. Applying the attributes to both rows and columns, the relevant cells "light up" to represent the connections and counts of all similar experience. Although raw counts may be further normalized and used to compute distance, we can intuitively see where and by how much each matrix expresses its relative experience. Opponent classes such as good vs. bad, buy vs. sell, or like vs. dislike can be compared in total as well as the transparent explanation of why the new case belongs to one or another class.

Given one case applied to two matrices, the relevant connections and the frequencies of these connections may indicate where the case "belongs". However, raw counts may be too raw and can represent a biased skew in the observations. For example, imagine the skew in the counts if one matrix happens to see more cases than the others. For example, suppose that 95% of cases are "not threating" and only 5% are "threatening". When given new cases, the dominance of connections and counts that are "not threatening" will likely predict this class most of the time. Even with no intelligence at all, simply predicting "non threatening" all of the time will be correct 95% of the time! To do better than this, we may use the frequency calculated from the count rather than count itself. By dividing xy/N (the xy association divided by the number of observations in the class), each cell in a classification matrix may become a frequency of the association (conditional to each class) rather than a raw count.

Given the atomic probabilities at each cell, the cells that light up may be aggregated. A common belief (if you assume independence) may be that these probabilities cannot be added. However, we can add information bits (i.e. the log of the frequency/probability) as a form of entropy measured in bits.

In fact, even without a log function, the Hartley entropy described above allows us to add up the frequencies of the co-occurrence cells that "light up". Using the Hartley entropy has been surprisingly accurate for many data sets, including several standard machine learning data sets such as the breast cancer data set, reaching 97% accuracy in less than 50 trials from the 700 malignant or benign cases, and the mushroom data set, reaching 100% accuracy in finding the underlying associative rules for edible or poisonous. In both data sets, accuracy remained asymptotic as more cases were observed. As such, there was no over-fitting because there was no fitting in the first place.

Many operational datasets from customers, ranging from condition-based maintenance to spam filtering have been near perfect as well. From a prior baseline of less than 70% recall and with nearly 20% false alarms, systems, and methods herein have demonstrated 100% accuracy with less than 1% false alarms. This success rate is also due to the inclusion of both structured and unstructured data in the prediction, namely, the part's sensors combined with the operator's verbal reports. A spam filter called Electronic Learning Assistant (ELLA) was compared to many other product technologies and declared "World's Best Spam Blocker" (PC User Magazine, 2003).

More recent discoveries regard the use of Shannon entropy, specifically the conditional mutual information, as a more universal measure of entropy to quantify the dependency between x and y, conditional on the class z. Rather than using only xy and N to compute frequencies from the counts, the addition of x and y counts in the computation represents the generalized correlation or the dependency in xy. Using mutual information as an approximation to cognitive distance between a vector and the memory of each class member is warranted because the memories represent ensembles of prior cases, but the two are very similar. It has been shown for many test data sets that for ensembles there is practically no difference between Shannon mutual information and Kolmogorov mutual information. This is not surprising because the average of the Kolmogorov complexity for ensembles of objects is roughly equal to the Shannon entropy.

During evaluations, the cognitive distance approximated by Shannon mutual information has been used to automatically analyze echocardiograms working with Mt Sinai Hospital. Echocardiology has advanced to measure an enormous number of variables, over the time of a heartbeat and over many locations of the heart. Strains, displacements, and velocities of the heart tissue itself as well as blood flow are now available as raw data. These variables over time and place are also highly interactive, resulting in a very nonlinear pattern of variables to distinguish one heart condition from another. Given two classes of heart disease, for example, with thousands of simultaneous variables per patient, this new classification method has been shown to be nearly 90% correct. Even as early results for continued improvement, this appears well beyond the accuracy of cardiologists. Given the high dimensionality and nonlinearity, comparative results from other more standard reductionistic methods like decision trees were far behind and not worth reporting. Accuracy according to the memory base, systems and methods herein is achieved without data reduction or model parameterization. Simply by observing a few cases of each class (15-20 for each class of disease condition), memory-based classification computes the mutual information of all the associations that "light up", in real time whenever a new case is given.

We can further understand the "what lights up" approach by thinking about this method in terms of Kolmogorov complexity and compression. A derivative of Kolmogorov complexity may be a more popular methodology, Minimum Description Length (MDL). MLD may be used to address few data points and many variables as in the case of the echocardiogram data, while also working well for the larger standard data sets. MDL may also avoid over-fitting, as also demonstrated for the standard breast cancer and mushroom data sets.

In order to classify a new vector—to measure whether it is closer to one class or another, the Kolmogorov distance can be understood by thinking about how well the vector would be compressed into each of the different class memories. Consider the new vector as a string and all prior vectors stored in the memory as another string. Compress each string independently and compress them together. To the degree that the two strings share a common pattern, compressing the strings together will provide a smaller result than compressing separately. To the degree that the new vector shares a common pattern with prior vectors, the new vector is closer to one class or another.

In the case of an associative memory, each vector may be transformed to a list of its [attribute attribute] connections, where the pair is the fundamental element of the associative representation. Then a Shannon-Fano approach to compression, based on the frequency of these associative pairs may be used. All of the files may be scanned to build a frequency table and sorted in frequency order to assign Shannon-Fano codes. High frequency pairs may be assigned shorter codes and low frequency pairs may be assigned longer codes. For example, the highest frequency association may be assigned a 00 . . . code while the least frequent association may be assigned a 1111111111 . . . code. These codes may be used to replace the [attribute attribute] strings in the files. Along with a code-to-pair lookup table, the association files are compressed. Attributes in the lookup table can also be coded and replaced. The independent attribute code lengths may be determined by independent attribute frequencies, $\log(p(x))$ and $\log(p(y))$. All of the association files may be compressed without the new vector and then with the new vector. The difference in size is the difference between the new association file and all prior association vector files.

Figure 42:
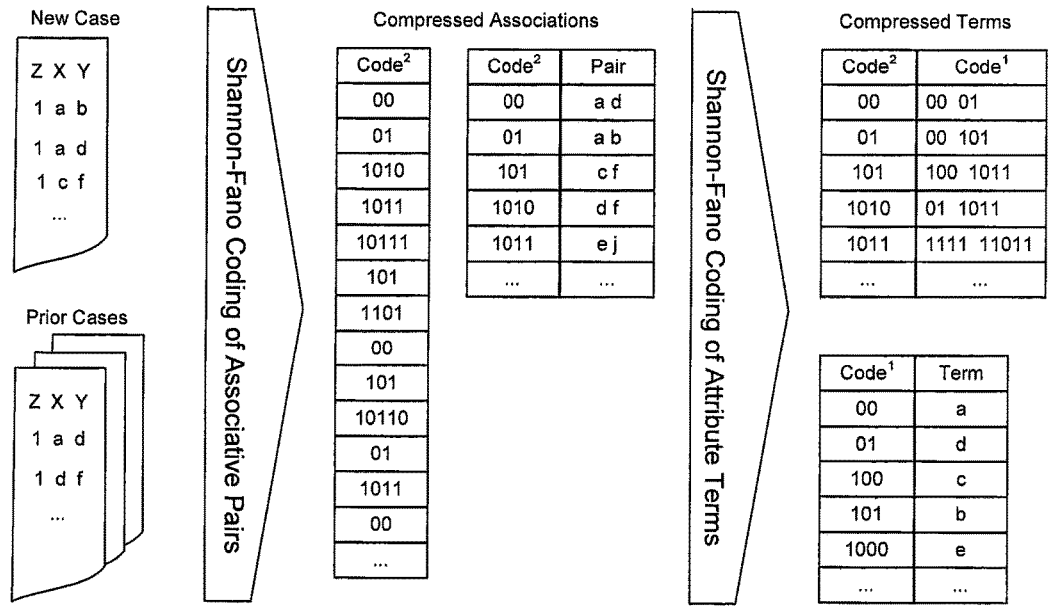
FIG. 42 is a diagram illustrating compression of associative knowledge using Shannon-Fano coding in a memory base according to some embodiments of the present invention.

Reference is now made to FIG. 42, which is a diagram illustrating compression of associative knowledge using Shannon-Fano coding in a memory base according to some embodiments of the present invention. A case vector is imagined as a file of associations. The first column represents its class (all the same here) as the condition over its following pair. To compute the distance of a new case to all prior cases within one class, the associations are compressed and the cost of adding the new case to the compression is measured. A Shannon-Fano compression may measure the frequency of each association and assign shorter codes to the more common associations. Along with a lookup table to recover the associated terms, each association pair is replaced by its code. The association code table ($code^2$) can be further compressed by another Shannon-Fano code based on attribute term frequencies. Attribute terms are replaced by their codes, including another lookup table for independent term codes ($code^1$). While Shannon-Fano coding may be less ideal than arithmetic coding, it may be easier to understand as different bit lengths in the codes. More critically, the code length is a function of log-probability.

This approach to compression may give insight into how the memory base compresses vectors into the class matrices and how one compares the new vectors to the memories of the training vectors. Associative pairs and frequencies of associative pairs may be fundamental to a memory representation. Compressing associations can be achieved by knowing their frequencies, the regularities of which may be measured by logarithmic bit "costs" of the associative frequencies and independent frequencies.

In terms of compression, the additional cost may be clearly limited to measuring only the associations of the new vector, which justifies the measure of distance to only the submatrix that "lights up". The addition of these cell costs is also justified as each associative cost in terms of its code length may be added to the other costs of code length to compute the total compression difference. Finally, a compressor that accounts for both the associative pair frequencies of xy as well as for independent term frequencies of x and y is a better compressor than pairs alone.

Unlike a Shannon-Fano or similar compression algorithms starting with raw files, however, the memory base as disclosed herein already stores the frequencies. In this regard, a practicable approximation to cognitive distance that can be quickly computed may be used without requiring the time to actually compress and compare. As such, while instructive in the understanding, the compression algorithm may be unnecessary because the memory base disclosed herein may already represent a form of compression, not of data but of knowledge. In theory, the frequency approach and the idea of compression from Kolmogov may be used. However, in practice, Shannon entropy may be used as an effective equivalent to represent and compare ensembles of vectors.

Some embodiments provide that a memory base according to some embodiment herein may provide a matrix machinery for class ensembles. For example, the machinery of a memory base may aggregate xy, x, y, and N for each cell of the required submatrices as described above for correlation and convergence. The machinery of classification is somewhat different than for point-wise correlation. The access pattern for correlation is given one or a few query terms and scans across a vast answer set, computing the distance for each. Convergence extends this access pattern to also scan over time. In contrast, classification is given a potentially very large vector, comparing distances across entire matrices, based on a massive number of given pairs, conditional to each matrix. The many benefits of matrix organization that apply to correlation may be used for classification as well.

Such benefits may include aggregation of raw counts across matrices. Whether for object-specific Kolmogorov complexity or ensemble Shannon entropy, the elemental counts are accessed across potentially more than one matrix and definitely across more than one row of distributed matrix partitions. Classification may recollect many counts to compute an overall distance over many cells.

Another benefit includes the row dominant access of the active submatrices. What "lights up" may represents a subset of the entire classification matrix. As one dimension of the active submatrix, only the relevant rows need to be accessed and aggregated. A matrix may be extremely large, but only the rows that "light up" to a vector may be required.

Yet another benefit may include column ordering of category:attributes. Classification may use a somewhat different access pattern than correlation and convergence. Rather than all the values of one category, classification may use access to one given value per category. However, categories are also in global sort-order in high-bits of each ID, also ordering all the column category:values within each row for efficient aggregation of each xy, x, and y.

Yet another benefit may include the parallel count servers and sub-computations. Classification may leverage the overall parallelism of access across required matrices and rows. Different servers may be responsible for the counts of different matrices and rows. Each server may independently scan and return the required columns that define a submatrix for the classification aggregator.

Figure 43:
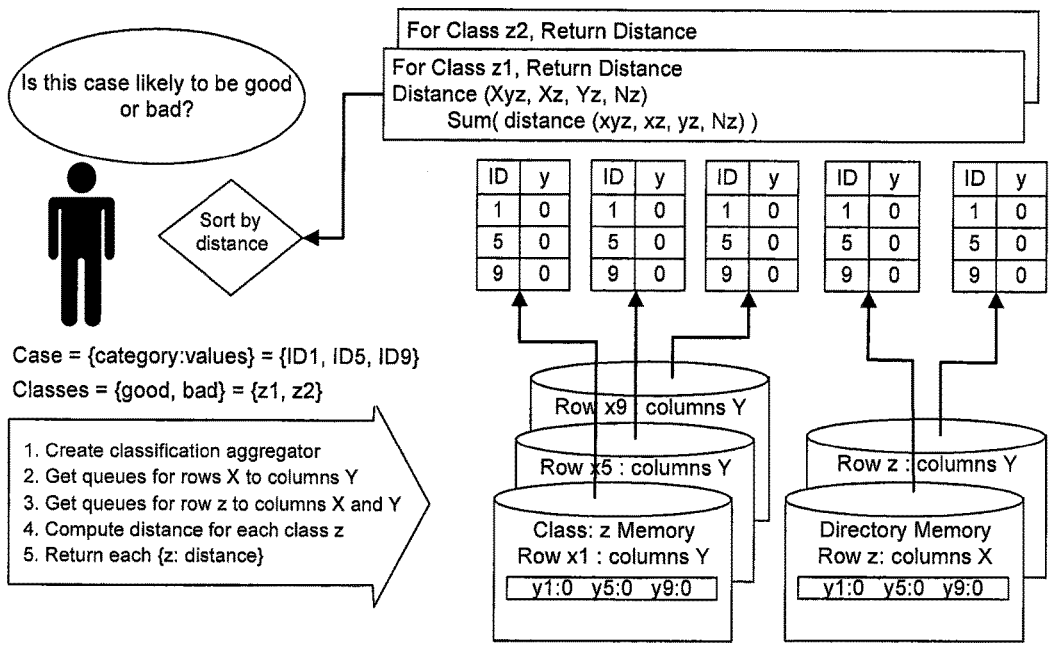
FIG. 43 is a diagram illustrating aggregation of a submatrix from a distributed representation in a memory base according to some embodiments of the present invention.

Reference is now made to FIG. 43, which is a diagram illustrating aggregation of a submatrix from a distributed representation in a memory base according to some embodiments of the present invention. Each matrix computes its distance to the case vector. The case vector defines the rows and columns of the relevant submatrix, which will tend to be distributed across a machine cluster. Distribution is row dominant; therefore, each attribute of the case defines a row within the matrix of each class. Each row is streamed to the classification aggregator, but rather than stream an entire row, each server returns only the column IDs and counts for attributes within the case vector. Collectively, these streaming queues provide the relevant submatrix to the classification aggregator. While distance can be estimated from only the xy association counts for Hartley entropy, a more refined method also accounts for the independent terms of x and y for Shannon Entropy. The aggregator uses the counts to compute distance by summing across all cells of the submatrix. Similarity distances from the case to each class are returned and can be rank ordered for presentation or further processed for decision support.

All the memory access points can be parallelized and brought together for aggregate computation of the distance between the given case vector and each class matrix. The computation of each class is also independent and can be computed in parallel across classes. The aggregator returns the distance of each class. As a matter of philosophy, the memory base may not make an ultimate decision. For example, it does not compare classes and answer only the closest class. Even for a two-class problem, it does not assume a particular decision threshold to decide good or bad, left or right. Instead, all the distances are given to the application in rank order of distance along with its distance. In normalized terms, the distances might by 90 versus 10, or 51 versus 49. The full distribution of distances may be most informative for the application and end user to then make an ultimate decision.

Some embodiments provide that a triple store is required for nonlinear associative classification in that XY associative terms are used to measure the similarity-distance to each class of Z. The associative XY pairs are within each class matrix so that each XY pair is conditional on Z. Consider the matrix as an extensive formula of pair-wise terms, using cognitive distance as the co-efficient for each term. The formula is additive. Scores can be compared to present the best decision class and/or to show the distribution of scores across all classes. For a set of classes, this formulation can be expressed as:

$$D1=D1(a,b)+D1(a,c)+D1(a,d)+D1(a,e)+D1(b,c)+ \ldots$$

$$D2=D2(a,b)+D2(a,c)+D2(a,d)+D2(a,e)+D2(b,c)+ \ldots$$

Beyond pair-wise terms, higher-order terms are also possible with the memory base as a quad and quint store. As a general principle, more entropy-based information can often live in higher order hyper-matrices. In this regard, a quad store may be considered as a formula of triple-wise terms rather than pair-wise terms for each classification.

By way of example, a large and complex object such as a protein, may be described by its sequence of amino acids. Sequences that have known functional classifications are learned, and new sequences are classified as just described, but with a higher-order representation. For example:

```
Given Sequence
akewgyashngpdhwhelfpnakgengspielhtkdirhdpslqpws ysydggsaktilnngktcrvvfddtydrsmlrggplpgpyrlrqfhl hwgssddhgsehtvdgvkyaaelhlvhwnpkyntfkealkqrdgiav igiflkighengefqifldaldkiktkgkeapftkfdpsclfpacrd ywtyggsfttppceecivwlllkepmtvssdqmaklrsllssaenep pvplvsnwrppqpinnrvvrasfk Predicted Class: 4.2.1.1
8767454464444544354445445644544545455554346463

5455443446645444586546556547474654445667566754

5754455655566555666456454457534555535435655545

5455445554435566544545565545565555555474545665

5645754556668769888554455854445675446544475664

4544555764464966555576887

Next Closest: 4.6.1.2
000011111111100001011111121111211121211111111

111112111211111101111111111121111211011121111

101110111112121121221111101101011211211111111

111112111111211211111121121111111111111111111

001011111011100011111121221111101112122221101

111111111111011111110100
```

There are 20 amino acids that are used to build proteins. As one memory design for proteins, consider 20 memories in a memory base, one memory for each acid. As each acid is "read" down the sequence, one acid becomes the central focus and is the conditional amino acid. This acid is the target memory, to learn all the pair-wise coincidences of its neighbors whenever it occurs in the sequence. Larger windows are typical for such sequence memories, but the example of an "a k e" sequence represents the triple of 'a' before 'k' when 'e' is after 'k'. At this one point of the protein sequence, 'k' is the memory, learning about all other pairs of acids around it. These three acids represent a triple.

The fourth dimension of the quad is the protein's functional classification. Each class can be represented as a separate matrix within the 'k' focus memory. The number of matrices now equals the number of protein classes X 20 amino acids.

To predict the class of a new protein, each acid memory is asked to predict the class for each of its locations and neighborhood when reading the sequence. From the perspective of 'k' at one point in the sequence, for example, does the subsequence look like an enzyme? If so, what kind of enzyme?

Even for a relatively small protein, this quad level of representation will amount to hundred of votes, one from each acid making its prediction from its perspective. These votes can be collated for an overall answer, but in a complex object like a protein, parts may clearly belong to one class, while others are less certain. In addition to the total classification score, a map of partial match information and uncertainty can also be informative.

In summary, memory-based reasoning is a form of "just in time" learning and its minimum commitment principle. Rather than fitting a data to an assumptive model, the counts are continuously incremented as new data arrives. An algorithmic model rather than a data model is computed at query time. Kolmogorov complexity is computed as the universal information distance. Both in representation and reasoning, the memory "model" is non-assumptive, non-parametric, and non-functional. No feature sub-setting is required in order to reduce the degrees-of-freedom for appropriate statistical power to "fit". All given knowledge is retained for future exploitation, depending on the future situation. As a universal approach, there is no knob tuning or re-tuning as new data arrives and the statistics change.

However, in order to delay computation and answer "just in time" in quick time, the partitioning, distribution, compression, and streaming of the memory base may remember everything and then quickly recollect what matters. When comparing large vectors to large matrices across a large number of matrices for large objects, the cognitive representation allows rapid inference by universal cognitive distance.

A memory base as disclosed herein may be a massive connection and correlation engine. On the other hand, such a massive correlation engine at learning time must also address massive de-correlation at query time. As in the universal definition of "associations" across semantics and statistics, de-correlation is provided in two ways, semantic context and statistical dependency.

Regarding semantic context, associations are connections and triple associations define the context of associations. This is true whether for entity analytics in understanding the connections between people, places, and things as well as for predictive analytics of connections between situations, actions, and outcomes, context matters. When "connecting the dots", giving context to the memory base allows it to express only the dots that matter.

Regarding statistical dependency, associations are statistical counts, and to further "illuminate the dots", associations as statistical dependencies lifts these raw counts to the level of cognitive information. While semantic context "shrinks" a connection list to the links that matter, dependency shrinks the counts to the degree they are informative. The definition of dependency is a more general form of correlation, also extended to the central importance of classification in machine learning.

When thinking about dependency in terms of distance and complexity, de-correlation is not a matter of filtering out the random "noise". Maybe the universe is random—but maybe not. Either way, de-correlation is only a matter of filtering what is cognitively close from what is cognitively far—depending on the question. The applications of cognitive distance to correlation, convergence, and classifications are examples of reasoning by such distance.

Some embodiments are directed to a computer program product comprising a computer usable storage medium having computer-readable program code embodied in the medium, the computer-readable program code comprising computer-readable program code that is configured to perform operations of the systems and methods herein.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of querying a distributed associative memory base, the method comprising:
   translating a semantic-space based query that includes at least one query search element and that is received from a user into a physical-space based query that is expressed as a plurality of row-based identifiers corresponding to a plurality of physical memory locations in at least one of a plurality of associative memory networks in the distributed associative memory base;
   generating a plurality of query queues that correspond to the plurality of row-based identifiers;
   streaming the plurality of query queues to a plurality of count server nodes that correspond to the plurality of associative memory networks;
   determining count information responsive to the plurality of query queues from the plurality of count server nodes;
   computing information distances between a query search element and ones of a plurality of associative memory classes to determine closeness values corresponding to the information distances including generating a plurality of associative memory class matrices corresponding to respective ones of the plurality of associative memory classes, wherein ones of the plurality of associative memory class matrices (i) each correspond to a class:value and (ii) include elements therein that are pairwise coincidences between attributes that are conditional to the class:value;
   comparing the information distances between the query search element and ones of the plurality of associative memory classes to estimate data corresponding to a classification on the query search element; and
   translating the count information from the plurality of count server nodes into semantic-space based result information that is responsive to the semantic-space based query.

2. The method according to claim 1, wherein ones of the plurality of associative memory class matrices correspond to a single value class, wherein the single value class includes only a single one of the plurality of associative memory matrices.

3. The method according to claim 1, wherein ones of the plurality of associative memory class matrices correspond to a complementary value class, wherein the complementary value class includes a first one of the plurality of associative memory matrices corresponding to a first value of the complementary value class and a second one of the plurality of associative memory matrices corresponding to a second value of the complementary value class that is a complement of the first value.

4. The method according to claim 1,
wherein the query search element comprises a case vector including a category and a plurality of values corresponding to the category,
wherein the plurality of values in the case vector are used to identify associations in corresponding ones of the associative memory class matrices, and
wherein the identified associations represent connections and counts in the ones of the associative memory classes corresponding to similar experience that is represented by the case vector.

5. The method according to claim 4, wherein computing the information distances further comprises computing a mutual information corresponding to the identified associations responsive to a new case vector.

6. The method according to claim 1,
wherein the query search element comprises a case vector including a category and a plurality of values corresponding to the category,
wherein the plurality of values in the case vector are used to identify associations in corresponding ones of the associative memory class matrices that include associative memory counts, and
wherein computing the information distances further comprises calculating a frequency from the associative memory counts by dividing the corresponding count value by the quantity of observations corresponding to the class:value.

7. The method according to claim 1, wherein computing information distances comprises computing the information distances for each of the ones of the plurality of associative memory classes to a case vector.

8. The method according to claim 7, wherein the case vector defines at least one row and at least one column of a relevant one of the plurality of associative memory classes.

9. The method according to claim 8, wherein the case vector includes attributes that each define a row within ones of matrices corresponding to the plurality of associative memory classes.

10. The method according to claim 9, further comprising streaming each row from a row server to a classification aggregator, wherein the streaming includes a column identifier and count for ones of the attributes in the case vector.

11. The method according to claim 9, further comprising aggregating the column identifiers and counts for each of the plurality of associative memory classes to generate a distance of each class relative to the query search element.

12. The method according to claim 1, wherein the query search element comprises a case vector including a category and a plurality of values corresponding to the category and wherein the plurality of associative memory classes include at least one class value.

13. The method according to claim 12, wherein computing the information distances further comprises generating a frequency table that includes a plurality of frequencies corresponding to the associative pairs.

14. A computer program product comprising a non-transitory computer usable storage medium having computer-readable program code embodied in the medium, the computer-readable program code comprising computer-readable program code that is configured to perform operations of the methods of claim 1.

15. A method of using a distributed associative memory base, the method comprising:
generating a plurality of streaming query queues that correspond to a physical-space based query that is expressed as a plurality of row-based identifiers of a respective plurality of physical memory locations in at least one of a plurality of distributed associative memory networks;
mapping ones of the plurality of streaming query queues to a plurality of node readers that are operable to receive count information from a plurality of count server nodes that correspond to the plurality of distributed associative memory networks;
mapping the received count information back to corresponding ones of the plurality of streaming query queues;
determining classification values between a query search element and ones of a plurality of associative memory classes including computing information distances between the query search element and ones of the plurality of associative memory classes, wherein computing the information distances comprises generating a plurality of associative memory class matrices corresponding to respective ones of the plurality of associative memory classes; and
comparing the classification values to estimate data corresponding to a classification on the query search element.

16. An associative memory system, comprising:
a distributed associative memory base comprising a network of networks of associative memory networks, a respective associative memory network comprising associations among a respective observer memories and a plurality of observed memories that are observed by the respective observer memory, ones of the associative memory networks are physically and/or logically independent from other ones of the associative memory networks; and
a processing system that is configured to observe associations into and imagine associations from, the distributed associative memory base using a plurality of streaming queues that correspond to respective ones of a plurality of rows in the associative memory networks,
wherein the processing system is further configured to determine a cognitive distance between a term and a class of terms using a plurality of associative memory class matrices that correspond to respective ones of a plurality of associative memory classes, the cognitive distance being returned responsive to a query of the distributed associative memory base, and configured to compare information distances between the term and ones of a plurality of associative memory classes to estimate data corresponding to a classification on the term, wherein ones of the plurality of associative memory class matrices (i) each correspond to a class:value and (ii) include elements therein that are pairwise coincidences between attributes that are conditional to the class:value.

17. The associative memory system according to claim 16, wherein the plurality of observed memories comprise a plurality of associative class memories that each correspond to an associative memory that corresponds to a value of a corresponding class, wherein ones of the plurality of associative class memories are each associated with a corresponding class:value.

18. The associative memory system according to claim 16, wherein ones of the plurality of associative memory class matrices correspond to a single value class, wherein the single value class includes only a single one of the plurality of associative memory matrices.

19. The associative memory system according to claim 16, wherein ones of the plurality of associative memory class matrices correspond to a complementary value class, wherein the complementary value class includes a first one of the plurality of associative memory matrices corresponding to a first value of the complementary value class and a second one of the plurality of associative memory matrices corresponding to a second value of the complementary value class that is a complement of the first value.

20. The associative memory system according to claim 16,
wherein the term comprises a case vector including a category and a plurality of values corresponding to the category,
wherein the plurality of values in the case vector are used to identify associations in corresponding ones of the associative memory class matrices, and
wherein identified associations represent connections and counts in the ones of the associative memory classes corresponding to similar experience that is represented by the case vector.

21. The associative memory system according to claim 20, wherein the cognitive distance is determined by computing a mutual information corresponding to the identified associations responsive to a new case vector.

22. The associative memory system according to claim 16,
wherein the term comprises a case vector including a category and a plurality of values corresponding to the category,
wherein the plurality of values in the case vector are used to identify associations in corresponding ones of the associative memory class matrices that include associative memory counts, and
wherein the processing system is further configured to calculate a frequency from the associative memory counts by dividing the corresponding count value by the quantity of observations corresponding to the class: value.

23. The associative memory system according to claim 16, wherein the processing system is further configured to generate a frequency table that includes a plurality of frequencies corresponding to the associative pairs that are identified responsive to the query.

* * * * *